（12） United States Patent
Nomura et al.

(10) Patent No.: US 7,412,092 B2
(45) Date of Patent: Aug. 12, 2008

(54) IMAGE PROCESSING APPARATUS, IMAGE PROCESSING METHOD, AND PROGRAM

(75) Inventors: Yoshikuni Nomura, Tokyo (JP); Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 632 days.

(21) Appl. No.: 10/974,507

(22) Filed: Oct. 27, 2004

(65) Prior Publication Data

US 2005/0094007 A1     May 5, 2005

(30) Foreign Application Priority Data

Oct. 31, 2003     (JP)     ............................ P2003-371538

(51) Int. Cl.
*G06K 9/00*     (2006.01)
(52) U.S. Cl. ........................................ 382/162
(58) Field of Classification Search ................. 382/162, 382/166–167, 199; 348/272; 700/223
See application file for complete search history.

(56) References Cited

U.S. PATENT DOCUMENTS 5,761,070 A * 6/1998 Conners et al. ............. 700/223
2003/0223615 A1* 12/2003 Keaton et al. ............... 382/199

* cited by examiner

*Primary Examiner*—Duy M Dang
(74) *Attorney, Agent, or Firm*—Finnegan, Henderson, Farabow, Garrett & Dunner, L.L.P.

(57) ABSTRACT

A texture-intensity computation section computes a texture intensity $T_H$ and a texture intensity $T_V$ using interpolation values GA and EA. A G interpolation section computes an interpolation value GF using a horizontally adjacent interpolation value GA and a signal R. An E interpolation section computes an interpolation value EF using a vertically adjacent interpolation value EA and the signal R. The G interpolation section computes an interpolation value GU using the interpolation values GA, EA, and EF. The E interpolation section computes an interpolation value EU using the interpolation values GA, EA, and GF. A G+E generation section combines the interpolation values GU and EF to compute $(G+E)_V$. A G+E generation section combines the interpolation values GF and EU to compute $(G+E)_H$. A combining section determines the signal G+E using $(G+E)_H$ and $(G+E)_V$, the texture intensities $T_H$ and $T_V$.

7 Claims, 38 Drawing Sheets

FIG. 15

|   | 1 | 2 | 3 | 4 | 5 | 6 | 7 |
|---|---|---|---|---|---|---|---|
| 1 | 1 | 2 | 3 | 4 | 3 | 2 | 1 |
| 2 | 2 | 4 | 6 | 8 | 6 | 4 | 2 |
| 3 | 3 | 6 | 9 | 12 | 9 | 6 | 3 |
| 4 | 4 | 8 | 12 | 16 | 12 | 8 | 4 |
| 5 | 3 | 6 | 9 | 12 | 9 | 6 | 3 |
| 6 | 2 | 4 | 6 | 8 | 6 | 4 | 2 |
| 7 | 1 | 2 | 3 | 4 | 3 | 2 | 1 |

FIG. 18

| 0 | 0 | 1 | 0 | 0 |
| 0 | 0 | 0 | 0 | 0 |
| 0 | 0 | 2 | 0 | 0 |
| 0 | 0 | 0 | 0 | 0 |
| 0 | 0 | 1 | 0 | 0 |

FIG. 19

| 0 | 0 | 0 | 0 | 0 |
| 0 | 0 | 0 | 0 | 0 |
| 1 | 0 | 2 | 0 | 1 |
| 0 | 0 | 0 | 0 | 0 |
| 0 | 0 | 0 | 0 | 0 |

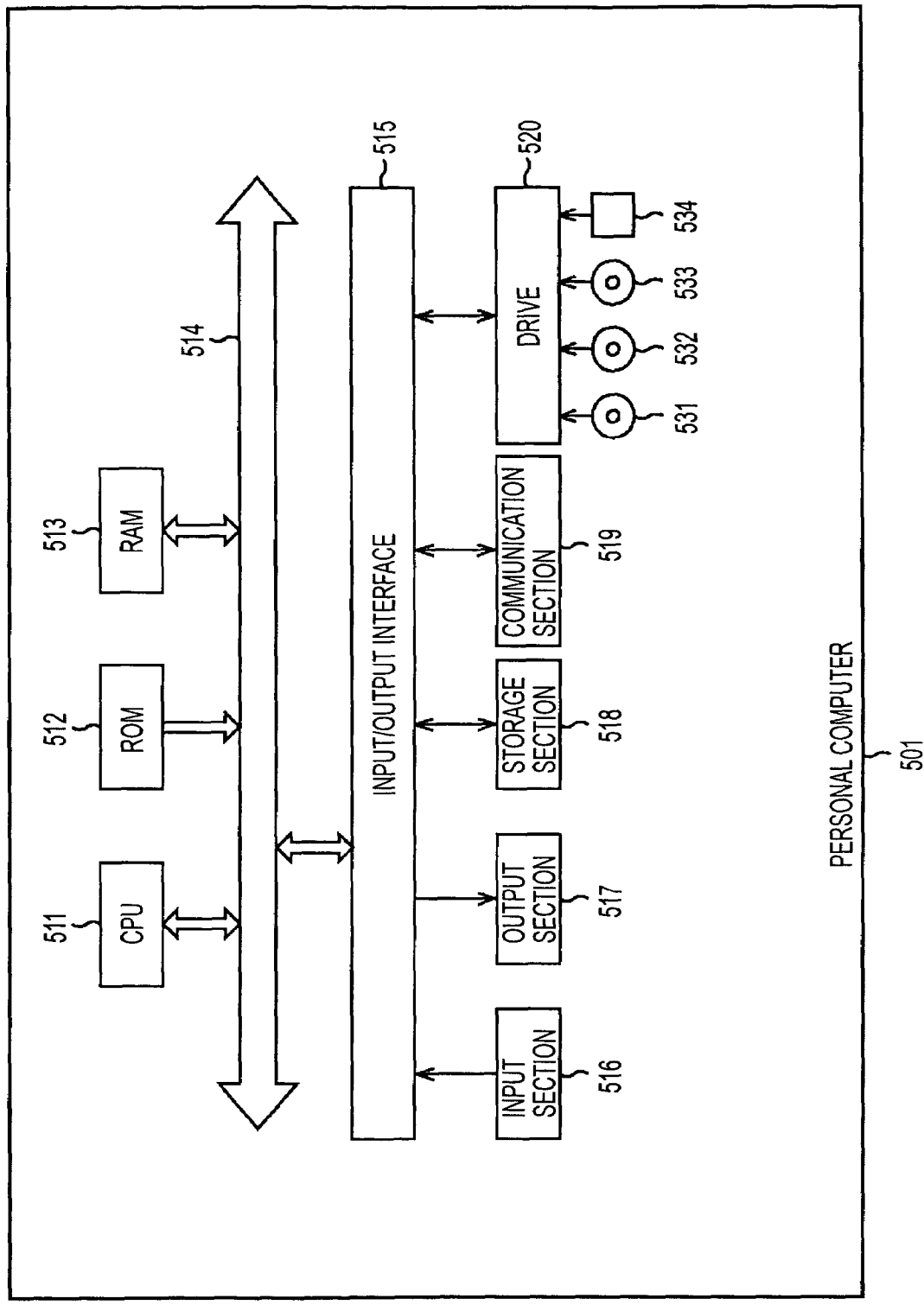

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program. More particularly, the present invention relates to an image processing apparatus and an image processing method capable of performing interpolation for a mosaic image with higher accuracy, and a program therefor.

2. Description of the Related Art

When an image is captured using an imaging apparatus incorporating a single-plate solid-state imaging device, only single spectral sensitivity can be obtained. For this reason, in general, a method of capturing color images, in which a different color filter is placed on each of a large number of pixels, and those color filters are arranged in a specific pattern, has been used. In an image captured by this method, an image in a mosaic form with respect to colors is generated. Therefore, by performing interpolation by using color information obtained from adjacent pixels, an image in which all the colors (for example, RGB) are available in all the pixels can be generated.

In general, for the arrangement of a filter, a Bayer arrangement shown in FIG. 1 is used. The Bayer arrangement is formed in such a manner that a total of four filters, that is, two G filters that allow light of only green color (G) to pass therethrough, one R filter that allows light of only red color (R) to pass therethrough, and one B filter that allows light of only blue color (B) to pass therethrough, define a minimum unit. That is, the G filters are arranged in a checkered pattern and exist at a density twice that of the R and B filters. Therefore, a method is often used in which, for G having a large amount of information and a strong correlation with luminance, G are made available for all the pixels, and a pixel interpolation process is performed by using G as reference information, thereby allowing information on the other colors to be available in each pixel.

For example, in U.S. Pat. No. 4,642,678 (Cok, David R.), a pixel interpolation method has been proposed in which, under the assumption that the ratio of colors in a local area is almost constant, G is made available in advance in all the pixels, the average of the ratios of R to G and the average of the ratios of B to G in adjacent pixels are multiplied by G at the position of the pixel of interest, in order to estimate color components which are not known. In such a pixel interpolation method in which G is used as reference information, there is a problem in that the final result greatly depends on the interpolation accuracy when G is made available for all the pixels.

Therefore, in U.S. Pat. No. 5,382,976 (Hibbard, Robert H.), a scheme in which, based on the gradient value of G, interpolation accuracy is improved by switching adjacent pixels of G used for interpolation, has been made. Furthermore, in Japanese Patent No. 2931520, a method has been proposed in which, in addition to switching adjacent pixels of G used for interpolation, horizontal and vertical interpolation values at the position of the interpolation pixel are obtained, and two interpolation values obtained by a process suitable for a case in which a correlation in the horizontal direction is strong and a process suitable for a case in which a correlation in the vertical direction is strong are mixed using correlation values.

The above-described various methods are assumed on the features of the Bayer arrangement such that G is arranged in a checkered pattern and the sampling frequency is higher than that for the other colors. However, the filter of the single-plate solid-state imaging device is not limited to three colors, and four colors may be used. In other than the filter arrangement of the so-called complementary color system, for example, in Japanese Unexamined Patent Application Publication No. 2002-271804, the formation of a filter by the arrangement of four colors by further adding another color (for example, Y) to the three colors of RGB for the purpose of improvement of color reproduction has been proposed. Also, for example, in the Bayer arrangement, there are cases in which two Gs within a 2×2 filter arrangement do not always have the same characteristics due to, for example, differences in the arrangement of R and B adjacent to G, differences in the spectral characteristics caused by position deviations of filters in a manufacturing process, disclosed in Japanese Unexamined Patent Application Publication Nos. 7-135302 and 8-19114, and an error of gain between lines, which occurs in a solid-state imaging device having a different signal output between even-numbered lines and odd-numbered lines. Actually, an arrangement of four colors is formed.

However, the method of interpolating G in all the pixels, in which a checkered arrangement of G is used in the Bayer arrangement, cannot be applied to a signal obtained from such a filter arrangement of four colors. Naturally, there is a problem in that the color interpolation method on the assumption that G is made available for all the pixels cannot be used as is.

Furthermore, even if G or signals replaced with G are made available by some method, in the method, proposed in Japanese Patent No. 2931520, in which the correlation values in the horizontal and vertical directions calculated at the position of the pixel of interest are used as is, there is a problem in that, if correlation determination is incorrect due to influence of noise, etc., in the vicinity of a limit resolution, the two interpolation values are mixed irregularly, and a very noticeable artifact occurs.

SUMMARY OF THE INVENTION

The present invention has been made in view of such circumstances. An object of the present invention is to provide a process capable of interpolating a luminance signal replaced by G in all the pixels with high accuracy and to be capable of performing a process of interpolating color components on the basis of the signal also in the four-color filter arrangement.

To achieve the above-mentioned object, in one aspect, the present invention provides an image processing apparatus including: change intensity computation means for computing a change intensity in the horizontal direction and a change intensity in the vertical direction in a pixel of interest on the basis of the pixel of interest of a mosaic image and pixels that are vertically and horizontally adjacent to the pixel of interest; first estimation value computation means for computing a first estimation value in the pixel of interest of the first color components on the basis of the pixel of interest and pixels that are vertically adjacent to the pixel of interest and for computing a second estimation value in the pixel of interest of the second color components on the basis of the pixel of interest and pixels that are horizontally adjacent to the pixel of interest; and second estimation value computation means for computing a third estimation value in the pixel of interest of third color components composed of the first color components and the second color components on the basis of the change intensity in the vertical direction, the change intensity in the horizontal direction, the first estimation value, and the second estimation value.

The change intensity computation means may interpolate a first interpolation value of the first color components and the second color components in the pixel of interest on the basis of the pixel values of pixels in the neighborhood of the pixel of interest, may interpolate a second interpolation value of the first color components and the second color components in pixels positioned in the vertical direction of the pixel of interest on the basis of the pixel values of pixels in the neighborhood of the pixel of interest, may interpolate a third interpolation value of the first color components and the second color components in pixels positioned in the horizontal direction of the pixel of interest on the basis of the pixel values of pixels in the neighborhood of the pixel of interest, may compute a vertical gradient evaluation value on the basis of a set of differences between the first interpolation value and the second interpolation value, may compute a horizontal gradient evaluation value on the basis of a set of differences between the first interpolation value and the third interpolation value, may determine the change intensity on the basis of the vertical gradient evaluation value and the horizontal gradient evaluation value, may compute a deviation of the change intensity in the pixel of interest and in the neighborhood of the pixel of interest, and may correct the change intensity of the pixel of interest on the basis of the deviation.

The second estimation value computation means may include: third estimation value computation means for computing a fourth estimation value of the third color components in the pixel of interest on the basis of the second color components of pixels in the neighborhood of the pixel of interest and the first estimation value; fourth estimation value computation means for computing a fifth estimation value of the third color components in the pixel of interest on the basis of the first color components of pixels in the neighborhood of the pixel of interest and the second estimation value; and fifth estimation value computation means for computing the third estimation value on the basis of the fourth estimation value, the fifth estimation value, the change intensity in the vertical direction in the pixel of interest, and the change intensity in the horizontal direction in the pixel of interest.

The first color components and the second color components may have spectral sensitivities having a high correlation with each other.

In another aspect, the present invention provides an image processing method including: a change intensity computation step of computing a change intensity in the horizontal direction and a change intensity in the vertical direction in a pixel of interest on the basis of the pixel of interest of a mosaic image and pixels that are vertically and horizontally adjacent to the pixel of interest; a first estimation value computation step of computing a first estimation value in the pixel of interest of the first color components on the basis of the pixel of interest and pixels that are vertically adjacent to the pixel of interest; a second estimation value computation step of computing a second estimation value in the pixel of interest of the second color components on the basis of the pixel of interest and pixels that are horizontally adjacent to the pixel of interest; and a third estimation value computation step of computing a third estimation value in the pixel of interest of the third color components composed of the first color components and the second color components on the basis of the change intensity in the vertical direction, the change intensity in the horizontal direction, the first estimation value, and the second estimation value.

In another aspect, the present invention provides a program for enabling a computer to perform processing including: a change intensity computation step of computing a change intensity in the horizontal direction and a change intensity in the vertical direction in a pixel of interest on the basis of the pixel of interest of a mosaic image and pixels that are vertically and horizontally adjacent to the pixel of interest; a first estimation value computation step of computing a first estimation value in the pixel of interest of the first color components on the basis of the pixel of interest and pixels that are vertically adjacent to the pixel of interest; a second estimation value computation step of computing a second estimation value in the pixel of interest of the second color components on the basis of the pixel of interest and pixels that are horizontally adjacent to the pixel of interest; and a third estimation value computation step of computing a third estimation value in the pixel of interest of third color components composed of the first color components and the second color components on the basis of the change intensity in the vertical direction, the change intensity in the horizontal direction, the first estimation value, and the second estimation value.

According to the present invention, based on the pixel of interest of a mosaic image and pixels that are vertically and horizontally adjacent to the pixel of interest, the vertical change intensity in the pixel of interest and the horizontal change intensity in the pixel of interest are computed. Based on the pixel of interest and pixels that are vertically adjacent to the pixel of interest, a first estimation value in the pixel of interest of the first color components is computed, and based on the pixel of interest and pixels that are horizontally adjacent to the pixel of interest, a second estimation value in the pixel of interest of the second color components is computed. Based on the vertical change intensity, the horizontal change intensity, the first estimation value, and the second estimation value, a third estimation value in the pixel of interest of the third color components composed of the first color components and the second color components is computed.

According to the present invention, interpolation of a mosaic image can be performed with higher accuracy. In particular, according to the present invention, even in the neighborhood of the limit resolution in which an error is likely to occur in direction detection, stable interpolation results can be obtained.

According to the present invention, an image processing apparatus is provided. This image processing apparatus is an image processing apparatus (for example, a digital camera 201 of FIG. 2) for generating a color image on the basis of a mosaic image captured by a single-plate color imaging device, each pixel of which has a plurality of color components, the single-plate color imaging device incorporating a color filter in which first color components (e.g., G) are arranged every other line horizontally and vertically and second color components (e.g., E) are arranged every other line horizontally and vertically and are arranged in horizontal and vertical lines differing from those of the first color components. The image processing apparatus includes change intensity computation means (for example, a texture-intensity computation processing section 334 of FIG. 6) for computing a change intensity in the vertical direction (for example, a texture intensity $T_V$) and a change intensity in the horizontal direction (for example, a texture intensity $T_H$) in a pixel of interest on the basis of the pixel of interest of the mosaic image and pixels that are vertically and horizontally adjacent to the pixel of interest; first estimation value computation means (for example, a G interpolation processing section 332-1 or an E interpolation processing section 332-2 of FIG. 6) for computing a first estimation value in the pixel of interest of the first color components (e.g., G) on the basis of the pixel of interest (e.g., R) and pixels that are vertically adjacent to the pixel of interest (for example, pixels G that are vertically adjacent to R) and for computing a second estimation value in the pixel of interest of the second color components (e.g., E) on the basis of the pixel of interest (e.g., R) and pixels that are horizontally adjacent to the pixel of interest (for example, pixels E that are horizontally adjacent to R); and second estimation value computation means (for example, a G+E generation processing section 335, a G+E generation processing section 336, or a combining processing section 337 of FIG. 6) for computing a third estimation value (e.g., G+E) in the pixel of interest of third color components composed of the first color components and the second color components on the basis of the change intensity in the vertical direction, the change intensity in the horizontal direction, the first estimation value, and the second estimation value.

The change intensity computation means may interpolate a first interpolation value (for example, GA(j', k') and EA(j', k'), where (j', k') indicates the position of the processing pixel)of the first color components and the second color components in the pixel of interest on the basis of the pixel values of pixels in the neighborhood of the pixel of interest, may interpolate a second interpolation value (for example, GA(j', k'−1) and GA(j', k'+1), and EA(j', k'−1) and EA(j', k'+1)) of the first color components and the second color components in pixels positioned in the vertical direction of the pixel of interest on the basis of the pixel values of pixels in the neighborhood of the pixel of interest, may interpolate a third interpolation value (for example, GA(j'−1, k') and GA(j'+1, k'), and EA(j'−1, k') and EA(j'+1, k')) of the first color components and the second color components in pixels positioned in the horizontal direction of the pixel of interest on the basis of the pixel values of pixels in the neighborhood of the pixel of interest, may compute (for example, step S203 of FIG. 13) a vertical gradient evaluation value (e.g., dV) on the basis of a set of differences between the first interpolation value (for example, GA(j', k') and EA(j', k') at the position (j', k') of the pixel of interest) and the second interpolation value (for example, GA(j', k'−1) and GA(j', k'+1), and EA(j', k'−1) and EA(j', k'+1)), may compute (for example, step S203 of FIG. 13) a horizontal gradient evaluation value (e.g., dH) on the basis of a set of differences between the first interpolation value (for example, GA(j', k') and EA(j', k')) and the third interpolation value (for example, GA(j'−1, k') and GA(j'+1, k'), and EA(j'−1, k') and EA(j'+1, k')), may determine (for example, step S211 of FIG. 13) the change intensity on the basis of the vertical gradient evaluation value and the horizontal gradient evaluation value, may compute a deviation of the change intensity in the pixel of interest and in the neighborhood of the pixel of interest, and may correct (for example, step S154 of FIG. 12) the change intensity of the pixel of interest on the basis of the deviation.

The second estimation value computation means may include: third estimation value computation means (for example, a G+E generation processing section 336 of FIG. 6) for computing a fourth estimation value (e.g., $(G+E)_H$) of the third color components (e.g., G+E) in the pixel of interest on the basis of the second color components (e.g., E) of pixels in the neighborhood of the pixel of interest and the first estimation value (e.g., GF); fourth estimation value computation means (for example, a G+E generation processing section 335 of FIG. 6) for computing a fifth estimation value (e.g., $(G+E)_V$) of the third color components in the pixel of interest on the basis of the first color components (e.g., G) of pixels in the neighborhood of the pixel of interest and the second estimation value (e.g., EF); and fifth estimation value computation means (for example, a combining processing section 337 of FIG. 6) for computing the third estimation value (e.g., (G+E)) on the basis of the fourth estimation value, the fifth estimation value, the change intensity in the vertical direction in the pixel of interest, and the change intensity in the horizontal direction in the pixel of interest.

The first color components and the second color components may have spectral sensitivities having a high correlation with each other.

According to the present invention, an image processing method is provided. This image processing method is an image processing method for use with an image processing apparatus (for example, a digital camera 201 of FIG. 2) for generating a color image on the basis of a mosaic image captured by a single-plate color imaging device, each pixel of which has a plurality of color components, the single-plate color imaging device incorporating a color filter in which first color components (e.g., G) are arranged every other line horizontally and vertically and second color components (e.g., E) are arranged every other line horizontally and vertically and are arranged in horizontal and vertical lines differing from those of the first color components, the image processing method including: a change intensity computation step (for example, step S53 of FIG. 9) of computing a change intensity in the vertical direction (for example, a texture intensity $T_V$) and a change intensity in the horizontal direction (for example, a texture intensity $T_H$) in a pixel of interest on the basis of the pixel of interest of the mosaic image and pixels that are vertically and horizontally adjacent to the pixel of interest; a first estimation value computation step (for example, step S54 FIG. 9) of computing a first estimation value (e.g., GF) in the pixel of interest (e.g., R) of the first color components (e.g., G) on the basis of the pixel of interest and pixels that are vertically adjacent to the pixel of interest (for example, a pixel G that is vertically adjacent to R); a second estimation value computation step (for example, step S55 of FIG. 9) of computing a second estimation value (e.g., EF) in the pixel of interest of the second color components (e.g., E) on the basis of the pixel of interest (e.g., R) and pixels that are horizontally adjacent to the pixel of interest (for example, pixels E that are horizontally adjacent to R); and a third estimation value computation step (for example, steps S58 to S60 of FIG. 9) of computing a third estimation value (e.g., (G+E)) in the pixel of interest of third color components (e.g., G+E) composed of the first color components and the second color components on the basis of the change intensity in the vertical direction, the change intensity in the horizontal direction, the first estimation value, and the second estimation value.

According to the present invention, a program is provided. This program is a program for generating a color image on the basis of a mosaic image captured by a single-plate color imaging device, each pixel of which has a plurality of color components, the single-plate color imaging device incorporating a color filter in which first color components (e.g., G) are arranged every other line horizontally and vertically and second color components (e.g., E) are arranged every other line horizontally and vertically and are arranged in horizontal and vertical lines differing from those of the first color components, the program enabling a computer to perform processing including: a change intensity computation step (for example, step S53 of FIG. 9) of computing a change intensity in the vertical direction (for example, a texture intensity $T_V$) and a change intensity in the horizontal direction (for example, a texture intensity $T_H$) in a pixel of interest on the basis of the pixel of interest of the mosaic image and pixels that are vertically and horizontally adjacent to the pixel of interest; a first estimation value computation step (for example, step S54 of FIG. 9) of computing a first estimation value (e.g., GF) in the pixel of interest of the first color components (e.g., G) on the basis of the pixel of interest (e.g., R) and pixels that are vertically adjacent to the pixel of interest (for example, pixels G that are vertically adjacent to R); a second estimation value computation step (for example, step S55 of FIG. 9) of computing a second estimation value (e.g., EF) in the pixel of interest of the second color components (e.g., E) on the basis of the pixel of interest (e.g., R) and pixels that are horizontally adjacent to the pixel of interest (for example, pixels E that are horizontally adjacent to R); and a third estimation value computation step (for example, steps S58 to S60 of FIG. 9) of computing a third estimation value (e.g., (G+E)) in the pixel of interest of third color components (e.g., G+E) composed of the first color components and the second color components on the basis of the change intensity in the vertical direction, the change intensity in the horizontal direction, the first estimation value, and the second estimation value.

BRIEF DESCRIPTION OF THE DRAWINGS

FIG. 15 illustrates an example of coefficients for weighting;
FIG. 18 illustrates assignment of weights when a sample in the vertical direction is used;
FIG. 19 illustrates assignment of weights when a sample in the horizontal direction is used.

FIG. 39 is a block diagram showing the configuration of a personal computer.

DESCRIPTION OF THE PREFERRED EMBODIMENTS

Embodiments of the present invention will now be described below with reference to the drawings.

Figure 2:
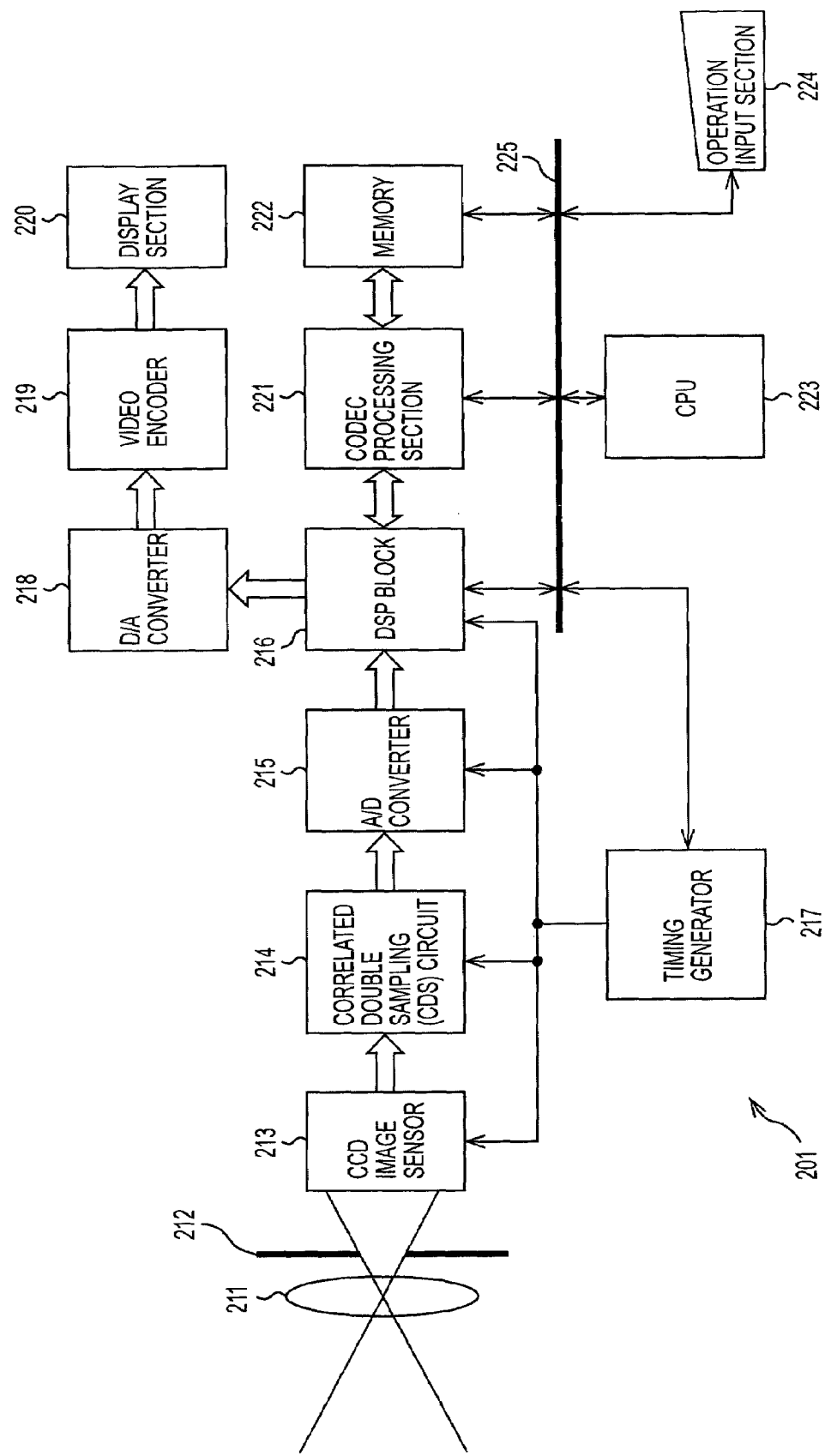
FIG. 2 is a block diagram showing the configuration of a digital camera to which the present invention is applied.

FIG. 2 is a block diagram showing the configuration of a digital camera 201 to which the present invention is applied.

As shown in FIG. 2, the digital camera 201 includes a lens 211, an aperture stop 212, a CCD (Charge-Coupled Device) image sensor 213, a correlated double sampling (CDS) circuit 214, an A/D converter 215, a digital signal processor (DSP) block 216, a timing generator 217, a D/A converter 218, a video encoder 219, a display section 220, a compression/decompression (codec) processing section 221, a memory 222, a CPU (Central Processing Unit 223) and an operation input section 224.

The CCD is a semiconductor device for converting optical information into electrical signals (photoelectric conversion). The CCD image sensor 213 is such that a plurality of photo-receiving devices (pixels) for converting light into electricity are arranged, so that a change in light is converted into an electrical signal independently of each pixel. The correlated double sampling circuit 214 is a circuit for removing reset noise, which is main component, among noise contained in the signal output from the CCD image sensor 213 by subtracting a signal of a pixel sampled during a video signal period from a signal of a pixel sampled during a reference period. The A/D converter 215 converts the supplied analog signal after noise is removed into a digital signal.

The DSP block 216 is a block having a signal processing processor and a RAM (Random Access Memory) for images, and the signal processing processor performs preprogrammed image processing or image processing formed as a computation process by hardware, on image data stored in the RAM for images. The timing generator 217 is a logic circuit for generating various horizontal and vertical driving pulses required to drive the CCD and pulses used for analog front processing in synchronization with a reference clock. Furthermore, the timing clock generated by the timing generator 217 is also supplied to the codec processing section 221, a memory 222, and a CPU 223 via a bus 225.

The D/A converter 218 converts the supplied digital signal into an analog signal and outputs it. The video encoder 219 encodes the supplied analog signal into video data in a form displayable on the display section 220. The display section 220 is formed by, for example, an LCD (Liquid-Crystal Display), and displays a video signal supplied from the video encoder 219.

The codec processing section 221 performs processing using a digital video data compression or expansion algorithm, such as, for example, MPEG (Moving Picture Coding Experts Group/Moving Picture Experts Group). The memory 222 is formed by, for example, a semiconductor memory, a magnetic disk, a magneto-optical disk, or an optical disk. Under the control of the CPU 223, the memory 222 stores supplied data or outputs stored data. The memory 222 may also be configured so as to be loadable into or removable from the digital camera 201.

The CPU 223 controls each section of the digital camera 201 on the basis of operation input by the user, supplied from the operation input section 224 via the bus 225. The operation input section 224 is made up of, for example, a jog dial, keys, a lever, buttons, or a touch panel, including a button for instructing image recording, and receives operation input by the user.

Light input via the lens 211 and the aperture stop 212 is input to the CCD image sensor 213, whereby the light is converted into an electrical signal by photoelectric conversion in the photoreceiving devices and is supplied to the correlated double sampling circuit 214. The correlated double sampling circuit 214 removes noise among noise contained in the signal output from the CCD image sensor 213 by subtracting a signal of a pixel sampled during a video signal period from a signal of a pixel sampled during a reference period, and supplies the signal to the A/D converter 215. The A/D converter 215 converts the supplied analog signal after noise is removed into a digital signal and temporarily stores the digital signal in the RAM for images of the DSP block 216.

The timing generator 217 controls the CCD image sensor 213, the correlated double sampling circuit 214, the A/D converter 215, and the DSP block 216 so that capturing of images at a fixed frame rate is maintained in a state in which image capturing is being performed.

Upon receiving the supply of stream data of pixels at a fixed rate, the DSP block 216 temporarily stores the data in the RAM for images, and in the signal processing processor, image processing (to be described later) is performed on the temporarily stored image data. After the image processing, under the control of the CPU 223, the DSP block 216 supplies the image data to the D/A converter 218 when the image data is to be displayed on the display section 220 and supplies the image data to the codec processing section 221 when the image data is to be stored in the memory 222.

The D/A converter 218 converts the digital image data supplied to the DSP block 216 into an analog signal and supplies the analog signal to the video encoder 219. The video encoder 219 converts the supplied analog image signal into a video signal, and outputs the video signal to the display section 220, whereby the video signal is displayed. That is, the display section 220 plays the role of a finder of a camera. The codec processing section 221 performs coding of a predetermined method on the image data supplied from the DSP block 216, and supplies the coded image data to the memory 222, whereby the image data is stored.

Under the control of the CPU 223 receiving user operation input from the operation input section 224, the codec processing section 221 reads the data specified by the user from among the data stored in the memory 222, decodes the data by a predetermined decoding method, and outputs the decoded signal to the DSP block 216. As a result, the decoded signal is supplied to the D/A converter 218 via the DSP block 216, whereby the signal is converted into analog form. Thereafter, the signal is encoded by the video encoder 219 and is displayed on the display section 220.

Figure 3:
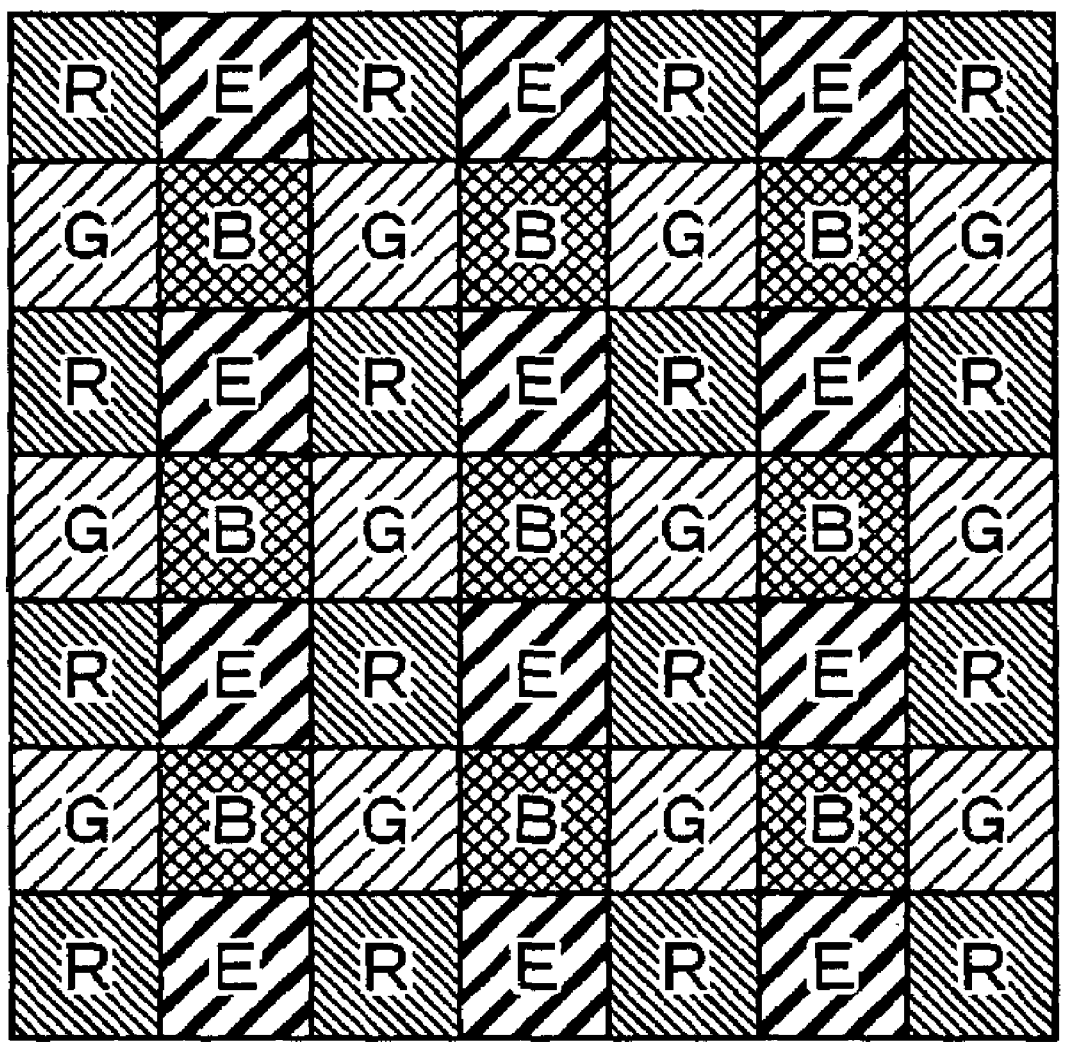
FIG. 3 illustrates an example of a mosaic arrangement of four colors of an on-chip color filter of a CCD image sensor.

In the on-chip color filters of the CCD image sensor 213 of FIG. 2, usually, three or four types of colors are used. These on-chip color filters are arranged in a mosaic form so that a different color is formed alternately for each photoreceiving device. In the present invention, an on-chip color filter of the arrangement is used in which a fourth color having spectral characteristics closer to G (hereinafter referred to as "E (emerald)") is added to the three colors of RGB (Red, Green, Blue). An example of this mosaic arrangement of four colors is shown in FIG. 3. In this specification, the fourth color having spectral characteristics closer to G is assumed to be E; however, this color is not limited to emerald, and any color may be used as long as it has spectral characteristics closer to G.

The four-color arrangement shown in FIG. 3 is formed in such a manner that a total of four filters, that is, one R filter that allows light of only red color (R) to pass therethrough, one G filter that allows light of only green color (G) to pass therethrough, one B filter that allows light of only blue color (B) to pass therethrough, and one E filter that allows light of only emerald color (E) to pass therethrough, define a minimum unit. That is, each filter of R, G, B, and E exists at the same density.

In this manner, when a four-color mosaic shown in FIG. 3 is used in the on-chip color filter of the CCD image sensor 213, in the image which is temporarily stored in the RAM for images of the DSP block 216, each pixel has only one of R, G, B, and E. Therefore, in the signal processing processor of the DSP block 216, a preinstalled image processing program or hardware processes this image in order to generate image data having data of all the colors in all the pixels. More specifically, first, the signal processing processor of the DSP block 216 generates a new color (hereinafter referred to as "G+E") in all the pixels, so that an interpolation method on the assumption that G is available in all the pixels in the three-color Bayer arrangement can also be used similarly in the four-color mosaic arrangement.

Figure 4:
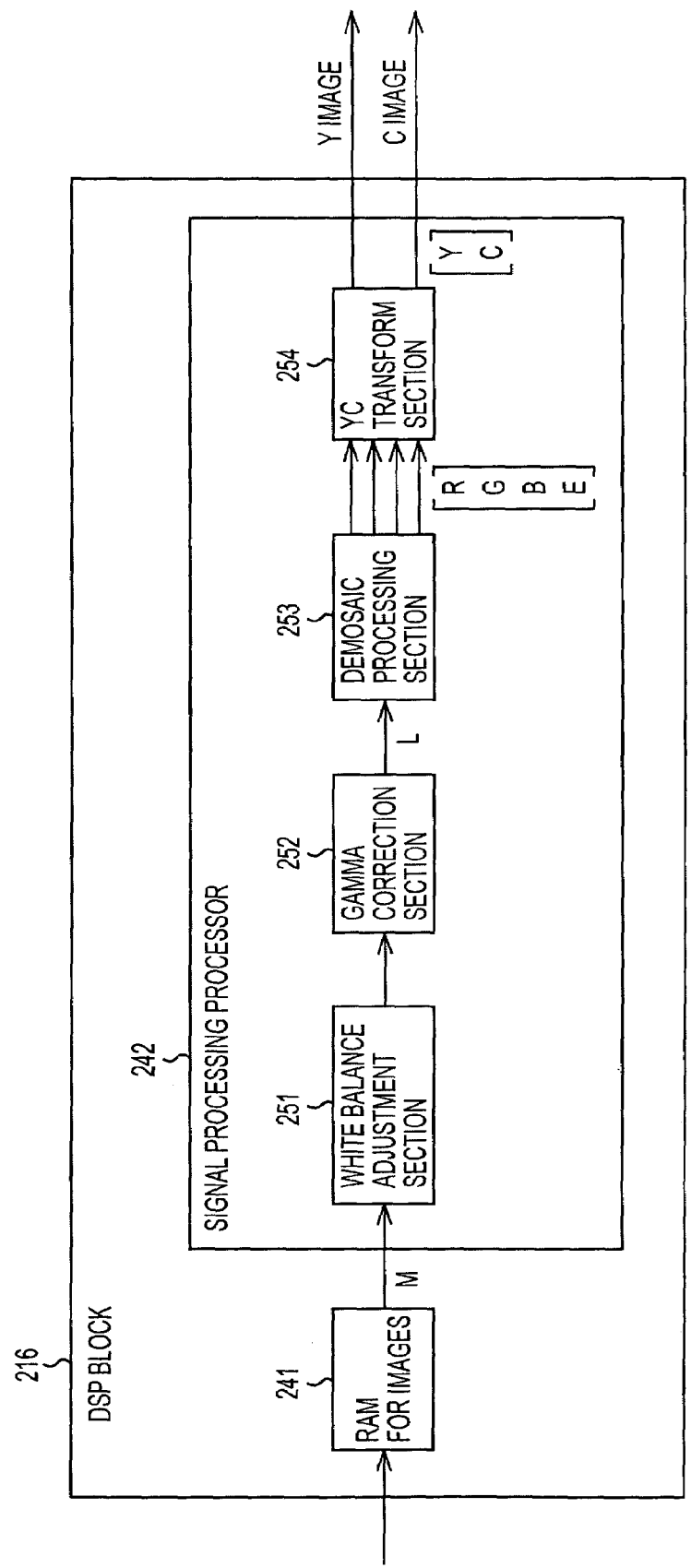
FIG. 4 is a block diagram showing the configuration of a DSP block of FIG. 2.

FIG. 4 is a block diagram showing further detail of the configuration of the DSP block 216 of FIG. 2.

As described above, the DSP block 216 includes the RAM 241 for images and a signal processing processor 242, and the signal processing processor 242 includes a white-balance adjustment section 251, a gamma correction section 252, and a YC transform section 254.

The mosaic image converted into a digital signal by the A/D converter 215 is temporarily stored in the RAM 241 for images. The mosaic image is formed of an intensity signal corresponding to one of the colors of R, G, B, and E in each pixel, that is, an intensity signal of a periodic pattern of an arrangement (for example, the four-color mosaic arrangement described with reference to FIG. 3) determined by the color filter used for the CCD image sensor 213.

The white-balance adjustment section 251 performs a process for multiplying an appropriate coefficient according to the color possessed by each pixel intensity (white-balance adjustment process) on the mosaic image so that the color balance of the achromatic subject area becomes an achromatic color. The gamma correction section 252 makes gamma correction on each pixel intensity of the mosaic image whose white balance is adjusted. A numerical value of "gamma (γ)" is used to represent the response characteristics of the gradation of the image. Gamma correction refers to a correction process for correctly displaying the brightness and the chromaticity of the color of the image displayed on the display section 220. For outputting a signal to the display section 220, by applying a specific voltage to each pixel, the brightness and the color of the image are reproduced. However, regarding the brightness and the color of the image, even if the input voltage is increased two times as high, the brightness of the CRT does not become twice as high (non-linear characteristics are possessed) due to the characteristics (gamma value) possessed by the display section 220. Therefore, the gamma correction section 252 performs a correction process so that the brightness and the color of the image displayed on the display section 220 are correctly displayed.

By statistically computing color distribution shape, the demosaic processing section 253 performs a demosaic process for making the intensities of the four colors of R, G, B, and E to be available at each pixel position of the gamma-corrected mosaic image is made. Therefore, the signals output from the demosaic processing section 253 become four image signals corresponding to the four colors of R, G, B, and E. The YC transform section 254 generates a Y image and a C image (YCbCr image signal) by performing, on the four-channel image of R, G, B, and E, a matrix process and band limitation on chromaticity components, and outputs the images.

In the signal processing processor 242 of the DSP block 216, prior to the demosaic process by the demosaic processing section 253, gamma correction is performed by the gamma correction section 252. The reason for this is that, as a result of performing a demosaic computation in a non-linear pixel intensity space on which gamma correction is performed, the reliability of the demosaic process by the demosaic processing section 253 can be improved.

For example, when the input image is a high-contrast contour area, the color distribution spreads to a very bright intensity area and a very dark intensity area. Physically, the object reflected light becomes such that variations of the object surface are multiplied by the incident light intensity from illumination. As a result, in a linear pixel intensity space proportional to the intensity of the incident light to a camera, the distribution of the object color in a bright intensity area spreads sparsely, and the distribution of the object color in a dark pixel intensity area does not spread much and shrinks in a compact manner.

In the demosaic processing section 253, by statistically computing the color distribution shape, a demosaic process is performed. However, in a high-contrast contour area, the spread of the pixel intensity in a bright area greatly differs from the spread of the pixel intensity in a dark area, and a statistical linear regression becomes difficult to apply. Therefore, prior to the demosaic process in the demosaic processing section 253, by performing a non-linear pixel intensity transform such as gamma correction on the input data, the dark pixel intensity area is lifted (brought closer to the bright pixel intensity area), so that the variance of the pixel intensity is suppressed to some extent. Thus, the reliability of the linear regression process performed in the demosaic processing section 253 can be improved.

For the non-linear transform applied for such a purpose, a power transform using an exponent smaller than 1 as in gamma correction is preferable. However, even with a transform such that a power part and a linear part are combined as in sRGB, which is usually used in a color profile, as long as the non-linear transform can be regarded as that which is the same as an approximate power function, any non-linear transform may be used. Furthermore, of course, the non-linear transform may be omitted, and a non-linear transform process such as gamma correction may be performed after a demosaic process.

Figure 5:
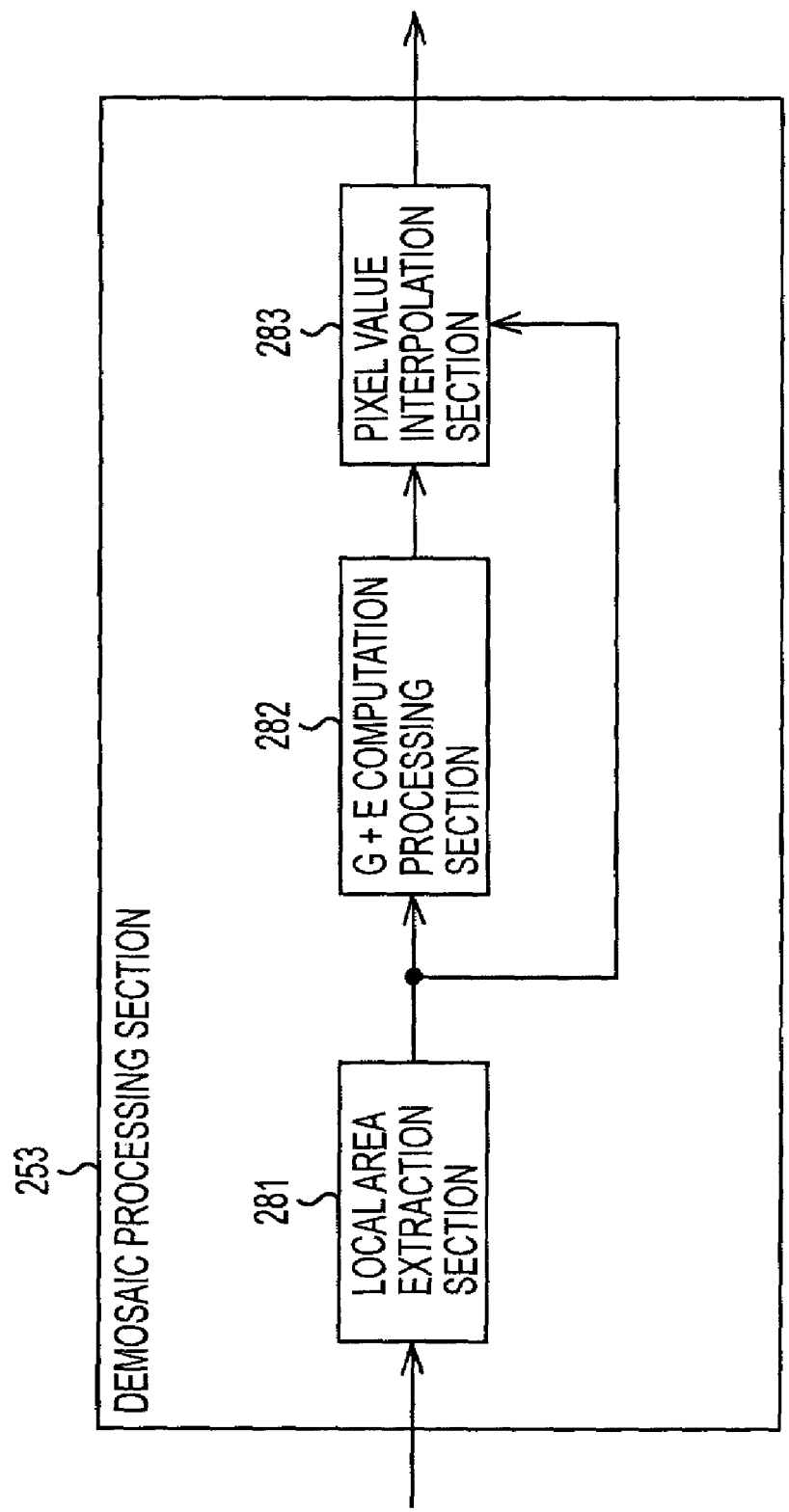
FIG. 5 is a block diagram showing the configuration of a demosaic processing section of FIG. 4.

FIG. 5 is a block diagram showing further detail of the configuration of the demosaic processing section 253 of FIG. 4, for performing a demosaic process, which is a process for sequentially interpolating or estimating, for each pixel position, the intensity of a color which does not exist in that pixel position so that the four colors of RGBE exist at the positions of all the pixels.

The demosaic processing section 253 is provided with a local area extraction section 281, a G+E computation processing section 282, and a pixel value interpolation section 283. The local area extraction section 281 extracts pixels of a local area of a predetermined size around the position of the pixel of interest from the gamma corrected mosaic image. Here, the local area to be extracted is assumed as a rectangular area of 7×7 pixels with the position of the pixel of interest being the center. The G+E computation processing section 282 computes G+E at the position of the pixel of interest by using the pixels that exist within the local area. The pixel value interpolation section 283 interpolates the four colors of RGBE in all the pixels by using G+E.

Figure 6:
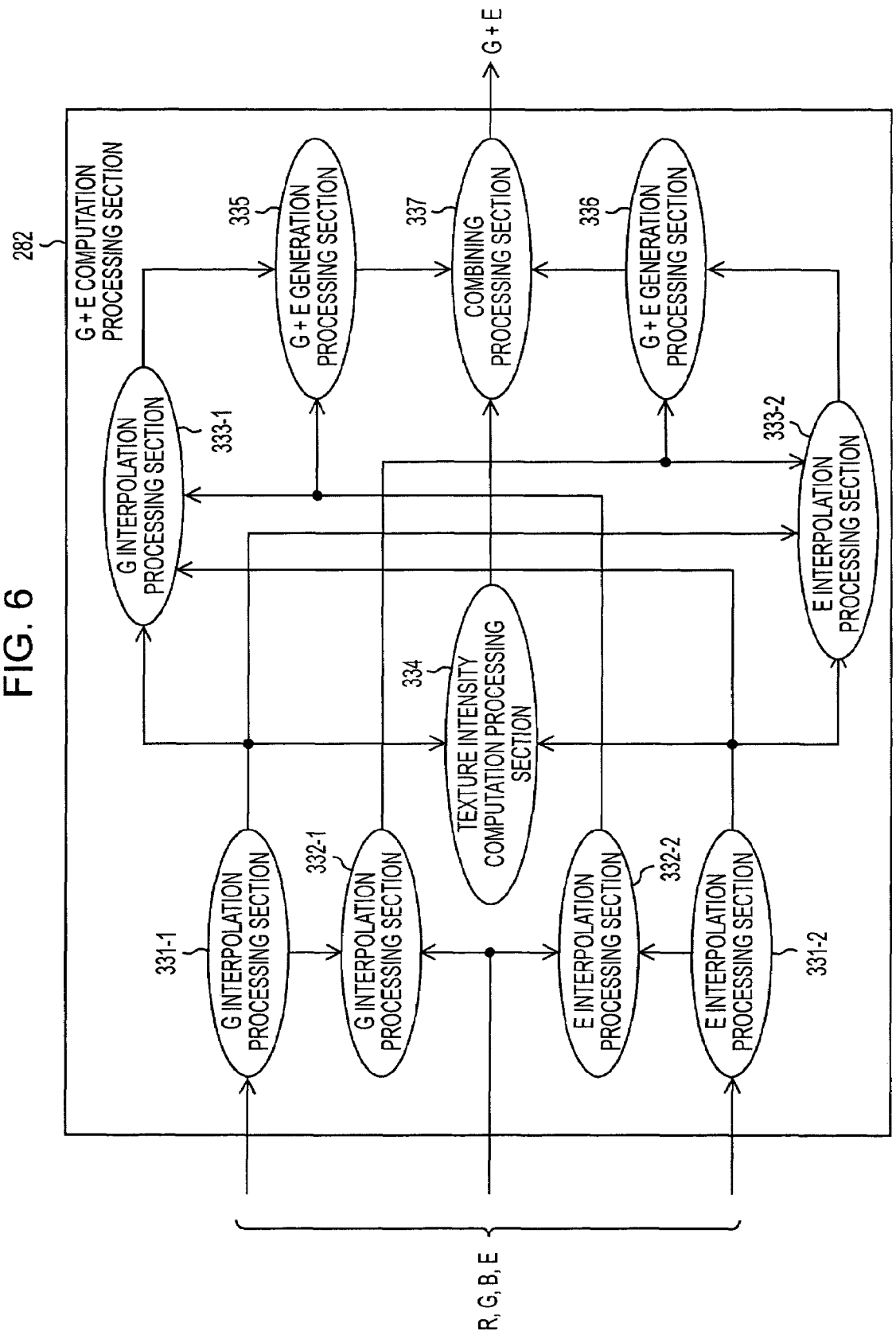
FIG. 6 is a block diagram showing the configuration of a G+E computation processing section of FIG. 5.

FIG. 6 is a block diagram showing an example of the detailed configuration of the G+E computation processing section 282 of FIG. 5. The G+E computation processing section 282 includes a G interpolation processing section 331-1, an E interpolation processing section 331-2, a G interpolation processing section 332-1, an E interpolation processing section 332-2, a G interpolation processing section 333-1, an E interpolation processing section 333-2, a texture-intensity computation processing section 334, a G+E generation processing section 335, a G+E generation processing section 336, and a combining processing section 337. In this configuration, by using the R, G, and E signals in a mosaic form, G+E is generated in the R pixel. Here, a regression estimation is used to estimate color components.

The G interpolation processing section 331-1 computes a simplified interpolation value GA of G at all the positions of the pixels in the neighborhood of the R pixel of interest, and similarly, the E interpolation processing section 331-2 computes an interpolation value EA of E. The texture-intensity computation processing section 334 computes a texture intensity $T_H$ (change intensity) in the horizontal direction and a texture intensity $T_V$ (change intensity) in the vertical direction at the position of the R pixel by using the interpolation values GA and EA obtained by the G interpolation processing section 331-1 and the E interpolation processing section 331-2. The G interpolation processing section 332-1 computes a second interpolation value GF of G by using the horizontally adjacent interpolation value GA and the signal R, and the E interpolation processing section 332-2 computes a second interpolation value EF of E by using the vertically adjacent interpolation value EA and the signal R. Furthermore, the G interpolation processing section 333-1 computes a third interpolation value GU of G by using the interpolation values GA, EA, and EF, and the E interpolation processing section 333-2 computes a third interpolation value EU of E by using the interpolation values GA, EA, and GF at the position of the R pixel.

The G+E generation processing section 335 computes $(G+E)_V$ by combining the interpolation values GU and EF, and the G+E generation processing section 336 computes $(G+E)_H$ by combining the interpolation values GF and EU. The combining processing section 337 determines the signal G+E at the position of the R pixel by using two values of G+E, that is, $(G+E)_V$ and $(G+E)_H$, and the texture intensities $T_H$ and $T_V$.

In the foregoing description, a description is given of a case in which G+E is generated in the R pixel by using the signals of R, G, and E in a mosaic form. For the process of generating G+E in the B pixel, it can be obtained by changing R to B, changing G to E, and changing E to G in the foregoing description. The description of the method of generating G+E in the G and E pixels is omitted here because the pixel value of one of G and E is known in advance and sufficient accuracy can be obtained even with a simple interpolation method.

Figure 7:
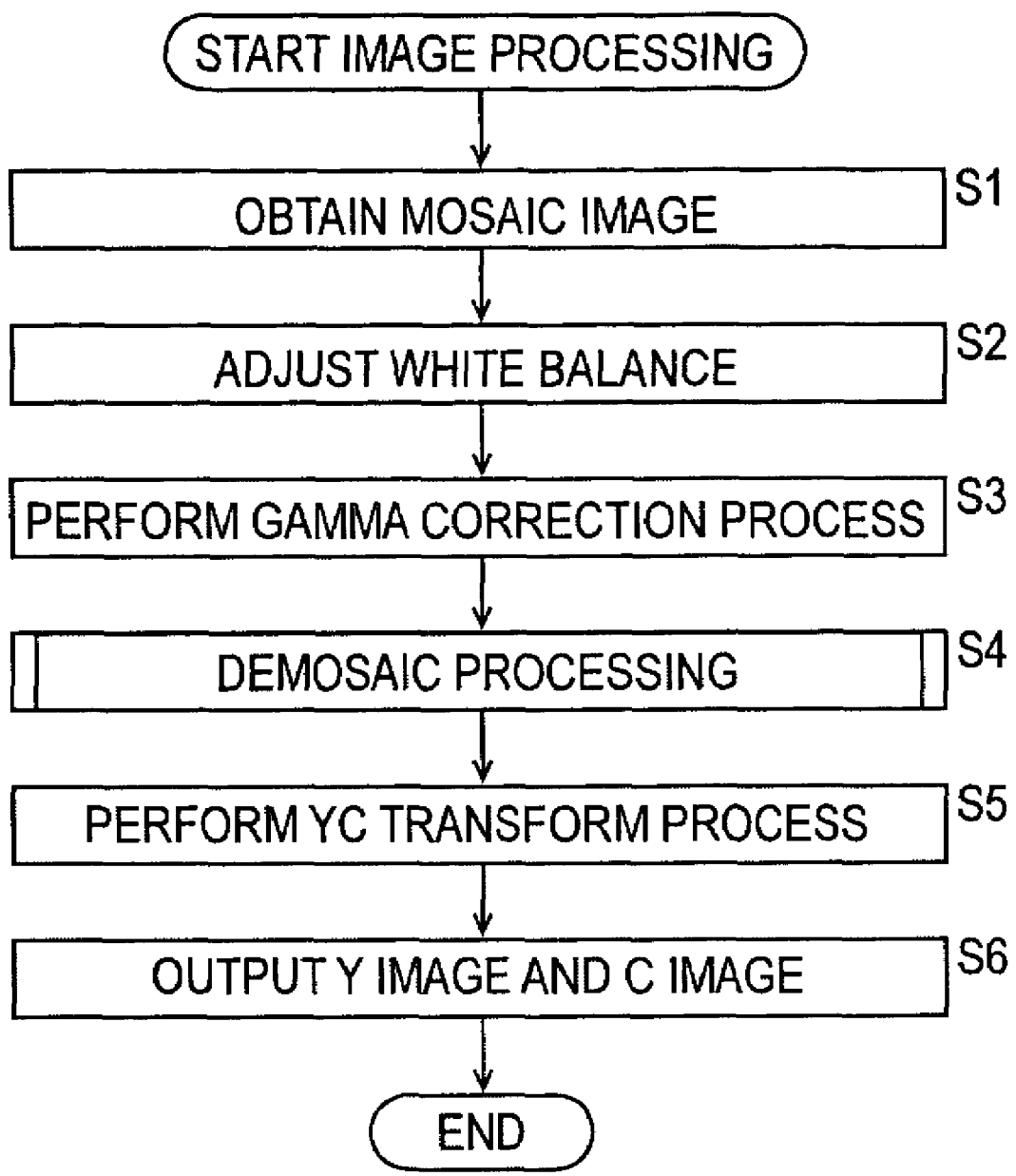
FIG. 7 is a flowchart illustrating image processing performed by a DSP block of FIG. 4.

Next, referring to the flowchart in FIG. 7, the processing of the DSP block 216 of FIG. 4 is described below.

In step S1, the RAM 241 for images obtains a mosaic image made up of intensity signals of a periodic pattern of an arrangement (for example, a four-color arrangement described with reference to FIG. 3) determined by color filters used in the CCD image sensor 213, and temporarily stores the mosaic image.

In step S2, the white-balance adjustment section 251 of the signal processing processor 242 performs a white-balance adjustment process, which is a process for multiplying an appropriate coefficient according to the color possessed by each pixel intensity, on the mosaic image so that the color balance of the achromatic subject area becomes an achromatic color.

In step S3, the gamma correction section 252 makes gamma correction on each pixel intensity of the white-balanced mosaic image so that the brightness and the chromaticity of the color of the image to be displayed on the display section 220 are correctly displayed.

Figure 8:
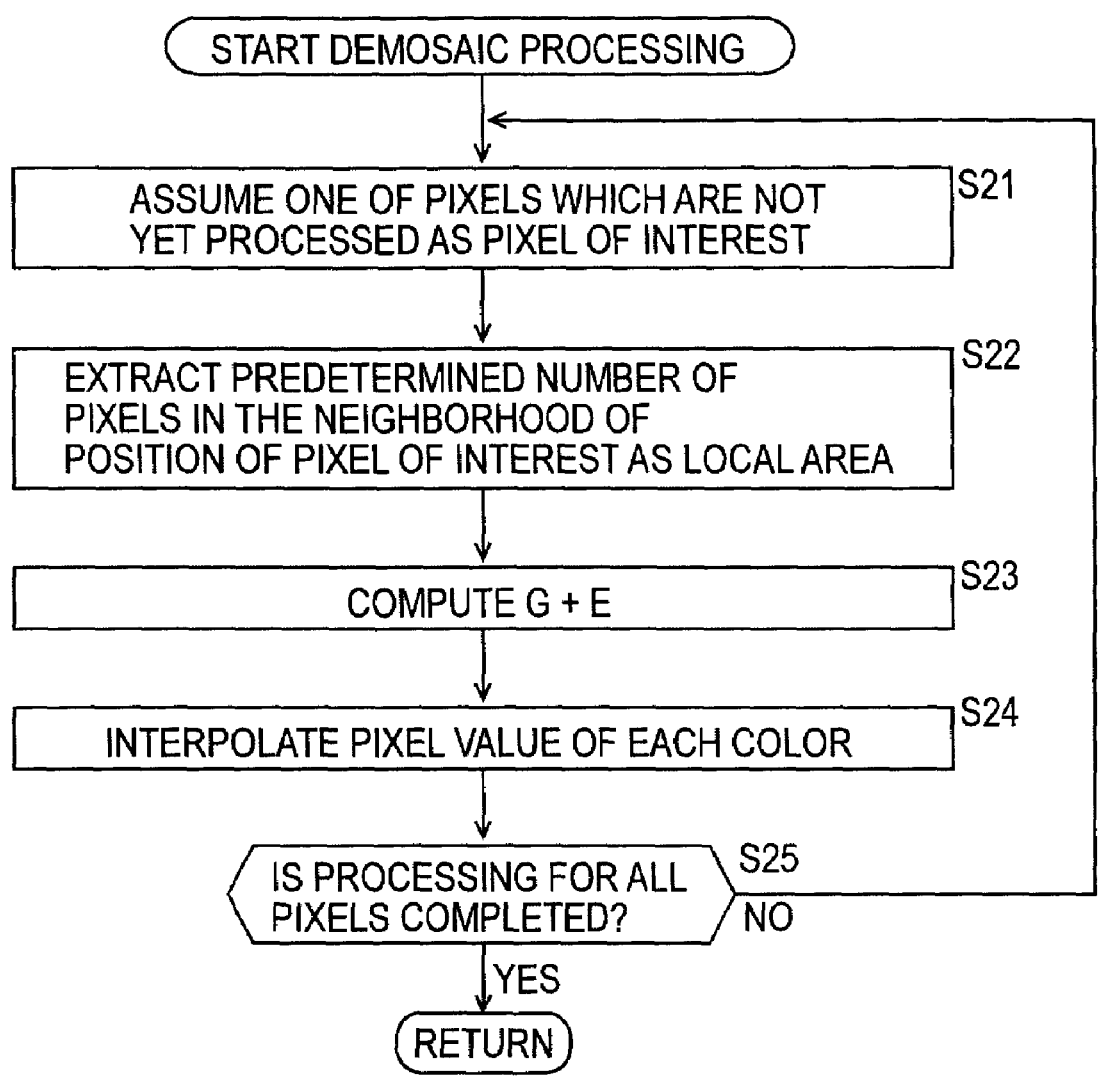
FIG. 8 is a flowchart illustrating demosaic processing.

In step S4, the demosaic processing section 253 performs a demosaic process to be described later with reference to FIG. 8.

In step S5, the YC transform section 254 performs a YC transform by performing a matrix process and band limitation on chromaticity components on a four-channel image of R, G, B, and E, which is output from the demosaic processing section 253, thereby generating a Y image and a C image. In step S6, the YC transform section 254 outputs the generated Y image and C image, and the processing is completed.

As a result of such processing, the DSP block 216 generates a Y image and a C image by performing various processing on the supplied mosaic image signal. When the image data is to be displayed on the display section 220 under the control of the CPU 223, the image data is supplied to the D/A converter 218, and when the image data is to be stored in the memory 222 under the control of the CPU 223, the image data is supplied to the codec processing section 221.

Next, referring to the flowchart in FIG. 8, a description is given below of a demosaic process performed in step S4 of FIG. 7.

In step S21, the local area extraction section 281 assumes one of the pixels which are not yet processed as a pixel of interest. In step S22, the local area extraction section 281 extracts a predetermined number of pixels in the neighborhood of the position of the pixel of interest (a sufficient number including a pixel area required for the subsequent processing) as a local area, and supplies the local area to the G+E computation processing section 282 and the pixel value interpolation section 283.

In step S23, the G+E computation processing section 282 performs a G+E computation process, which will be described later with reference to the flowchart in FIG. 9, and supplies the computed G+E to the pixel value interpolation section 283.

In step S24, the pixel value interpolation section 283 interpolates the pixel value of each color by using G+E.

In step S25, the local area extraction section 281 determines whether or not the processing is completed in all the pixels. When it is determined in step S25 that the processing is not completed in all the pixels, the process returns to step S21, and the processing of step S21 and subsequent steps is performed again. When it is determined in step S25 that the processing is completed in all the pixels, the process proceeds to step S5 of FIG. 7.

In other words, when the position of a particular pixel of interest is determined, each section making up the demosaic processing section 253 performs each process at the position of the pixel of interest. When the processing of steps S21 to S24 is completed in all the pixels, the processing is terminated.

Next, referring to the flowchart in FIG. 9, a description is given below of a G+E computation process performed in step S23 of FIG. 8. This process is performed by the G+E computation processing section 282 of FIG. 6.

In step S51, the G interpolation processing section 331-1 performs a first G interpolation process. The details thereof will be described later with reference to FIGS. 10 and 11.

In step S52, the E interpolation processing section 331-2 performs a first E interpolation process. The details thereof will be described later with reference to FIGS. 10 and 11.

In step S53, the texture-intensity computation processing section 334 performs a correction texture intensity computation process. The details thereof will be described later with reference to FIG. 12.

In step S54, the G interpolation processing section 332-1 performs a second G interpolation process. The details thereof will be described later with reference to FIG. 20.

In step S55, the E interpolation processing section 332-2 performs a second E interpolation process. The details thereof will be described later with reference to FIG. 20.

In step S56, the G interpolation processing section 333-1 performs a third G interpolation process. The details thereof will be described later with reference to FIG. 31.

In step S57, the E interpolation processing section 333-2 performs a third E interpolation process. The details thereof will be described later with reference to FIG. 31.

In step S58, the G+E generation processing section 335 performs a first G+E generation process. The details thereof will be described later with reference to FIG. 34.

In step S59, the G+E generation processing section 336 performs a second G+E generation process. The details thereof will be described later with reference to FIG. 35.

In step S60, the combining processing section 337 performs a combining process. The details thereof will be described later with reference to FIG. 36.

Figure 9:
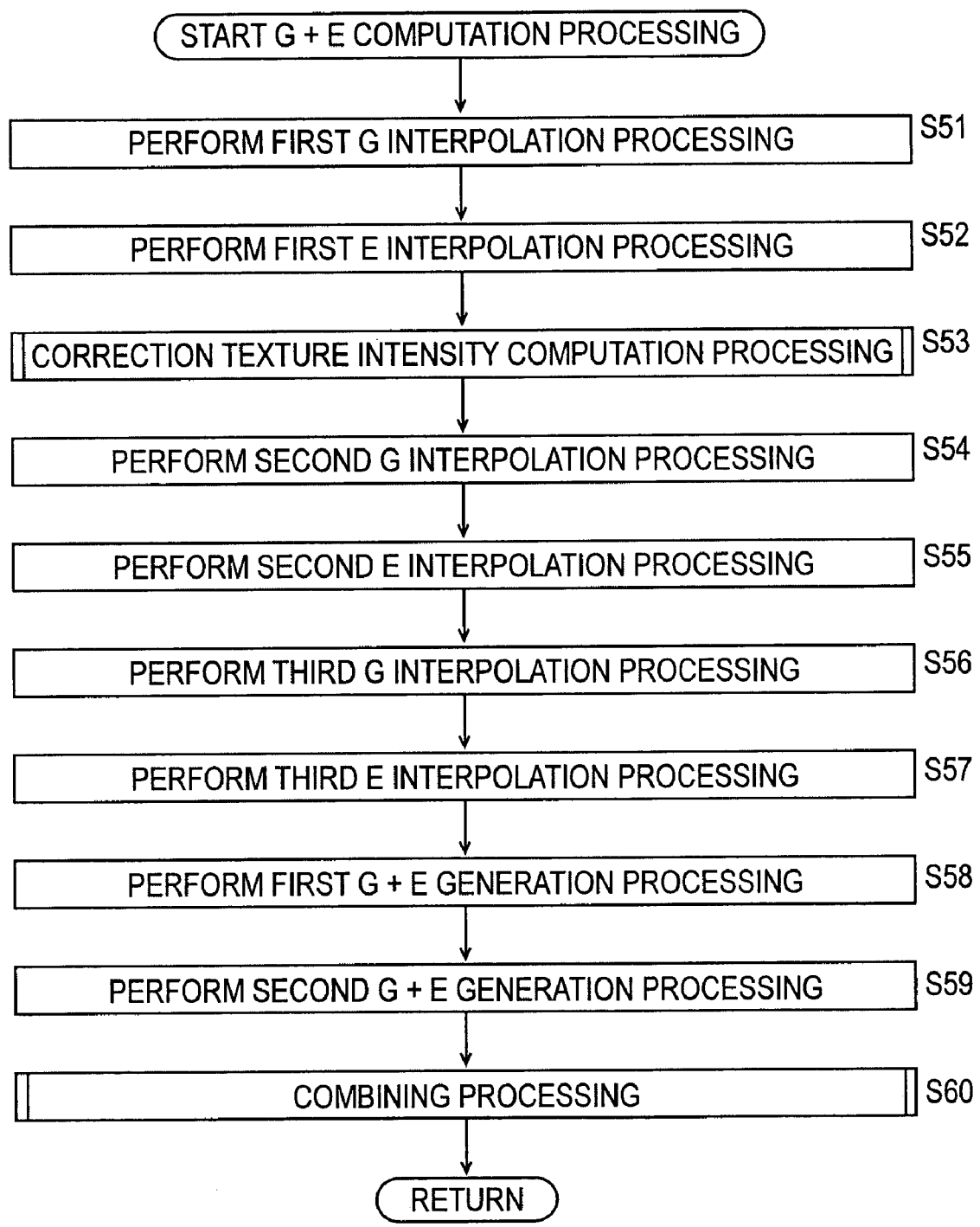
FIG. 9 is a flowchart illustrating a G+E computation process.

As a result of the processing of FIG. 9, based on the R, G, and E signals in a mosaic form, G+E is generated in the R pixel.

Figure 10:
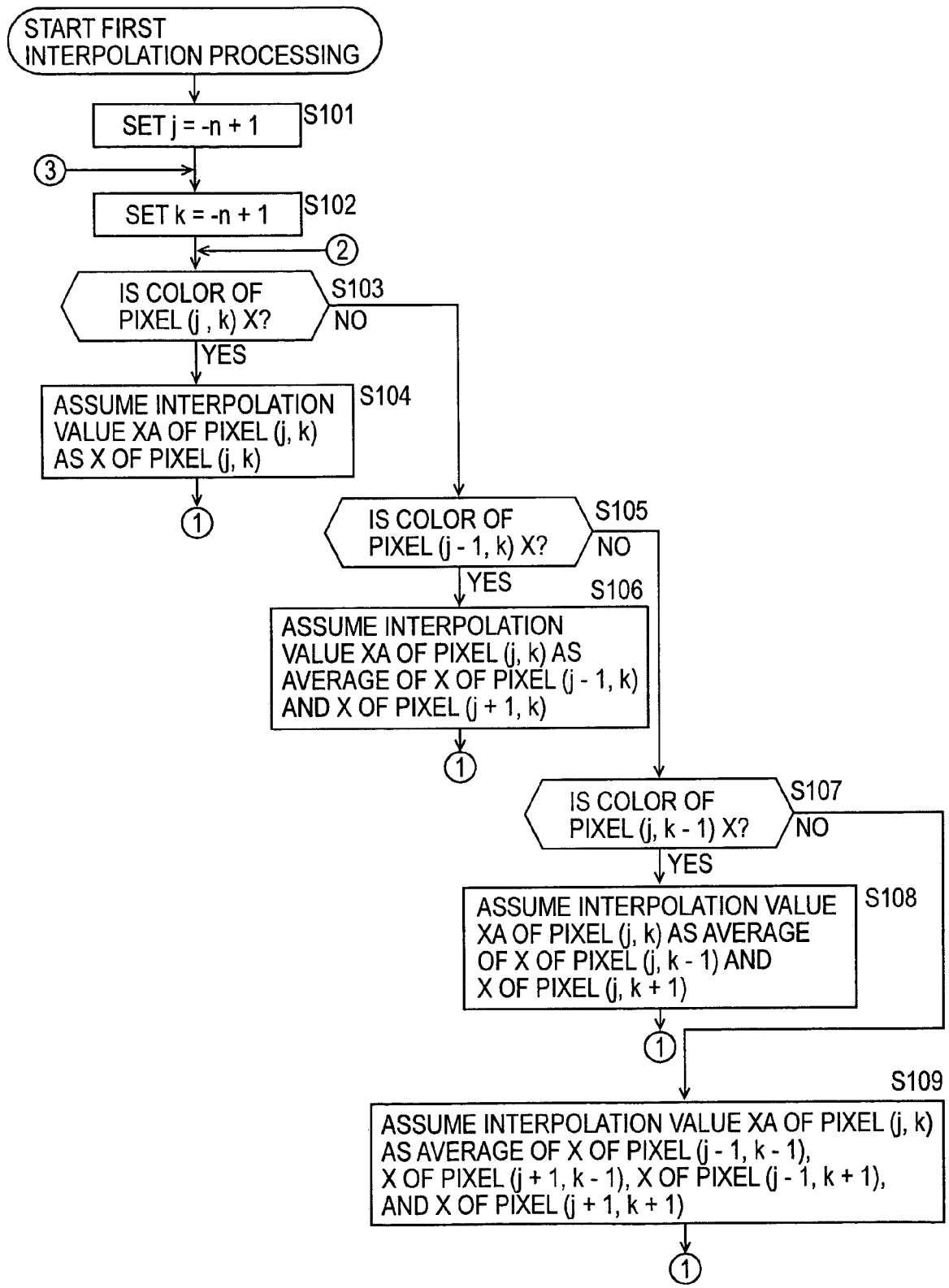
FIG. 10 is a flowchart illustrating a first interpolation process.
Figure 11:
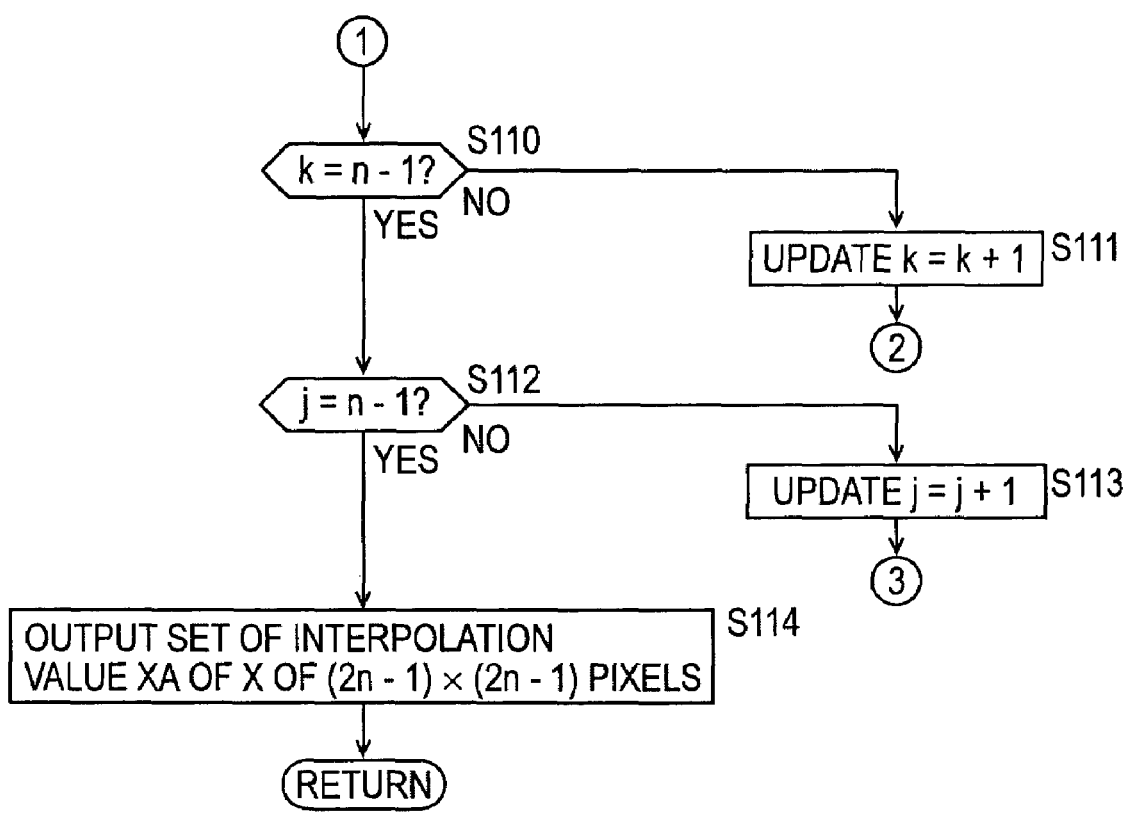
FIG. 11 is a flowchart illustrating the first interpolation process.

Next, referring to the flowcharts in FIGS. 10 and 11, a description is given below of a first interpolation process (a first G interpolation process and a first E interpolation process) performed in steps S51 and S52 of FIG. 9, respectively. Since identical processing is performed on each of G and E, the portions indicated as X in FIGS. 10 and 11 can be changed to G or E as appropriate. More specifically, when processing of FIGS. 10 and 11 is a process corresponding to step S51, it is a process performed by the G interpolation processing section 331-1. When processing of FIGS. 10 and 11 is a process corresponding to step S52, it is a process performed by the E interpolation processing section 331-2.

In step S101, the G interpolation processing section 331-1 or the E interpolation processing section 331-2 initializes the value j of the first register, which indicates the pixel position within the local area, at which processing is performed in order to set j=−n+1. In step S102, the G interpolation processing section 331-1 or the E interpolation processing section 331-2 initializes the value k of the second register, which indicates the pixel position within the local area, at which processing is performed, in order to set k=−n+1. Here, processing is performed on a group of (2n+1)×(2n+1) pixels with the pixel (0, 0) being the center. n is a positive integer, and (j, k) indicates the pixel position at which processing is performed when the center in the local area (the position of the pixel of interest) is set as (0, 0). The value of n can be regarded as an arbitrary constant required for processing. Therefore, when this embodiment is to be implemented, such meticulous setting of register values can be omitted. In particular, if n is a sufficiently large value, it is considered that, substantially the same result can be obtained. This applies the same for n', n", and n'''.

In step S103, the G interpolation processing section 331-1 or the E interpolation processing section 331-2 determines whether or not the pixel (j, k) is X. Here, when the G interpolation processing section 331-1 is performing this process, X is changed to G, and when the E interpolation processing section 331-2 is performing this process, X is changed to E (the same applies hereinafter.). Since the above-described four-color filter arrangement shown in FIG. 3 is known, in this process, the color can be determined using the pixel position.

When it is determined in step S103 that the color of the pixel (j, k) is X, in step S104, the G interpolation processing section 331-1 or the E interpolation processing section 331-2 assumes the interpolation value XA of the pixel (j, k) as the color X of the pixel (j, k). That is, when it is determined that the color at the position of the processing pixel is X, the signal as is is used because interpolation needs not to be performed.

When it is determined in step S103 that the pixel (j, k) is not X, in step S105, the G interpolation processing section 331-1 or the E interpolation processing section 331-2 determines whether or not the color of the pixel (j−1, k) is X.

When it is determined in step S105 that the color of the pixel (j−1, k) is X, in step S106, the G interpolation processing section 331-1 or the E interpolation processing section 331-2 assumes the interpolation value XA of the pixel (j, k) as the average value of the color X of the pixel (j−1, k) and the color X of the pixel (j+1, k). That is, when it is determined that the color of the horizontally adjacent pixel is X, interpolation is performed from the left and right.

When it is determined in step S105 that the color of the pixel (j−1, k) is not X, in step S107, the G interpolation processing section 331-1 or the E interpolation processing section 331-2 determines whether or not the color of the pixel (j, k−1) is X. When it is determined that the color of the pixel (j, k−1) is X, in step S108, the interpolation value XA of the pixel (j, k) is assumed as the average of the color of the pixel (j, k−1) and the color of the pixel (j, k+1). That is, when it is determined that the color of the vertically adjacent pixel is X, interpolation is performed from the above and below.

When it is determined in step S107 that the color of the pixel (j, k−1) is not X, in step S109, the G interpolation processing section 331-1 or the E interpolation processing section 331-2 assumes the interpolation value XA of the pixel (j, k) as the average of the color of the pixel (j−1, k−1), the color of the pixel (j+1, k−1), the color of the pixel (j−1, k+1), and the color of the pixel (j+1, k+1). That is, when it is determined that the pixel (j, k), the pixel (j−1, k), and the pixel (j, k−1) are not X, interpolation is performed from the upper left, the upper right, the lower left, and the lower right.

After the process of step S104, step S106, step S108, or step S109, in step S110, the G interpolation processing section 331-1 or the E interpolation processing section 331-2 determines whether or not k=n−1 by referring to the value k of the second register. When it is determined in step S110 that k≠n−1, the G interpolation processing section 331-1 or the E interpolation processing section 331-2 updates the value k of the second register to k=k+1. The process then returns to step S103, and the processing of step S103 and subsequent steps is performed again.

When it is determined in step S110 that k=n−1, in step S112, the G interpolation processing section 331-1 or the E interpolation processing section 331-2 determines whether or not j=n−1 by referring to the value j of the first register, which indicates the pixel position at which processing is performed. When it is determined in step S112 that j≠n−1, in step S113, the G interpolation processing section 331-1 or the E interpolation processing section 331-2 updates the value j of the first register to j=j+1. Thereafter, the process returns to step S102, and the processing of step S102 and subsequent steps is performed again.

When it is determined in step S112 that j=n−1, in step S114, the G interpolation processing section 331-1 or the E interpolation processing section 331-2 outputs a set of interpolation values XA of X of (2n−1)×(2n−1) pixels. The process then proceeds to step S52 or S53 of FIG. 9.

The processing of FIGS. 10 and 11 is summarized below. The G interpolation processing section 331-1 or the E interpolation processing section 331-2 determines the color at the position of the processing pixel or at the position of the pixel adjacent thereto, and computes the interpolation value XA of X by a linear interpolation by handling these cases separately by each section. That is, as a result of the processing of FIGS. 10 and 11, the interpolation value XA of X (G or E) can be computed. In other words, as a result of the processing of FIGS. 10 and 11, the interpolation value GA of G and the interpolation value EA of E are computed.

Next, referring to the flowchart in FIG. 12, a description is given below of a correction texture-intensity computation process performed in step S53 of FIG. 9. This process is performed by the texture-intensity computation processing section 334 of FIG. 6.

In step S151, the texture-intensity computation processing section 334 performs a texture intensities $T_H$ and $T_V$ computation process. The details of this process will be described later with reference to FIG. 13.

In step S152, the texture-intensity computation processing section 334 performs a weighted average value $M_{TH}$ computation process. The details of this process will be described later with reference to FIG. 14.

In step S153, the texture-intensity computation processing section 334 performs a weighted average deviation $S_{TH}$ computation process. The details of this process will be described later with reference to FIG. 16.

In step S154, the texture-intensity computation processing section 334 performs a texture intensities $T_H$ and $T_V$ correction process. The details of this process will be described later with reference to FIG. 17. The process thereafter proceeds to step S54 of FIG. 9.

Figure 12:
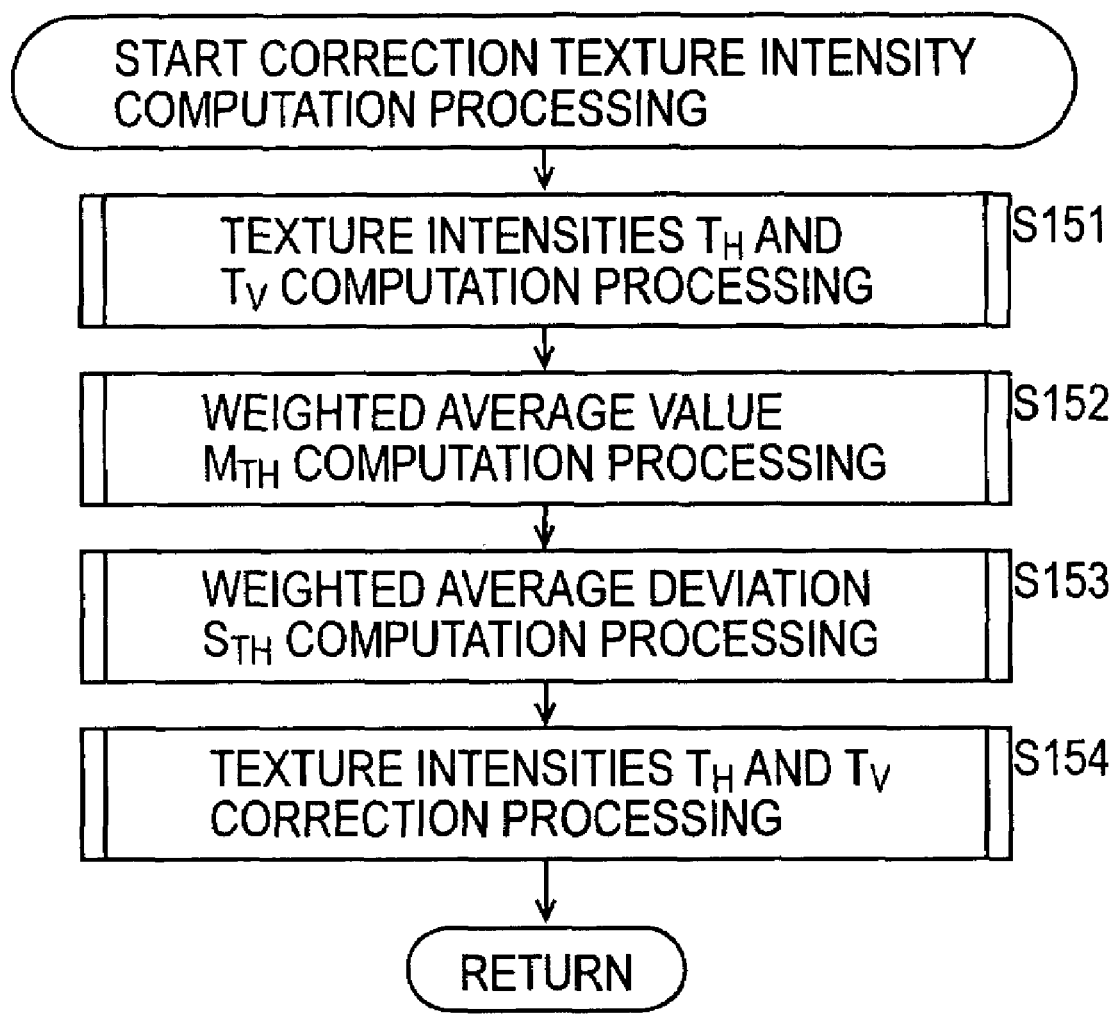
FIG. 12 is a flowchart illustrating a correction texture intensity computation process.

As a result of the processing of FIG. 12, the corrected texture intensities $T_H$ and $T_V$ are computed.

Next, referring to the flowchart in FIG. 13, a description is given below of the details of a texture intensities $T_H$ and $T_V$ computation process performed in step S151 of FIG. 12. This is a process for computing texture intensities $T_H$ and $T_V$ using GA and EA at a total of five places at the position of the pixel of interest and at the positions above, below, to the right, and to the left thereof. n' is a positive integer.

In step S201, the texture-intensity computation processing section 334 initializes the value j' of the first register, which indicates the position of the pixel among the pixels of the supplied local area, at which processing is performed, in order to set j'=−n'. In step S202, the texture-intensity computation processing section 334 initializes the value k' of the second register, which indicates the position of the pixel among the pixels of the supplied local area, at which processing is performed, in order to set k'=−n'. (j', k') indicates the pixel position at which processing is performed when the center (the position of the pixel of interest) in the local area is set as (0, 0).

In step S203, the texture-intensity computation processing section 334 computes a horizontal gradient evaluation value dH using equation (1) and a vertical gradient evaluation value dV using equation (2). That is, the texture-intensity computation processing section 334 calculates GA+EA at each pixel position, and computes, as a horizontal gradient evaluation value dH, the sum of the absolute values of the horizontal gradient values, which are obtained by performing subtraction between the position of the pixel of interest and the position to the left thereto and between the position of the pixel of interest and the position to the right thereto, and computes, as a vertical gradient evaluation value dV, the sum of the absolute values of the vertical gradient values, which are obtained by performing subtraction between the position of the pixel of interest and the position below it and between the position of the pixel of interest and position above it.

$$dH = |GA(j'-1, k')+EA(j'-1, k')-(GA(j', k')+EA(j', k'))| + |GA(j'+1, k')+EA(j'+1, k')-(GA(j', k')+EA(j', k'))| \quad (1)$$

$$dV = |GA(j', k'-1)+EA(j', k'-1)-(GA(j', k')+EA(j', k'))| + |GA(j', k'+1)+EA(j', k'+1)-(GA(j', k')+EA(j', k'))| \quad (2)$$

In step S204, the texture-intensity computation processing section 334 determines whether or not the horizontal gradient evaluation value dH>the vertical gradient evaluation value dV. When it is determined that dH>dV, in step S205, the texture-intensity computation processing section 334 sets the texture intensity $T_H$ of the pixel (j', k') to 0 and sets the texture intensity $T_V$ of the pixel (j', k') to 1.

When it is determined in step S204 that it is not that dH>dV, in step S206, the texture-intensity computation processing section 334 sets the texture intensity $T_H$ of the pixel (j', k') to 1 and sets the texture intensity $T_V$ of the pixel (j', k') to 0.

After the process of step S205 or S206, the process proceeds to step S207, where the texture-intensity computation processing section 334 determines whether or not k'=n' by referring to the value k' of the second register. When it is determined in step S207 that k'≠n', in step S208, the texture-intensity computation processing section 334 updates the value k' of the second register to k'=k'+1. The process then returns to step S203, and the processing of step S203 and subsequent steps is performed again.

When it is determined in step S207 that k'=n', in step S209, the texture-intensity computation processing section 334 determines whether or not j'=n' by referring to the value j' of the first register, which indicates the pixel position at which processing is performed. When it is determined in step S209 that j'≠n', in step S210, the texture-intensity computation processing section 334 updates the value j' of the first register to j'=j'+1. The process then returns to step S202, and the processing of step S202 and subsequent steps is performed again.

When it is determined in step S209 that j'=n', in step S211, the texture-intensity computation processing section 334 outputs a set of the texture intensities $T_H$ and $T_V$ of (2n'+1)×(2n'+1) pixels. The process then proceeds to step S152 of FIG. 12.

As a result of the processing of FIG. 13, texture intensities are computed using GA and EA at a total of five places at the position of the processing pixel and the positions above and below it and to the right and to the left.

Next, referring to the flowchart in FIG. 14, a description is given below of a weighted average value $M_{TH}$ computation process performed in step S152 of FIG. 12. This process is performed by the texture-intensity computation processing section 334 of FIG. 6.

In step S251, the texture-intensity computation processing section 334 initializes the weighted average value $M_{TH}$ to 0.

In step S252, the texture-intensity computation processing section 334 obtains a texture intensity $T_H$. The texture intensity $T_H$ is a value computed by the above-described processing of FIG. 13.

In step S253, the texture-intensity computation processing section 334 initializes the value j' of the first register, which indicates the position of the pixel among the pixels of the supplied local area, at which processing is performed, in order to set j'=−n'. In step S254, the texture-intensity computation processing section 334 initializes the value k' of the second register, which indicates the position of the pixel among the pixels of the supplied local area, at which processing is performed, in order to set k'=−n'.

In step S255, the texture-intensity computation processing section 334 computes $M_{TH}=M_{TH}+$the texture intensity $T_H$ of the pixel (j', k') to which a weight coefficient wi is assigned. That is, $M_{TH}$ to which is added the texture intensity $T_H$ of the pixel (j', k') to which a weight is assigned becomes a new $M_{TH}$.

This weight coefficient wi is a value which is set in advance by using the distance from the position of the i-th data to the pixel of interest as an index. For example, the weight coefficient wi can be set on a 7×7 local area, as shown in FIG. 15. The rectangles in the figure indicate the pixel positions, and the numerals within the rectangle indicate the weight coefficient of the data at the corresponding position. Of course, these weight coefficients are not limited to those shown in FIG. 15. However, as shown in FIG. 15, preferably, the closer to the pixel of interest, the greater the weight coefficient.

In step S256, the texture-intensity computation processing section 334 determines whether or not k'=n' by referring to the value k' of the second register. When it is determined in step S256 that k'≠n', in step S257, the texture-intensity computation processing section 334 updates the value k' of the second register to k'=k'+1. The process then returns to step S255, and the processing of step S255 and subsequent steps is performed again.

When it is determined in step S256 that k'=n', in step S258, the texture-intensity computation processing section 334 determines whether or not j'=n', by referring to the value j' of the first register, which indicates the pixel position at which processing is performed. When it is determined in step S258 that j'≠n', in step S259, the texture-intensity computation processing section 334 updates the value j' of the first register to j'=j'+1. The process then returns to step S254, and the processing of step S254 and subsequent steps is performed again.

When it is determined in step S258 that j'=n', in step S260, the texture-intensity computation processing section 334 computes $M_{TH}=M_{TH}/W$. The W is assumed to be the sum W of the weight coefficient wi.

In step S261, the texture-intensity computation processing section 334 outputs the weighted average value $M_{TH}$ of the texture intensity $T_H$. The process then proceeds to step S153 of FIG. 12.

Figure 14:
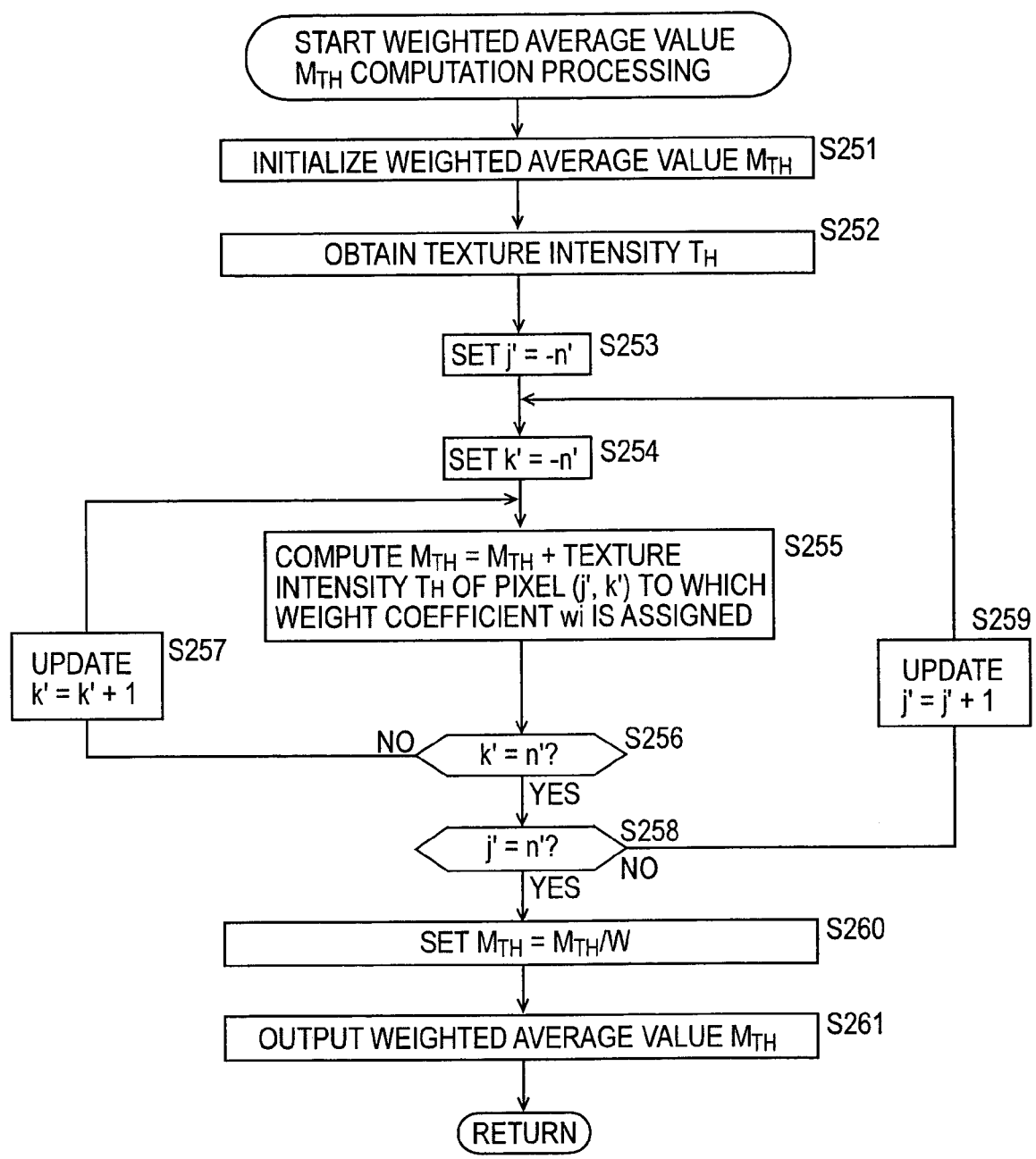
FIG. 14 is a flowchart illustrating a weighted average value $M_{TH}$ computation process.

As a result of the processing of FIG. 14, the weighted average value $M_{TH}$ of the texture intensity $T_H$ is computed.

Next, referring to the flowchart in FIG. 16, a description is given below of the details of a weighted average deviation $S_{TH}$ computation process performed in step S153 of FIG. 12. This process is performed by the texture-intensity computation processing section 334 of FIG. 6.

In step S301, the texture-intensity computation processing section 334 initializes the weighted average deviation $S_{TH}$ to 0.

In step S302, the texture-intensity computation processing section 334 obtains a texture intensity $T_H$. This texture intensity $T_H$ is a value computed by the above-described processing of FIG. 13.

In step S303, the texture-intensity computation processing section 334 obtains a weighted average value $M_{TH}$. This weighted average value $M_{TH}$ is a value computed by the above-described processing of FIG. 14.

In step S304, the texture-intensity computation processing section 334 initializes the value j' of the first register, which indicates the position of the pixel among the pixels of the supplied local area, at which processing is performed, in order to set j'=−n'. In step S305, the texture-intensity computation processing section 334 initializes the value k' of the second register, which indicates the position of the pixel among the pixels of the supplied local area, at which processing is performed, in order to set k'=−n'.

In step S306, the texture-intensity computation processing section 334 computes $S_{TH}=S_{TH}+|$the texture intensity $T_H$ of the pixel (j', k')−$(M_{TH})$ | to which the weight coefficient wi is assigned. That is, the value in which the absolute value of the value such that the weighted average $M_{TH}$ is subtracted from the texture intensity $T_H$ Of the pixel (j', k') is taken, to which the weight is assigned and $S_{TH}$ is added, becomes a new $S_{TH}$. This texture intensity $T_H$ is computed in the above-described processing of FIG. 13. The weight coefficient wi is identical to the above-described weight coefficient wi in FIG. 14.

In step S307, the texture-intensity computation processing section 334 determines whether or not k'=n' by referring to the value k' of the second register. When it is determined in step 307 that k'≠n', in step S308, the texture-intensity computation processing section 334 updates the value k' of the second register to k'=k'+1. The process then returns to step S306, and the processing of step S306 and subsequent steps is performed again.

When it is determined in step 307 that k'=n', in step S309, the texture-intensity computation processing section 334 determines whether or not j'=n' by referring to the value j' of the first register, which indicates the pixel position at which processing is performed. When it is determined in step S309 that j'≠n', in step S310, the texture-intensity computation processing section 334 updates the value j' of the first register to j'=j'+1. The process then returns to step S305, and the processing of step S305 and subsequent steps is performed again.

When it is determined in step S309 that j'=n', in step S311, the texture-intensity computation processing section 334 computes $S_{TH}=S_{TH}/W$. This W is assumed to be the sum W of the weight coefficient wi similarly to the above-described processing of FIG. 14.

In step S312, the texture-intensity computation processing section 334 outputs the weighted average deviation $S_{TH}$. The process then proceeds to step S154 of FIG. 12.

Figure 16:
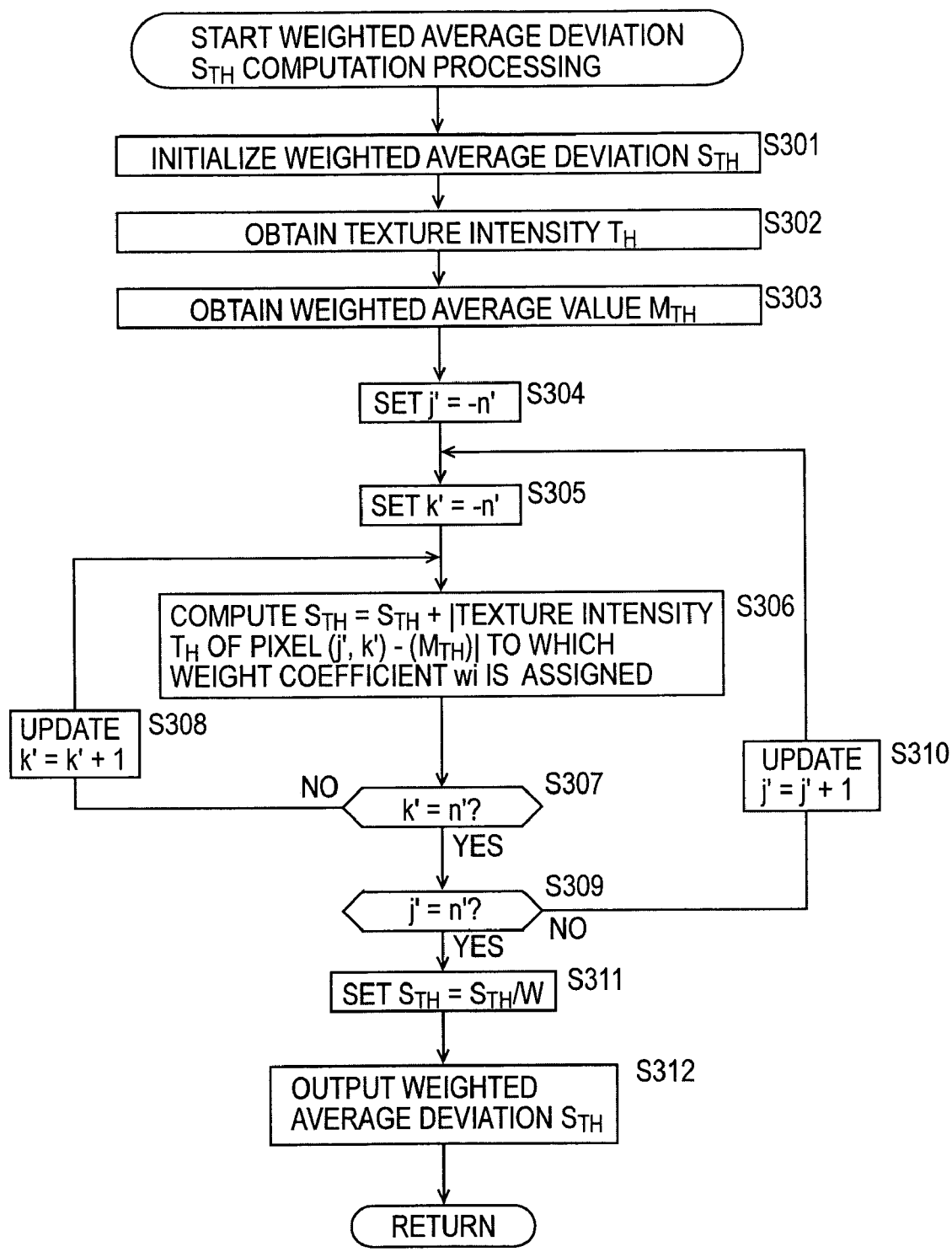
FIG. 16 is a flowchart illustrating a weighted average deviation $S_{TH}$ computation process.

As a result of the processing of FIG. 16, the weighted average deviation $S_{TH}$ of the texture intensity $T_H$ is computed.

Next, referring to the flowchart in FIG. 17, a description is given below of the details of a texture intensities $T_H$ and $T_V$ correction process performed in step S154 of FIG. 12. This process is performed by the texture-intensity computation processing section 334 of FIG. 6.

In step S351, the texture-intensity computation processing section 334 obtains a weighted average deviation $S_{TH}$. This weighted average deviation $S_{TH}$ is computed by the above-described processing of FIG. 16.

In step S352, the texture-intensity computation processing section 334 computes R as $S_{TH}$×the first constant. This first constant is a predetermined value determined empirically or experimentally.

In step S353, the texture-intensity computation processing section 334 determines whether or not R>1. When it is determined that R>1, in step S354, the texture-intensity computation processing section 334 sets R=1.

When it is determined in step S353 that it is not that R>1, that is, R≦1, the process of step S354 is skipped.

When it is determined in step S353 that it is not that R>1, or in step S355 after the process of step S354, the texture-intensity computation processing section 334 computes $T_H=T_H\times(1-R)+R/2$ and $T_V=T_V\times(1\times R)+R/2$. That is, the texture intensities $T_H$ and $T_V$ are corrected. Thereafter, the process of step S154 of FIG. 12 is completed, and the process proceeds to step S54 of FIG. 9.

Figure 17:
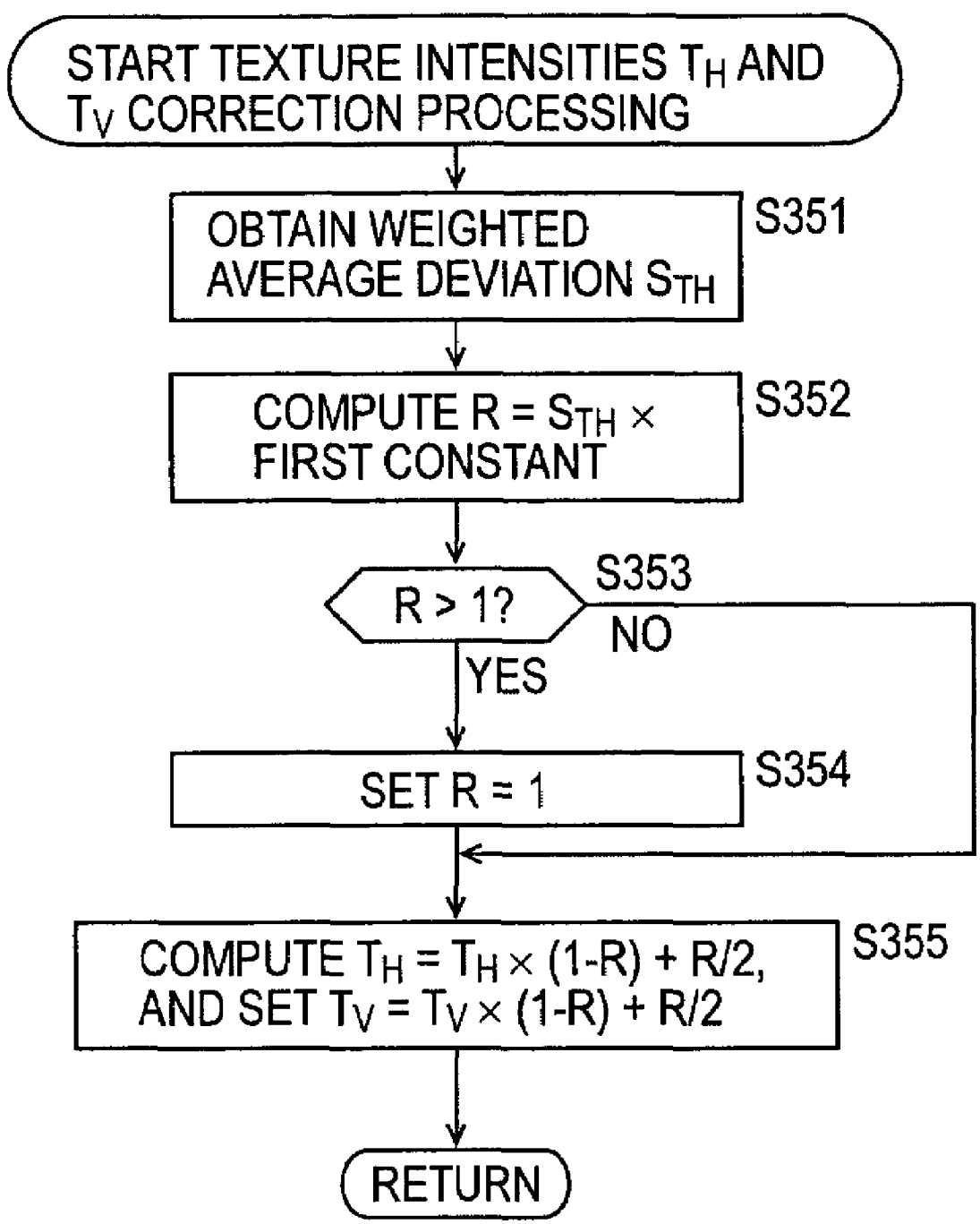
FIG. 17 is a flowchart illustrating a texture intensities $T_H$ and $T_V$ correction process.

As a result of the processing of FIG. 17, based on the weighted average deviation $S_{TH}$, the values of the texture intensities $T_H$ and $T_V$ are corrected.

Next, a description is given below of a second G interpolation process and a second E interpolation process, which are performed in steps S54 and S55 of FIG. 9, respectively. The difference from the G interpolation processing section 332-1 and the E interpolation processing section 332-2 of FIG. 6 lies in adjacent pixels used for processing, and the assignment of weights enables the switching as to which of the adjacent pixels in the vertical direction and in the horizontal direction should be used. For example, if the weights of FIG. 18 are used, a sample in the vertical direction is used, and if the weights of FIG. 19 are used, a sample in the horizontal direction is used. In this embodiment, a sample in the horizontal direction is used for the G interpolation processing section 332-1, and a sample in the vertical direction is used for the E interpolation processing section 332-2. The point that should be noted is that, just because the texture direction is in the vertical direction, vertically adjacent pixels are not always used for estimation. For example, in the technique used in this embodiment, in which a linear regression is used for the color distribution of the local area in order to estimate color components which are not known, there are cases in which, to obtain a color distribution appropriate for computing a regression line, use of adjacent pixels in a direction vertical to the texture direction enables better estimation results to be obtained. Even if any estimation method is used, two estimation values, that is, an estimation value having a high reliability with respect to the texture in the horizontal direction and an estimation value having a high reliability with respect to the texture in the vertical direction, need only be obtained depending on the difference in adjacent pixels used for estimation. In the following, the portions indicated as X and dir are changed to G and H in the process by the G interpolation processing section 332-1 and are changed to E and V in the process by the E interpolation processing section 332-2 as appropriate. The H and V given to represent the direction indicate the direction of the adjacent pixels used for an interpolation process.

Figure 20:
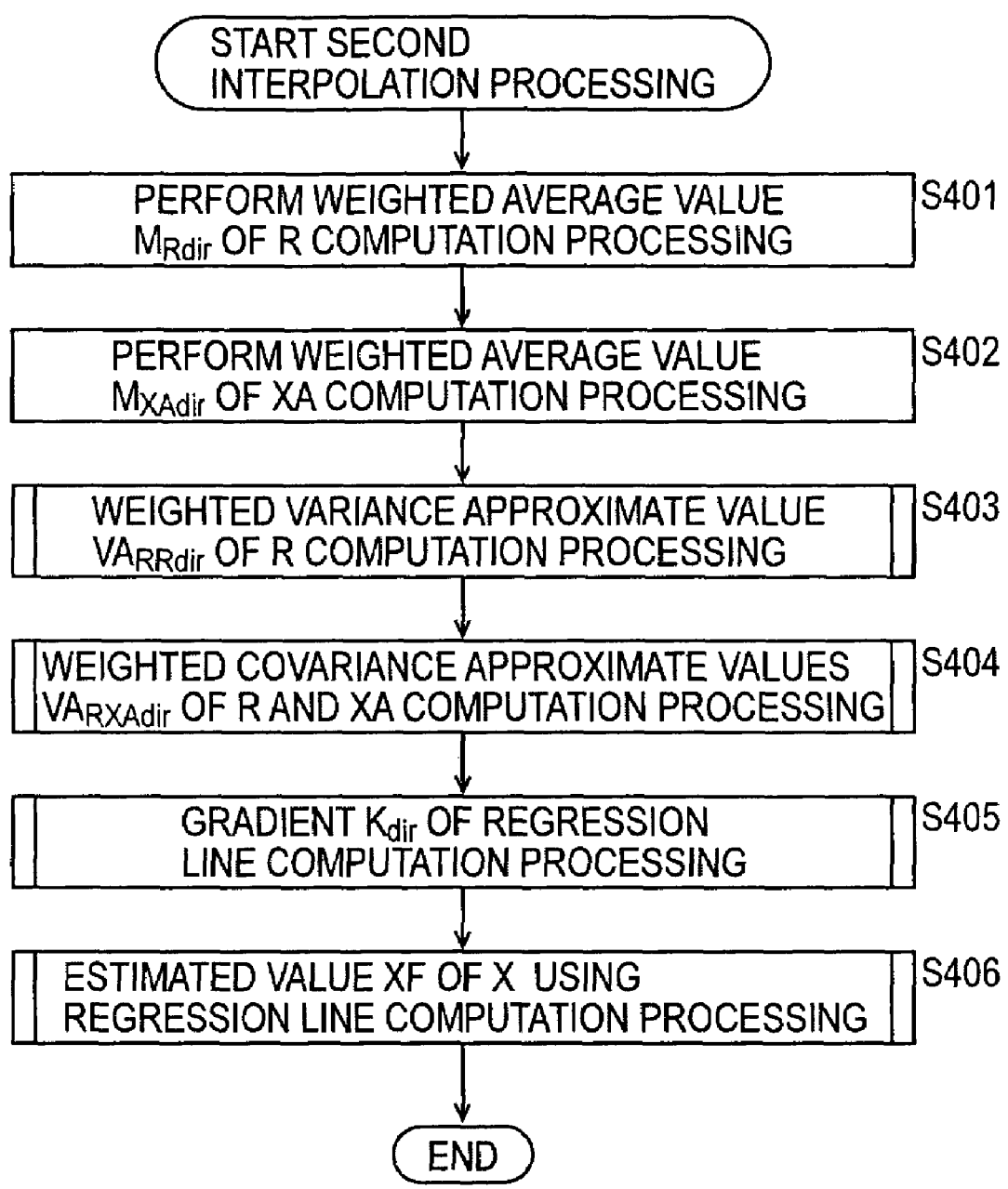
FIG. 20 is a flowchart illustrating a second interpolation process.

FIG. 20 is a flowchart illustrating a second interpolation process (a second G interpolation process and a second E interpolation process) performed in steps S54 and S55 of FIG. 9, respectively. Since identical processing is performed on each of G and E, the portions indicated as X and dir in FIG. 20 are changed to G and H and to E and V as appropriate. More specifically, when the processing of FIG. 20 corresponds to the process of step S54, since it is a process performed by the G interpolation processing section 332-1, X and dir are changed to G and H. When the processing of FIG. 20 corresponds to the process of step S55, since it is a process performed by the E interpolation processing section 332-2, X and dir are changed to E and V.

In step S401, the G interpolation processing section 332-1 or the E interpolation processing section 332-2 performs a weighted average value $M_{Rdir}$ of R computation process. The details of this process will be described later with reference to FIG. 21.

In step S402, the G interpolation processing section 332-1 or the E interpolation processing section 332-2 performs a weighted average value $M_{XAdir}$ of XA computation process. The details of this process will be described later with reference to FIG. 21.

In step S403, the G interpolation processing section 332-1 or the E interpolation processing section 332-2 performs a weighted variance approximate value $VA_{RRdir}$ of R computation process. The details of this process will be described later with reference to FIG. 22.

In step S404, the G interpolation processing section 332-1 or the E interpolation processing section 332-2 performs a weighted covariance approximate values $V_{RXAdir}$ Of R and XA computation process. The details of this process will be described later with reference to FIG. 23.

In step S405, the G interpolation processing section 332-1 or the E interpolation processing section 332-2 performs a gradient $K_{dir}$ of regression line computation process. The details of this process will be described later with reference to FIG. 29.

In step S406, the G interpolation processing section 332-1 or the E interpolation processing section 332-2 performs an estimated value XF of X using regression line computation process. The details of this process will be described later with reference to FIG. 30. After the process of step S406, the process proceeds to step S56 of FIG. 9.

Figure 21:
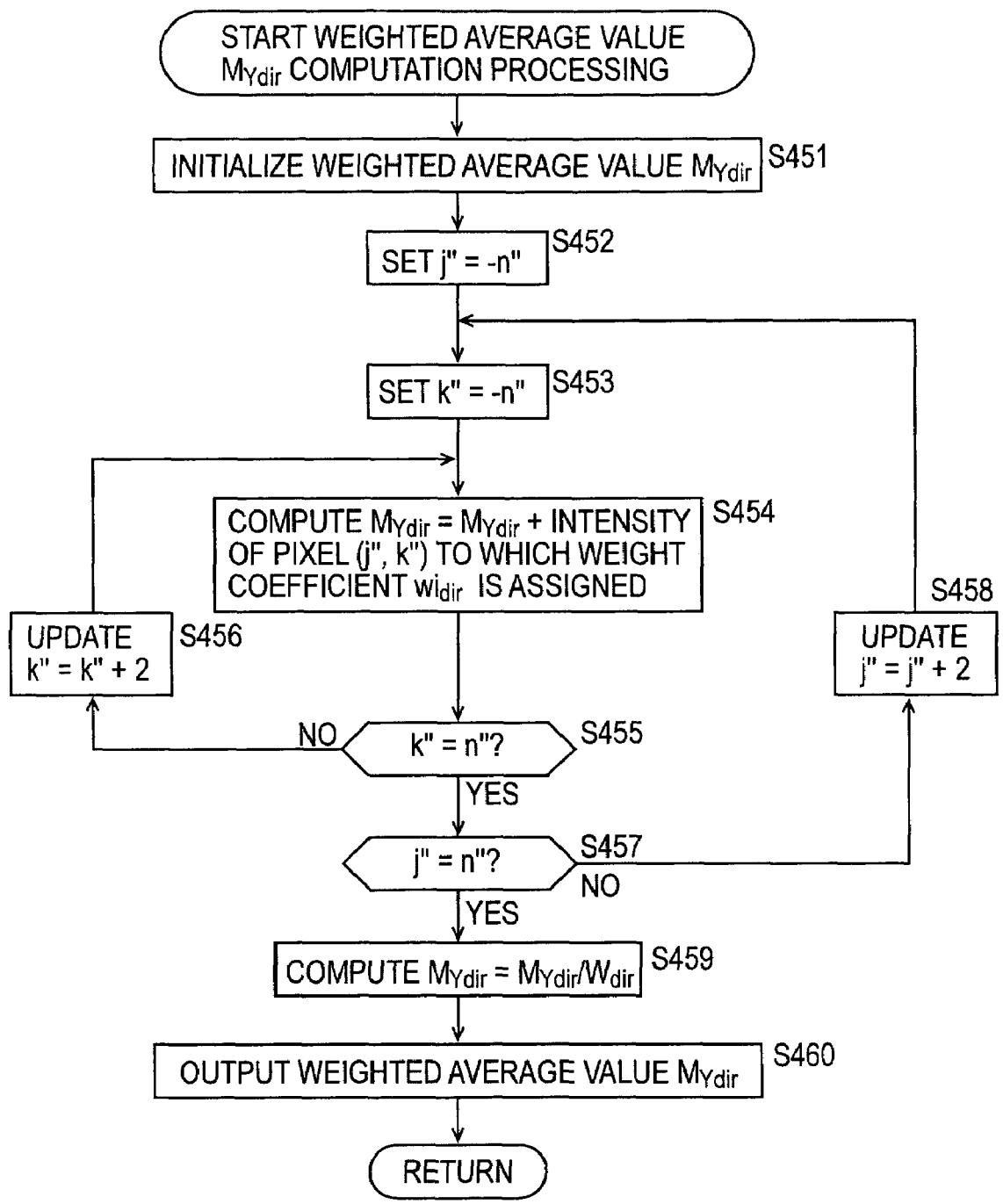
FIG. 21 is a flowchart illustrating a weighted average value $M_{Ydir}$.

Next, referring to the flowchart in FIG. 21, a description is given below of the details of a weighted average value $M_{Rdir}$ of R computation process performed in step S401 of FIG. 20 and a weighted average value $M_{XAdir}$ of XA computation process performed in step S402 of FIG. 20. Since identical processing is performed on each of R and XA, the portions indicated as Y in FIG. 21 are changed to R and XA as appropriate. More specifically, when the processing of FIG. 21 corresponds to the process of step S54 of FIG. 9, it is a process performed by the G interpolation processing section 332-1. When the processing of FIG. 21 corresponds to the process of step S55 of FIG. 9, it is a process performed by the E interpolation processing section 332-2. n" is a positive even number. (j", k") indicates a pixel position at which processing is performed when the center (the position of the pixel of interest) in the local area is set as (0, 0).

In step S451, the G interpolation processing section 332-1 or the E interpolation processing section 332-2 initializes a weighted average value $M_{Ydir}$ to 0.

In step S452, the G interpolation processing section 332-1 or the E interpolation processing section 332-2 initializes the value j" of the first register, which indicates the position of the pixel among the pixels of the supplied local area, at which processing is performed, in order to set j"=−n". In step S453, the G interpolation processing section 332-1 or the E interpolation processing section 332-2 initializes the value k" of the first register, which indicates the position of the pixel among the pixels of the supplied local area, at which processing is performed, in order to set k"=−n".

In step S454, the G interpolation processing section 332-1 or the E interpolation processing section 332-2 computes $M_{Ydir}=M_{Ydir}+Y$ of the pixel (j", k") to which the weight coefficient $wi_{dir}$ is assigned. That is, $M_{Ydir}$ to which is added Y of the pixel (j", k") to which the weight coefficient $wi_{dir}$ is assigned becomes a new $M_{Ydir}$.

In step S455, the G interpolation processing section 332-1 or the E interpolation processing section 332-2 determines whether or not k"=n" by referring to the value k" of the second register. When it is determined in step S455 that k"≠n", in step S456, the G interpolation processing section 332-1 or the E interpolation processing section 332-2 updates the value k" to k"=k"+2. The process then returns to step S454, and the processing of step S454 and subsequent steps is performed again.

When it is determined in step S455 that k"=n", in step S457, the G interpolation processing section 332-1 or the E interpolation processing section 332-2 determines whether or not j"=n" by referring to the value j" of the first register, which indicates the pixel position at which processing is performed. When it is determined in step S457 that j"≠n", in step S458, the G interpolation processing section 332-1 or the E interpolation processing section 332-2 updates the value j" of the first register to j"=j"+2. The process then returns to step S453, and the processing of step S453 and subsequent steps is performed again.

When it is determined in step S457 that j"=n", in step S459, the G interpolation processing section 332-1 or the E interpolation processing section 332-2 computes $M_{Ydir}=M_{Ydir}/W_{dir}$. This $W_{dir}$ is assumed to be the sum $W_{dir}$ of the weight coefficient $wi_{dir}$.

In step S460, the G interpolation processing section 332-1 or the E interpolation processing section 332-2 outputs the weighted average value $M_{Ydir}$. The process then proceeds to step S402 or S403 of FIG. 20.

As a result of the processing of FIG. 21, the weighted average value of R and XA in the neighborhood of the pixel of interest is computed.

Next, referring to the flowchart in FIG. 22, a description is given below of the details of a weighted variance approximate value $VA_{RRdir}$ of R computation process performed in step S403 of FIG. 20. This process is performed by the G interpolation processing section 332-1 or the E interpolation processing section 332-2 of FIG. 6.

In step S501, the G interpolation processing section 332-1 or the E interpolation processing section 332-2 initializes a weighted variance approximate value $VA_{RRdir}$ to 0.

In step S502, the G interpolation processing section 332-1 or the E interpolation processing section 332-2 obtains the weighted average $M_{Rdir}$. This weighted average $M_{Rdir}$ is a value computed by the above-described process of FIG. 21 (the process of step S401 of FIG. 20).

In step S503, the G interpolation processing section 332-1 or the E interpolation processing section 332-2 initializes the value j" of the first register, which indicates the position of the pixel among the pixels of the supplied local area, at which processing is performed, in order to set j"=−n". In step S504, the G interpolation processing section 332-1 or the E interpolation processing section 332-2 initializes the value k" of the second register, which indicates the position of the pixel among the pixels of the supplied local area, at which processing is performed, in order to set k"=−n".

In step S505, the G interpolation processing section 332-1 or the E interpolation processing section 332-2 computes $VA_{RRdir}=VA_{RRdir}+|R$ of the pixel $(j", k")-M_{Rdir}|$ to which the weight coefficient $wi_{dir}$ is assigned. That is, the value, in which the absolute value of the value such that the weighted average value $M_{Rdir}$ of R is subtracted from R of the pixel (j", k") is taken, to which a weight is assigned and $VA_{RRdir}$ is added, becomes a new $VA_{RRdir}$.

In step S506, the G interpolation processing section 332-1 or the E interpolation processing section 332-2 determines whether or not k"=n" by referring to the value k" of the second register. When it is determined in step S506 that k"≠n", in step S507, the G interpolation processing section 332-1 or the E interpolation processing section 332-2 updates the value k" of the second register to k"=k"+2. The process then returns to step S505, and the processing of step S505 and subsequent steps is performed again.

When it is determined in step S506 that k"=n", in step S508, the G interpolation processing section 332-1 or the E interpolation processing section 332-2 determines whether or not j"=n" by referring to the value j" of the first register, which indicates the pixel position at which processing is performed. When it is determined in step S508 that j"≠n", in step S509, the G interpolation processing section 332-1 or the E interpolation processing section 332-2 updates the value j" of the first register to j"=j"+2. The process then returns to step S504, and the processing of step S504 and subsequent steps is performed again.

When it is determined in step S508 that j"=n", in step S510, the G interpolation processing section 332-1 or the E interpolation processing section 332-2 computes $VA_{RRdir}=VA_{RRdir}/W_{dir}$. This $W_{dir}$ is assumed to be the sum $W_{dir}$ of the weight coefficient $wi_{dir}$.

In step S511, the G interpolation processing section 332-1 or the E interpolation processing section 332-2 outputs a weighted variance approximate value $VA_{RRdir}$ of R. The process then proceeds to step S404 of FIG. 20.

Figure 22:
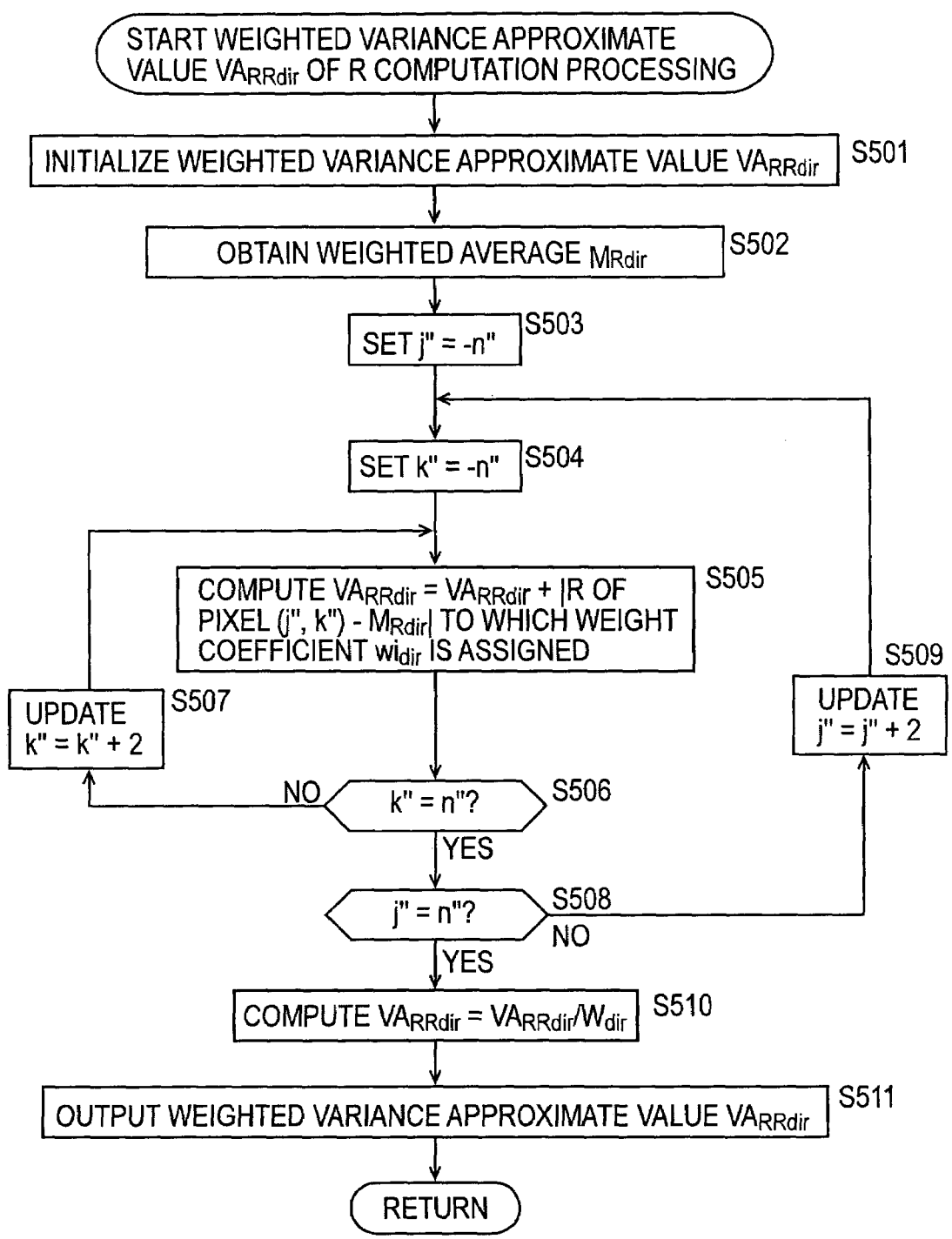
FIG. 22 is a flowchart illustrating a weighted variance approximate value $VA_{RRdir}$ of R computation process.

As a result of the processing of FIG. 22, the weighted variance approximate value $VA_{RRdir}$ of R is computed.

Next, referring to the flowchart in FIG. 23, a description is given below of a weighted covariance approximate values $VA_{RXAdir}$ of R and XA computation process performed in step S404 of FIG. 20.

In step S521, the G interpolation processing section 332-1 or the E interpolation processing section 332-2 initializes the weighted covariance value $VA_{XAdir}$ of R and XA, which is a value to be output, to 0.

In step S522, the G interpolation processing section 332-1 or the E interpolation processing section 332-2 obtains a weighted average $M_{Rdir}$ and a weighted average $M_{XAdir}$. The weighted average $M_{Rdir}$ is a value computed in the process of step S401 of FIG. 20 (the processing of FIG. 21), and the weighted average $M_{XAdir}$ is a value computed in the process of step S402 of FIG. 20 (the processing of FIG. 21).

In step S523, the G interpolation processing section 332-1 or the E interpolation processing section 332-2 initializes the value j" of the first register, which indicates the pixel position at which processing is performed, in order to set j"=−n".

In step S524, the G interpolation processing section 332-1 or the E interpolation processing section 332-2 initializes the value k" of the second register, which indicates the pixel position at which processing is performed, in order to set k"=−n'.

In step S525, the G interpolation processing section 332-1 or the E interpolation processing section 332-2 performs a multiplication process, which will be described later with reference to FIG. 27.

In step S526, the G interpolation processing section 332-1 or the E interpolation processing section 332-2 determines whether or not k"=n" by referring to the value k" of the second register, which indicates the pixel position at which processing is performed.

When it is determined in step S526 that k"≠n", in step S527, the G interpolation processing section 332-1 or the E interpolation processing section 332-2 updates the value k" of the second register to k"=k"+2. The process then returns to step S525, and the processing of step S525 and subsequent steps is performed again.

When it is determined in step S526 that k"=n", in step S528, the G interpolation processing section 332-1 or the E interpolation processing section 332-2 determines whether or not j"=n" by referring to the value j" of the first register, which indicates the pixel position at which processing is performed.

When it is determined in step S528 that j"≠n", in step S529, the G interpolation processing section 332-1 or the E interpolation processing section 332-2 updates the value j" of the first register to j"=j"+2. The process then returns to step S524, and the processing of step S524 and subsequent steps is performed again.

When it is determined in step S528 that j"=n", in step S530, the G interpolation processing section 332-1 or the E interpolation processing section 332-2 computes $VA_{RXAdir}=VA_{RXAdir}/W_{dir}$, and outputs this as the weighted covariance approximate values $VA_{RXAdir}$ of R and XA. The process then proceeds to step S405 of FIG. 20.

When the gradient of the regression line is computed by a conventional method, it is necessary to perform a computation shown in equation (3) below.

$$K = \frac{V_{xy}}{V_{xx}} \quad (3)$$

$$= \frac{\frac{1}{N}\sum_{i=1}^{N}(x_i - M_x)(y_i - M_y)}{\frac{1}{N}\sum_{i=1}^{N}(x_i - M_x)^2}$$

$$= \frac{\sum_{i=1}^{N}(x_i - M_x)(y_i - M_y)}{\sum_{i=1}^{N}(x_i - M_x)^2}$$

Figure 24:
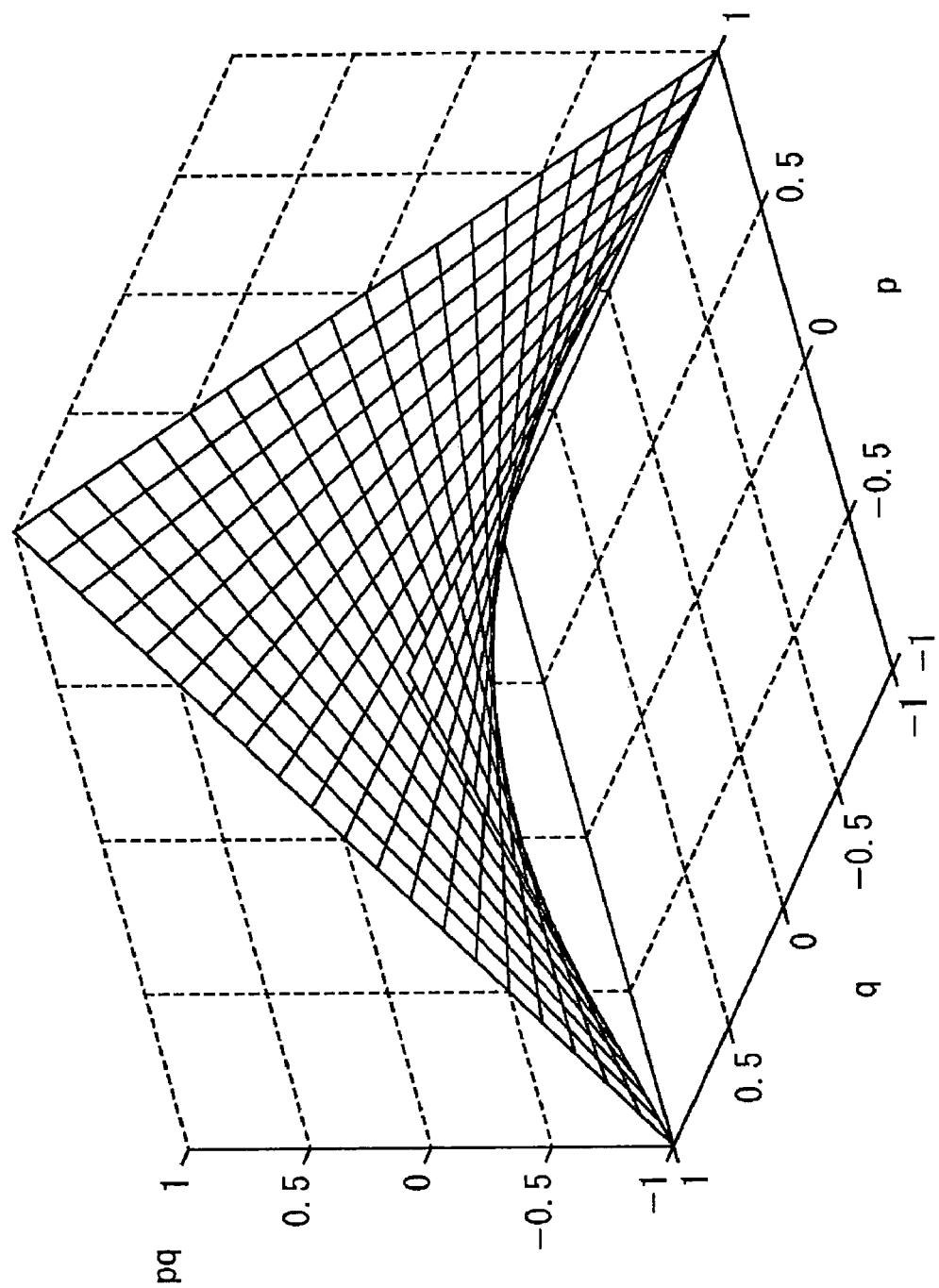
FIG. 24 illustrates an area that can be taken by the product of p and q.

However, when a computation is performed using equation (3), a problem arises in that the number of multiplications increases in proportion to the number n of pieces of data. Therefore, an approximation of this multiplication with a simple computation is considered. For the sake of simplicity, when it is assumed that data Xi and data Yi are normalized to a duration [0, 1], 0≦(Mx, My)≦1 holds, and also, −1<(Xi−Mx, Yi−My)<1 holds. Therefore, when a multiplication pq of two variables, that is, p=Xi−Mx and q=Yi−My, which satisfy −1<(p, q)<1, is considered, pq takes a value range shown in FIG. 24. As a method for obtaining an approximated value on the basis of the sign of the p and q and the absolute values thereof, a description is given of an example of an approximation method which can be implemented using computations of only condition computation, absolute-value computation, and addition and subtraction.

That is, the computation can be simplified as follows.

pq is approximated to q when $|p| \geq |q|$ and $p \geq 0$,
pq is approximated to -q when $|p| \geq |q|$ and $p > 0$,
pq is approximated to p when $|p| < |q|$ and $q \geq 0$, and
pq is approximated to -p when $|p| < |q|$ and $q < 0$.

Figure 25:
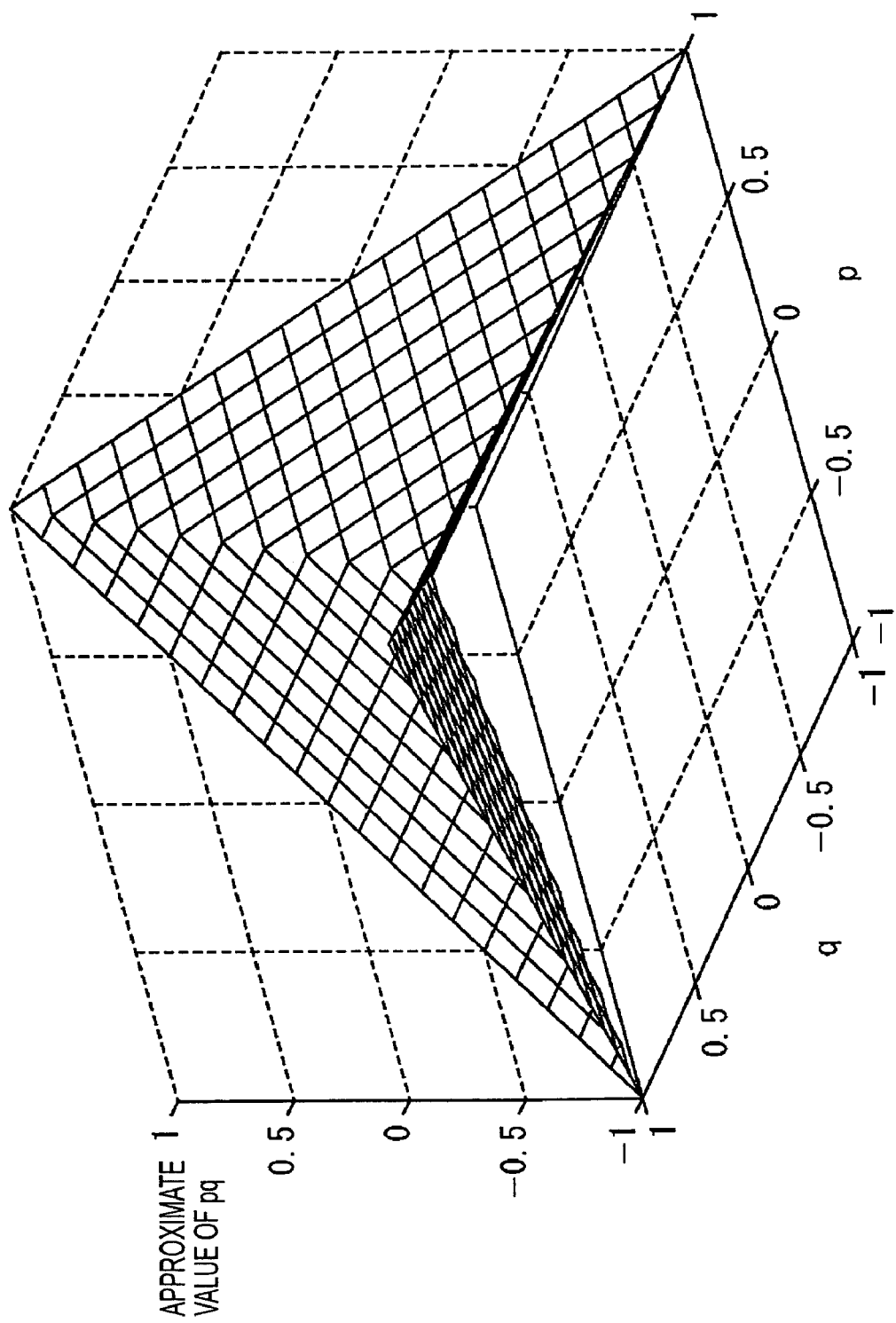
FIG. 25 illustrates an area that can be taken by the approximate value of pq when a multiplication approximation process is performed.
Figure 26:
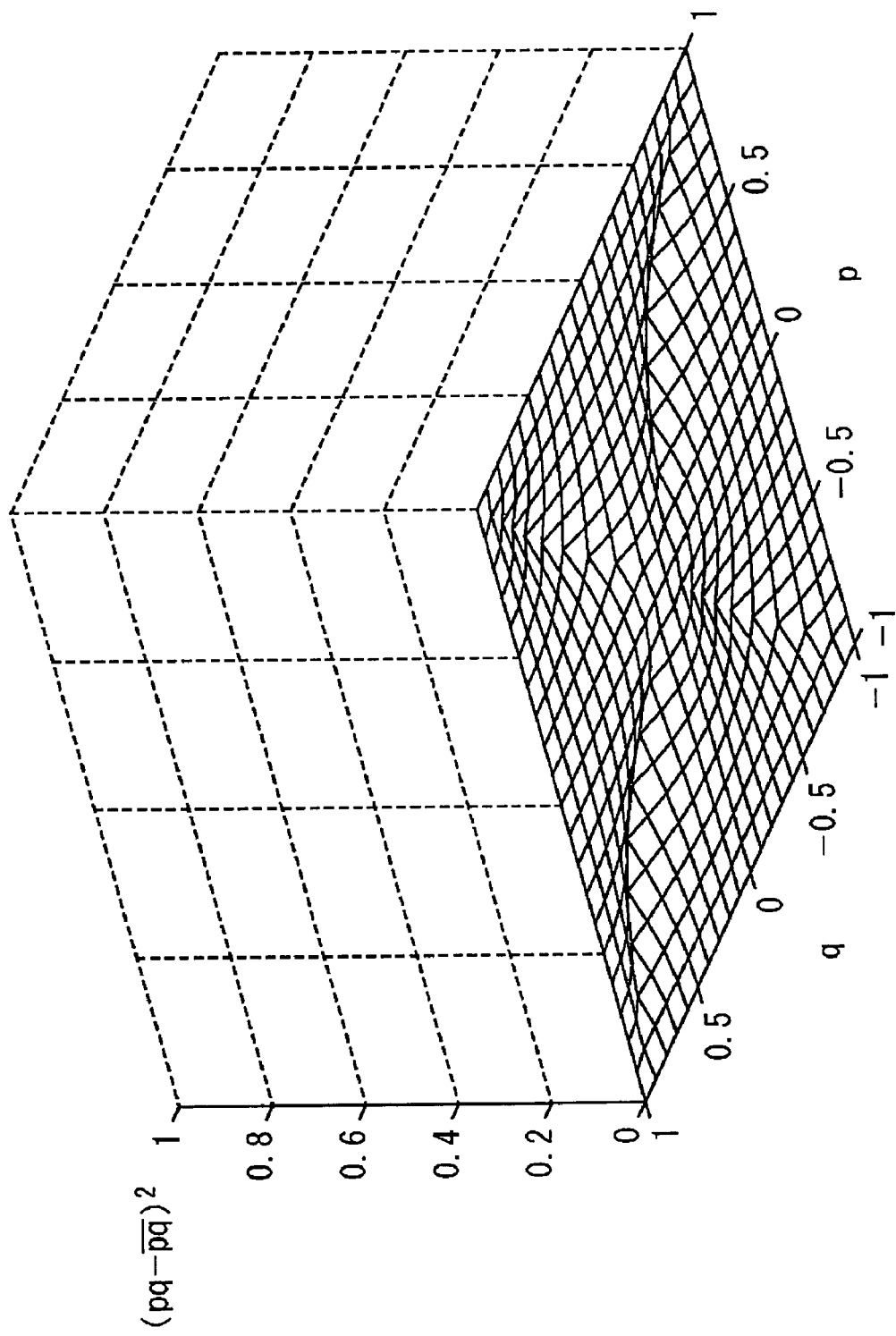
FIG. 26 illustrates a squared error of the approximate value of pq when a multiplication approximation process is performed.

Furthermore, in this approximation method, when p=q, the square of p (or the square of q) is approximated to the absolute value of p (or q).

pq approximated using this approximation method is shown in FIG. 25, and the squared error by an approximation computation is shown in FIG. 26. It can be seen that the range which can be taken by the value of pq described with reference to FIG. 24 does not differ much from pq approximated using the approximation method shown in FIG. 25. That is, it can be seen that the squared error by the approximation computation shown in FIG. 26 is small.

Next, referring to the flowchart in FIG. 27, a description is given below of a multiplication process performed in step S525 of FIG. 23. The multiplication process is performed when an approximated covariance value is computed using the above-described product approximation method by assuming that the value of color components is normalized to [0, 1].

In step S551, the G interpolation processing section 332-1 or the E interpolation processing section 332-2 denotes {R(j", k")-$M_{Rdir}$} as p.

In step S552, the G interpolation processing section 332-1 or the E interpolation processing section 332-2 denotes {XA (j", k")-$M_{Xdir}$} as q.

Figure 28:
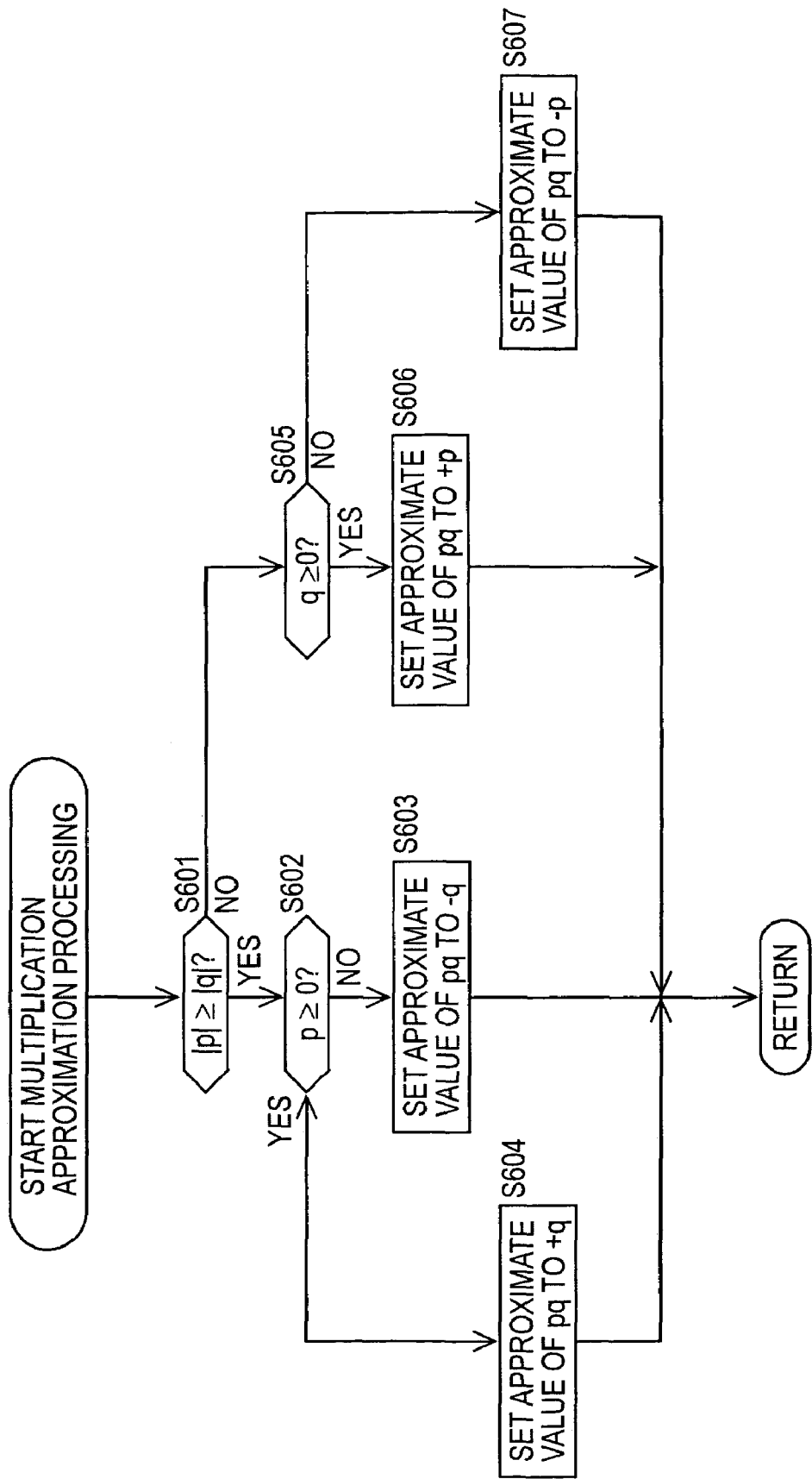
FIG. 28 is a flowchart illustrating a multiplication approximation process.

In step S553, a multiplication approximation process, which will be described later with reference to FIG. 28, is performed.

In step S554, the G interpolation processing section 332-1 or the E interpolation processing section 332-2 computes $VA_{XAdir}=VA_{XAdir}$+the approximate value of pq to which the weight coefficient $wi_{dir}$ is assigned. The process then proceeds to step S526 of FIG. 23.

Next, referring to the flowchart in FIG. 28, a description is given below of a multiplication approximation process performed in step S553 of FIG. 27.

Figure 27:
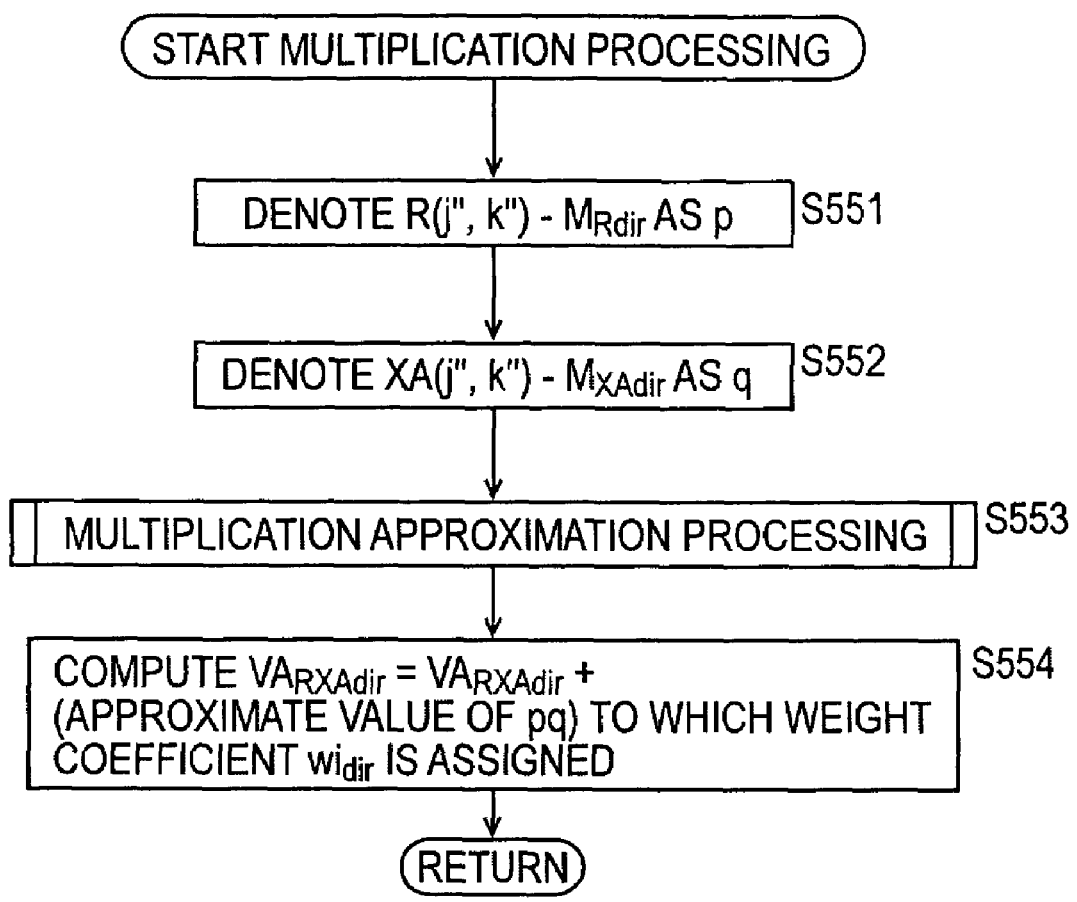
FIG. 27 is a flowchart illustrating a multiplication process.

In step S601, the G interpolation processing section 332-1 or the E interpolation processing section 332-2 determines whether or not $|p| \geq |q|$ using the values p and q replaced respectively in steps S551 and S552 of FIG. 27.

When it is determined in step S601 that $|p| \geq |q|$, in step S602, the G interpolation processing section 332-1 or the E interpolation processing section 332-2 determines whether or not $p \geq 0$.

When it is determined in step S602 that it is not $p \geq 0$, in step S603, the G interpolation processing section 332-1 or the E interpolation processing section 332-2 sets the approximate value of pq to -q. The process then proceeds to step S554 of FIG. 27.

When it is determined in step S602 that $p \geq 0$, in step S604, the G interpolation processing section 332-1 or the E interpolation processing section 332-2 sets the approximate value of pq to +q. The process then proceeds to step S554 of FIG. 27.

When it is determined in step S601 that it is not $|p| \geq |q|$, in step S605, the G interpolation processing section 332-1 or the E interpolation processing section 332-2 determines whether or not $q \geq 0$.

When it is determined in step S605 that $q \geq 0$, in step S606, the G interpolation processing section 332-1 or the E inter-polation processing section 332-2 sets the approximate value of pq to +p. The process then proceeds to step S554 of FIG. 27.

When it is determined in step S605 that it is not $q \geq 0$, in step S607, the G interpolation processing section 332-1 or the E interpolation processing section 332-2 sets the approximate value of pq to -p. The process then proceeds to step S554 of FIG. 27.

Next, referring to the flowchart in FIG. 29, a description is given below of a gradient $K_{dir}$ of regression line computation process performed in step S405 of FIG. 20. This process is performed by the G interpolation processing section 332-1 or the E interpolation processing section 332-2 of FIG. 6.

In step S651, the G interpolation processing section 332-1 or the E interpolation processing section 332-2 obtains a weighted variance approximate value $VA_{RRdir}$. This value is computed by the above-described process of step S403 of FIG. 20 (FIG. 22).

In step S652, the G interpolation processing section 332-1 or the E interpolation processing section 332-2 obtains a weighted covariance approximate value $VA_{RXAdir}$. This value is computed by the above-described process of step S404 of FIG. 20 (FIG. 23).

In step S653, the G interpolation processing section 332-1 or the E interpolation processing section 332-2 determines whether or not $VA_{RRdir}$<the second constant. When it is determined that $VA_{RRdir}$<the second constant, in step S654, it is set that $VA_{RRdir}$=the second constant. The second constant is a predetermined value determined empirically or experimentally.

When it is determined in step S653 that it is not that $VA_{RRdir}$<the second constant, that is, $VA_{RRdir} \geq$ the second constant, the process of step S654 is skipped.

When it is determined in step S653 that it is not that $VA_{RRdir}$<the second constant, or after the process of step S654, in step S655 the G interpolation processing section 332-1 or the E interpolation processing section 332-2 computes $K_{dir}=VA_{RXAdir}/VA_{RRdir}$. The process thereafter proceeds to step S406 of FIG. 20.

Figure 29:
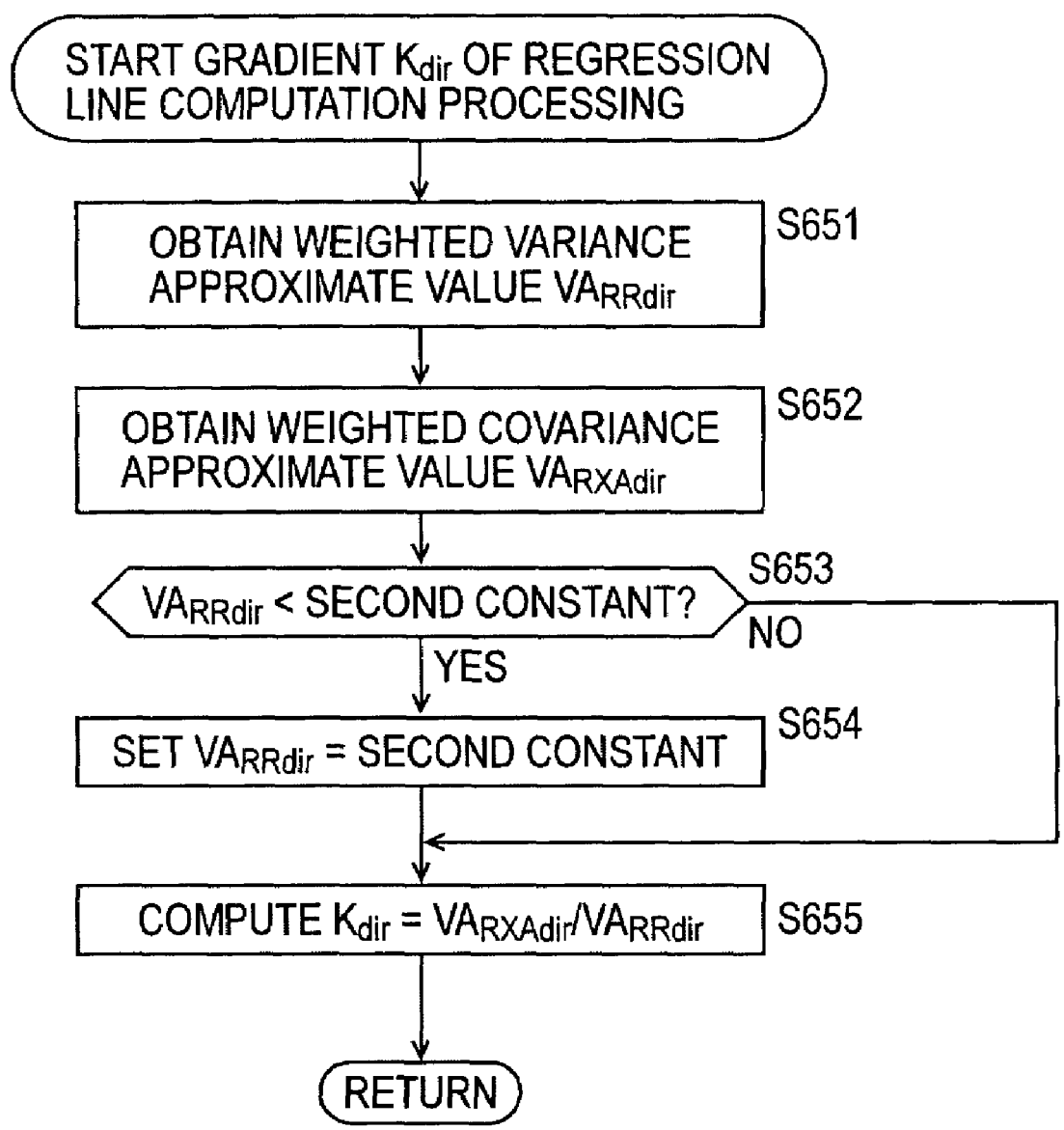
FIG. 29 is a flowchart illustrating a gradient $K_{dir}$ of regression line computation process.

As a result of the processing of FIG. 29, the gradient $K_{dir}$ of the regression line is computed.

Next, referring to the flowchart in FIG. 30, a description is given below of an estimated value XF of X using regression line computation process performed in step S406 of FIG. 20.

In step S701, the G interpolation processing section 332-1 or the E interpolation processing section 332-2 obtains a weighted average $M_{Rdir}$. This value is computed in the above-described step S401 of FIG. 20.

In step S702, the G interpolation processing section 332-1 or the E interpolation processing section 332-2 obtains a weighted average $M_{XAdir}$. This value is computed in the above-described step S402 of FIG. 20.

In step S703, the G interpolation processing section 332-1 or the E interpolation processing section 332-2 obtains the gradient $K_{dir}$ of the regression line. This value is computed in the above-described step S405 of FIG. 20.

In step S704, the G interpolation processing section 332-1 or the E interpolation processing section 332-2 computes the estimated value XF of the pixel of interest=$K_{dir}$(R of the pixel of interest-the weighted average $M_{Rdir}$)+the weighted average $M_{XAdir}$. That is, the value such that the weighted average $M_{Rdir}$ is subtracted from R of the pixel of interest is multiplied to the gradient $K_{dir}$ of the regression line, to which the weighted average $M_{XAdir}$ is added to that value, is assumed to be the estimated value XF of the pixel X of interest. Thereafter, the processing of FIG. 20 is completed, and the process then proceeds to step S56 of FIG. 9.

Figure 30:
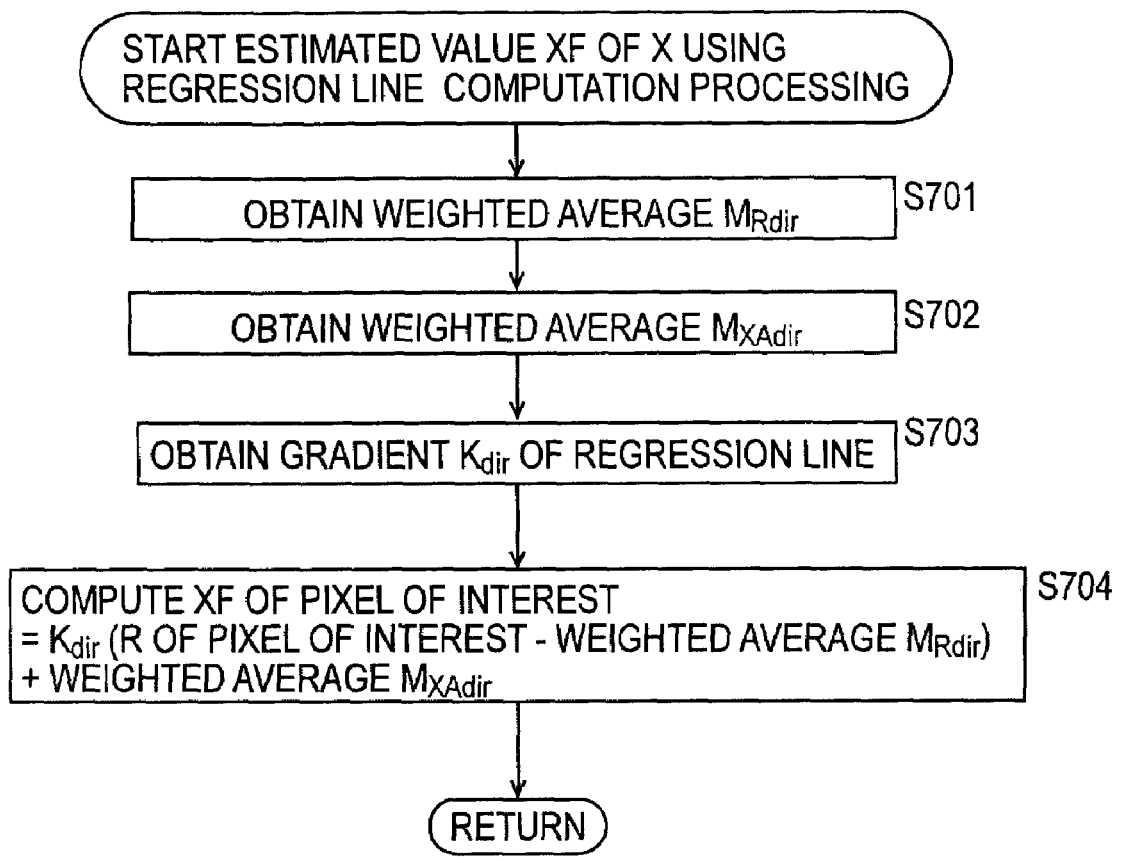
FIG. 30 is a flowchart illustrating an estimated value XF of X using regression line computation process.

As a result of the processing of FIG. 30, the G interpolation processing section 332-1 computes the estimated value GF of the pixel G of interest, and the E interpolation processing section 332-2 computes the estimated value EF of the pixel E of interest.

Figure 31:
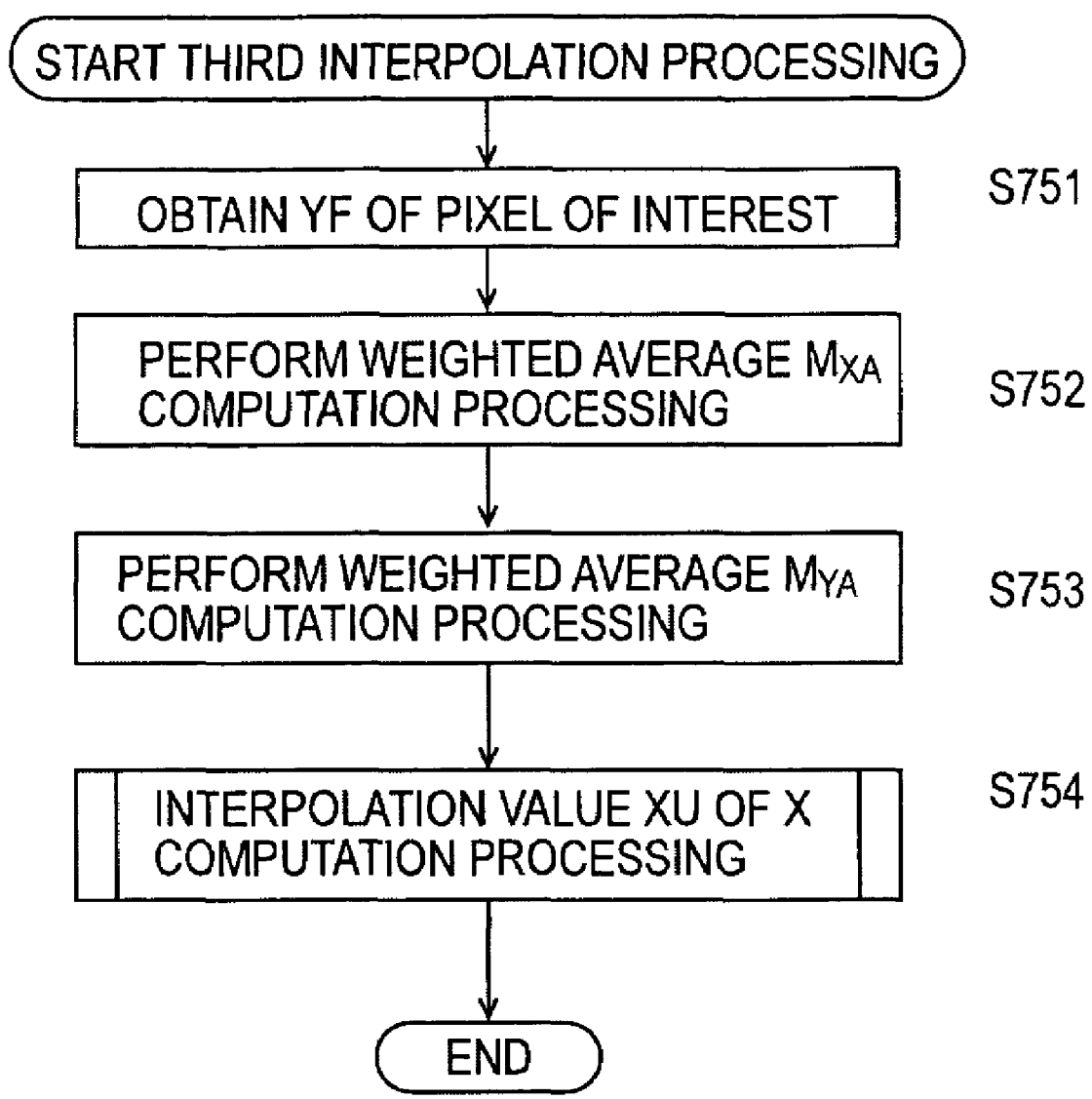
FIG. 31 is a flowchart illustrating a third interpolation process.

Next, referring to the flowchart in FIG. 31, a description is given below of a third interpolation process (a third G interpolation process and a third E interpolation process) performed in steps S56 and S57 of FIG. 9, respectively. Since identical processing is performed on each of G and E, the portions indicated as X in FIG. 31 are changed to G or E as appropriate. More specifically, when the processing of FIG. 31 corresponds to the process of step S56 of FIG. 9, since it is a process performed by the G interpolation processing section 333-1, X is changed to G. When the processing of FIG. 31 corresponds to the process of step S57 of FIG. 9, since it is a process performed by the E interpolation processing section 333-2, X is changed to E. Here, when X is G, Y is changed to E, and when X is E, Y is changed to G.

In step S751, the G interpolation processing section 333-1 or the E interpolation processing section 333-2 obtains YF of the pixel of interest. More specifically, since when X is G, Y is E and when X is E, Y is G, the G interpolation processing section 333-1 obtains EF, and the E interpolation processing section 333-2 obtains GF. That is, the G interpolation processing section 333-1 obtains the estimated value XF (EF) computed by the E interpolation processing section 332-2 in the processing of FIG. 30, and the E interpolation processing section 333-2 obtains the estimated value XF (GF) computed by the G interpolation processing section 332-1 in the processing of FIG. 30.

In step S752, the G interpolation processing section 332-1 or the E interpolation processing section 332-2 performs a weighted average $M_{XA}$ computation process. The details of this process will be described later with reference to FIG. 32.

In step S753, the G interpolation processing section 332-1 or the E interpolation processing section 332-2 performs a weighted average $M_{YA}$ computation process. The details of this process will be described later with reference to FIG. 32.

In step S754, the G interpolation processing section 332-1 or the E interpolation processing section 332-2 performs an interpolation value XU of X computation process. The details of this process will be described later with reference to FIG. 33. After the process of step S754, the processing of FIG. 31 is completed. The process then proceeds to step S58 of FIG. 9.

Next, referring to the flowchart in FIG. 32, a description is given below of a weighted average $M_{XA}$ computation process in step S752 of FIG. 31. n'" is a positive integer. (j'", k'") indicates the pixel position at which processing is performed when the center in the local area (the position of the pixel of interest) is set as (0,0).

In step S801, the G interpolation processing section 333-1 or the E interpolation processing section 333-2 initializes the weighted average value $M_{XA}$ to 0.

In step S802, the G interpolation processing section 333-1 or the E interpolation processing section 333-2 initializes the value j'" of the first register, which indicates the position of the pixel among the pixels of the supplied local area, at which processing is performed, in order to set j'"=−n'". In step S803, the G interpolation processing section 333-1 or the E interpolation processing section 333-2 initializes the value k'" of the second register, which indicates the position of the pixel among the pixels of the supplied local area, at which processing is performed, in order to set k'"=−n'".

In step S804, the G interpolation processing section 333-1 or the E interpolation processing section 333-2 computes $M_{XA}=M_{XA}+$the interpolation value XA of the pixel (j'", k'") to which a weight coefficient w'i is assigned. That is, $M_{XA}$ to which is added the interpolation value XA of the pixel (j'", k'") to which the weight coefficient w'i is assigned becomes a new $M_{XA}$.

In step S805, the G interpolation processing section 333-1 or the E interpolation processing section 333-2 determines whether or not k'"=n'" by referring to the value k'" of the second register. When it is determined in step S805 that k'"≠n'", in step S806, the G interpolation processing section 333-1 or the E interpolation processing section 333-2 updates the value k'" of the second register to k'"=k'"+1. The process then returns to step S804, and the processing of step S804 and subsequent steps is performed again.

When it is determined in step S805 that k'"=n'", in step S807, the G interpolation processing section 333-1 or the E interpolation processing section 333-2 determines whether or not j'"=n'" by referring to the value j'" of the first register, which indicates the pixel position at which processing is performed. When it is determined in step S807 that j'"≠n'", in step S808, the G interpolation processing section 333-1 or the E interpolation processing section 333-2 updates the value j'" of the first register to j'"=j'"+1. The process then returns to step S803, and the processing of step S803 and subsequent steps is performed again.

When it is determined in step S807 that j'"=n'", in step S809, the G interpolation processing section 333-1 or the E interpolation processing section 333-2 computes $M_{XA}=M_{XA}/W'$. This W' is assumed to be the sum W' of the weight coefficient w'i.

In step S810, the G interpolation processing section 333-1 or the E interpolation processing section 333-2 outputs the weighted average value $M_{XA}$. The process then proceeds to step S753 of FIG. 31.

Figure 32:
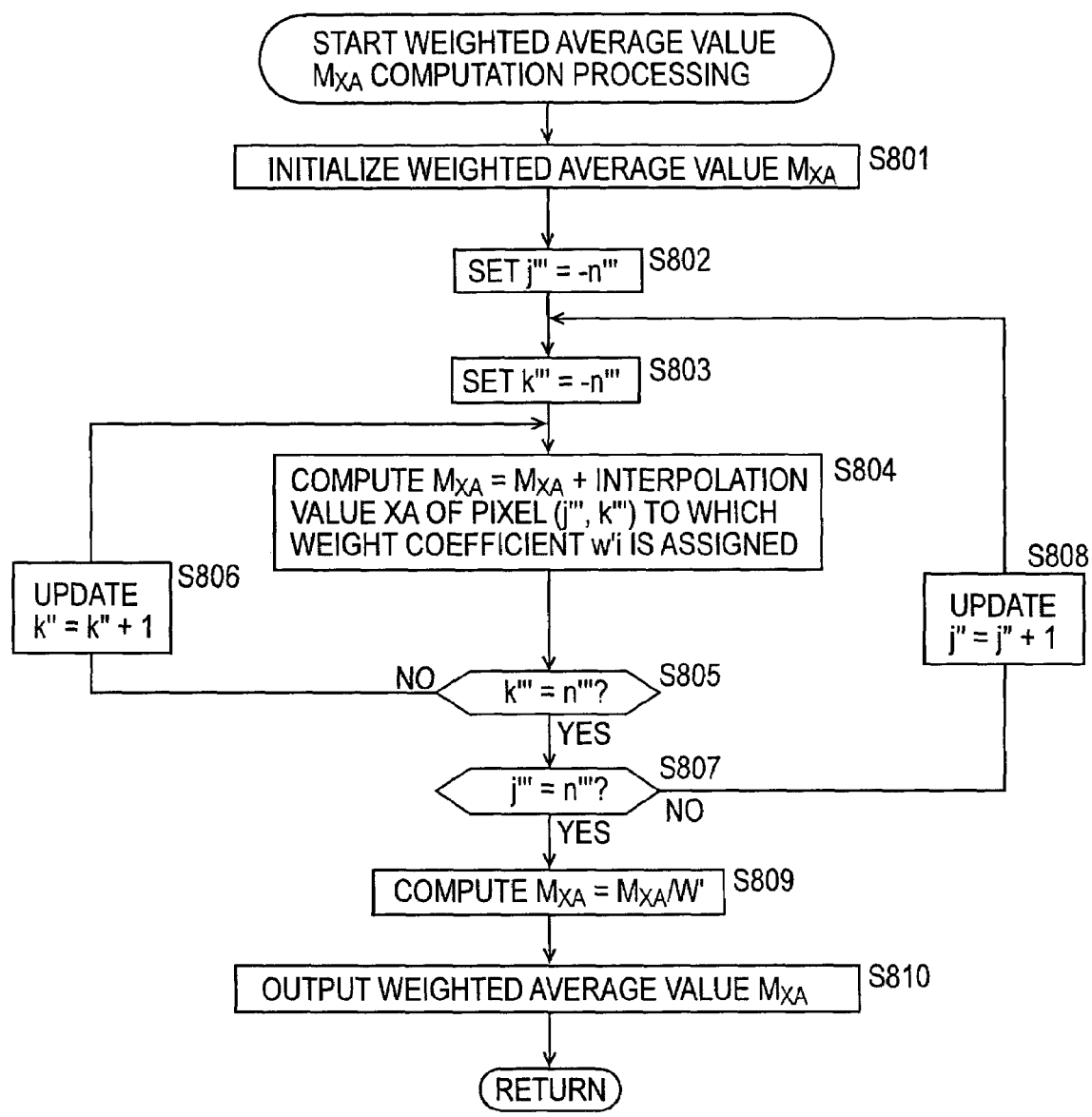
FIG. 32 is a flowchart illustrating a weighted average value $M_{XA}$ computation process.

As a result of the processing of FIG. 32, the weighted average value $M_{XA}$ of XA is computed.

In the processing of FIG. 32, only the weighted average $M_{XA}$ is described. However, as described above, when this processing is performed by the G interpolation processing section 333-1, X is changed to G, and Y is changed to E. When this processing is performed by the E interpolation processing section 333-2, X is changed to E, and Y is changed to G. That is, as a result of the processing of FIG. 32 being performed with regard to G and E by the G interpolation processing section 333-1 and the E interpolation processing section 333-2, $M_{XA}$ and $M_{YA}$ are computed. In FIG. 32, when the weighted average $M_{XA}$ and the weighted average $M_{YA}$ are computed, the process proceeds to step S754 of FIG. 31.

Figure 33:
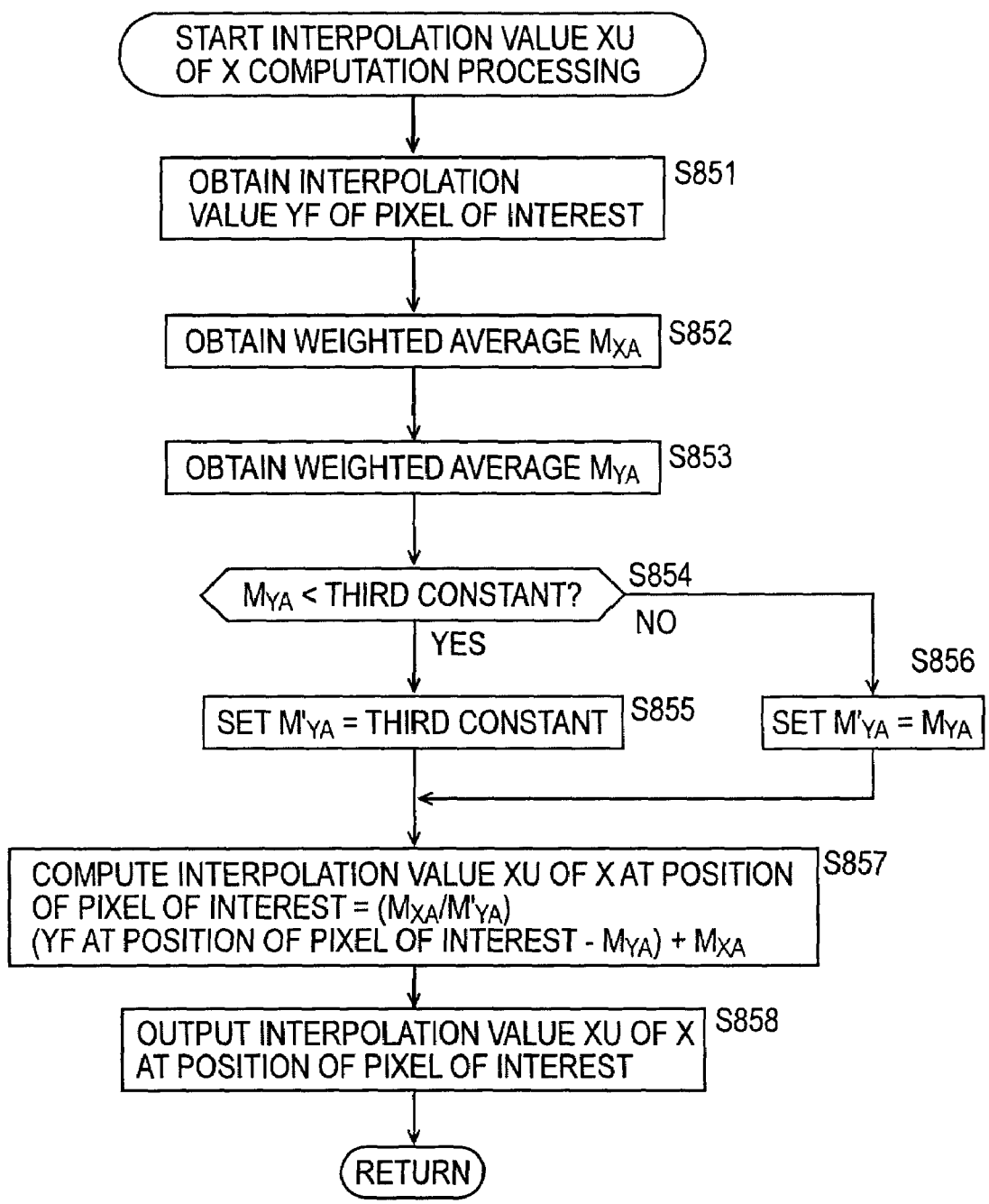
FIG. 33 is a flowchart illustrating an interpolation value XU of X computation process.

Next, referring to the flowchart in FIG. 33, a description is given below of an interpolation value XU of X computation process performed in step S754 of FIG. 31. Here, when X is G, Y is changed to E, and when X is E, Y is changed to G as appropriate.

In step S851, the G interpolation processing section 333-1 or the E interpolation processing section 333-2 obtains the interpolation value YF of the pixel of interest. This value is identical to that obtained in the above-described process of step S751 of FIG. 31.

In step S852, the G interpolation processing section 333-1 or the E interpolation processing section 333-2 obtains a weighted average $M_{XA}$. This value is computed by the above-described process of step S752 of FIG. 31 (FIG. 32).

In step S853, the G interpolation processing section 333-1 or the E interpolation processing section 333-2 obtains a weighted average $M_{YA}$. This value is computed by the above-described process of step S753 of FIG. 31 (FIG. 32).

In step S854, the G interpolation processing section 333-1 or the E interpolation processing section 333-2 determines whether or not $M_{YA}$<the third constant. When it is determined that $M_{YA}$<the third constant, in step S855, it is set that $M'_{YA}$=the third constant. The third constant is a predetermined value determined empirically or experimentally.

When it is determined in step S854 that it is not that $M_{YA}$<the third constant, that is, $M_{YA} \geq$ the third constant, in step S856, the G interpolation processing section 333-1 or the E interpolation processing section 333-2 sets $M'_{YA}=M_{YA}$.

After the process of step S855 or after the process of step S856, in step S857, the G interpolation processing section 333-1 or the E interpolation processing section 333-2 computes the interpolation value XU of X at the position of the pixel of interest=$(M_{XA}/M'_{YA})$ (YF at the position of the pixel of interest−$M_{YA}$)+$M_{XA}$. As a result, the interpolation value XU of X is computed.

In step S858, the G interpolation processing section 333-1 or the E interpolation processing section 333-2 outputs the interpolation value XU of X at the position of the pixel of interest. Thereafter, the processing of FIG. 33 is completed, and the process then proceeds to step S58 of FIG. 9.

Figure 34:
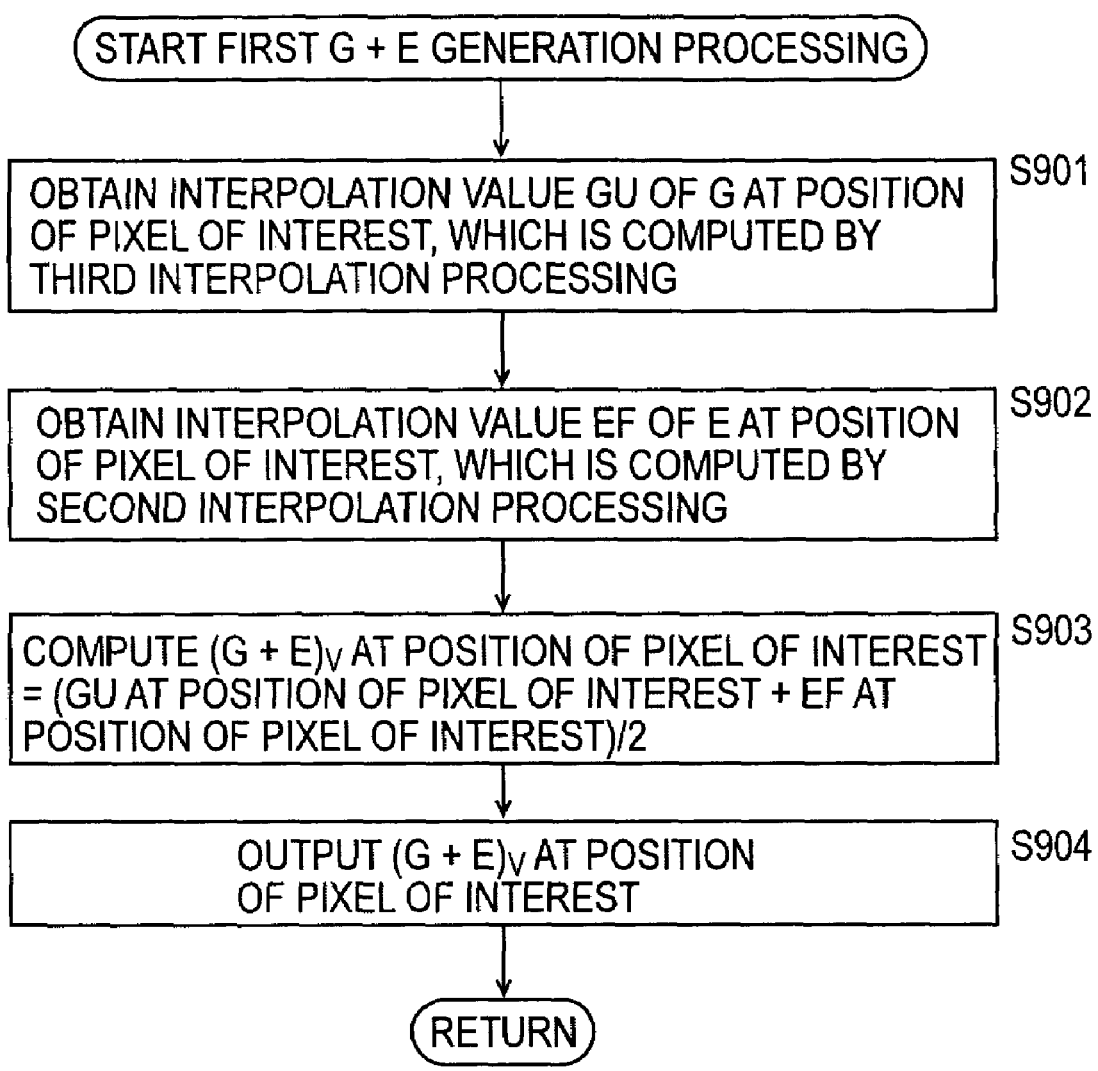
FIG. 34 is a flowchart illustrating a first G+E generation process.

Next, referring to the flowchart in FIG. 34, a description is given below of a first G+E generation process performed in step S58 of FIG. 9. This process is performed by the G+E generation processing section 335 of FIG. 6.

In step S901, the G+E generation processing section 335 obtains an interpolation value GU of G at the position of the pixel of interest, which is computed by the third interpolation process. More specifically, in the process of step S56 of FIG. 9, the interpolation value GU (the value corresponding to the interpolation value XU of FIG. 33) of G, which is computed by the G interpolation processing section 333-1, is obtained.

In step S902, the G+E generation processing section 335 obtains an interpolation value EF of E at the position of the pixel of interest, which is computed by the second interpolation process. More specifically, in the process of step S55 of FIG. 9, the interpolation value EF (the value corresponding to the interpolation value XF of FIG. 30) of E, which is computed by the E interpolation processing section 332-2, is obtained.

In step S903, the G+E generation processing section 335 computes $(G+E)_V$ at the position of the pixel of interest=(GU at the position of the pixel of interest+EF at the position of the pixel of interest)/2. That is, the average value of the GU at the position of the pixel of interest and the EF at the position of the pixel of interest is set as $(G+E)_V$ at the position of the pixel of interest.

In step S904, the G+E generation processing section 335 outputs $(G+E)_V$ at the position of the pixel of interest. The process then proceeds to step S59 of FIG. 9.

Figure 35:
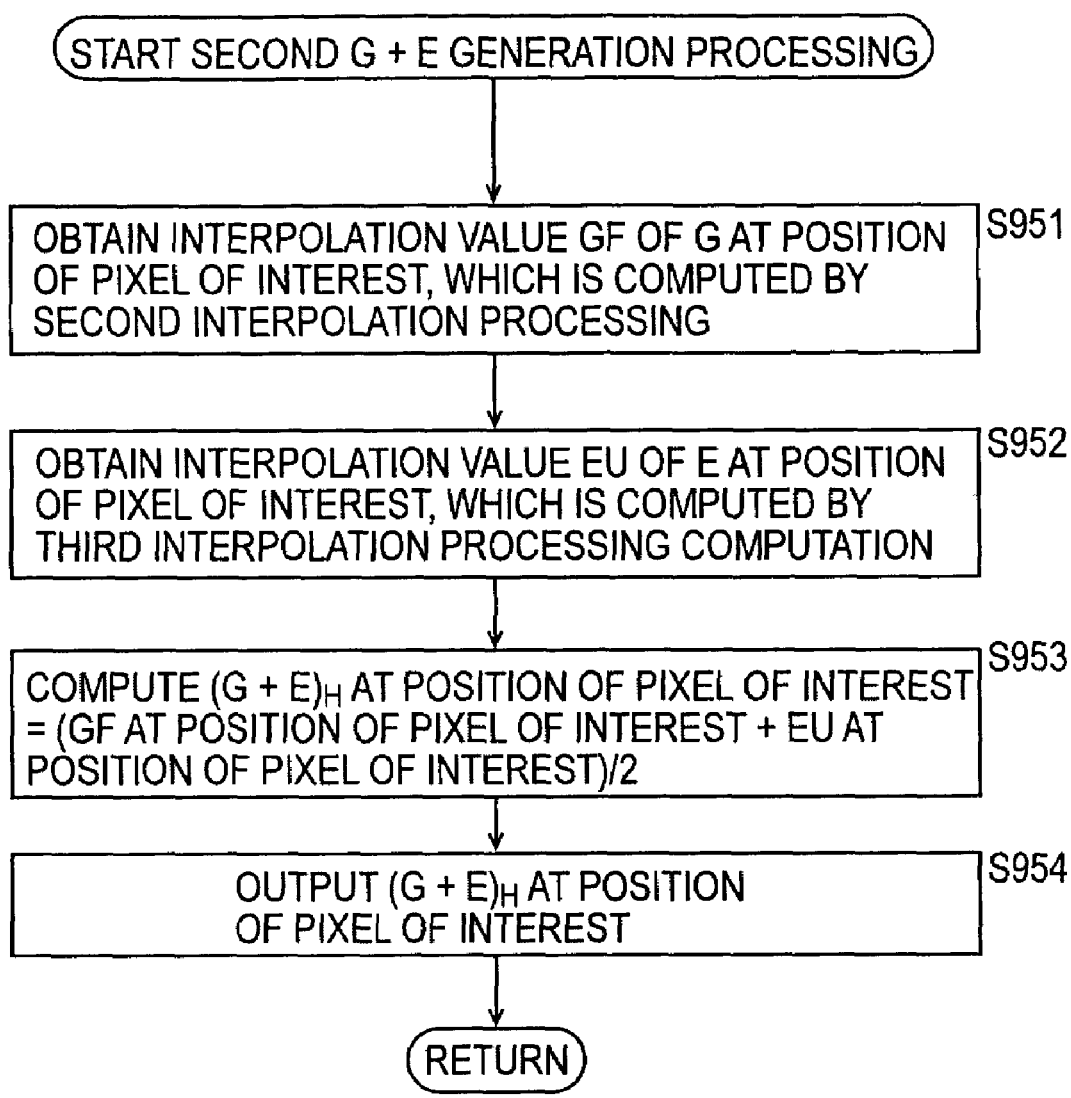
FIG. 35 is a flowchart illustrating a second G+E generation process.

Next, referring to the flowchart in FIG. 35, a description is given below of a second G+E generation process performed in step S59 of FIG. 9. This process is performed by the G+E generation processing section 336 of FIG. 6.

In step S951, the G+E generation processing section 336 obtains an interpolation value GF of G at the position of the pixel of interest, which is computed by the second interpolation process. More specifically, in the process of step S54 of FIG. 9, the interpolation value GF (the value corresponding to the interpolation value XF of FIG. 30) of G, which is computed by the G interpolation processing section 332-1, is obtained.

In step S952, the G+E generation processing section 336 obtains an interpolation value EU of E at the position of the pixel of interest, which is computed by the third interpolation processing computation. More specifically, in the process of step S57 of FIG. 9, the interpolation value EF (the value corresponding to the interpolation value XU of FIG. 33) of E, which is computed by the E interpolation processing section 333-2, is obtained.

In step S953, the G+E generation processing section 336 computes $(G+E)_H$ at the position of the pixel of interest=(GF at the position of the pixel of interest+EU at the position of the pixel of interest)/2. That is, the average value of GF at the position of the pixel of interest and EU at the position of the pixel of interest is set as $(G+E)_H$.

In step S954, the G+E generation processing section 336 outputs $(G+E)_H$ at the position of the pixel of interest. The process then proceeds to step S60 of FIG. 9.

Figure 36:
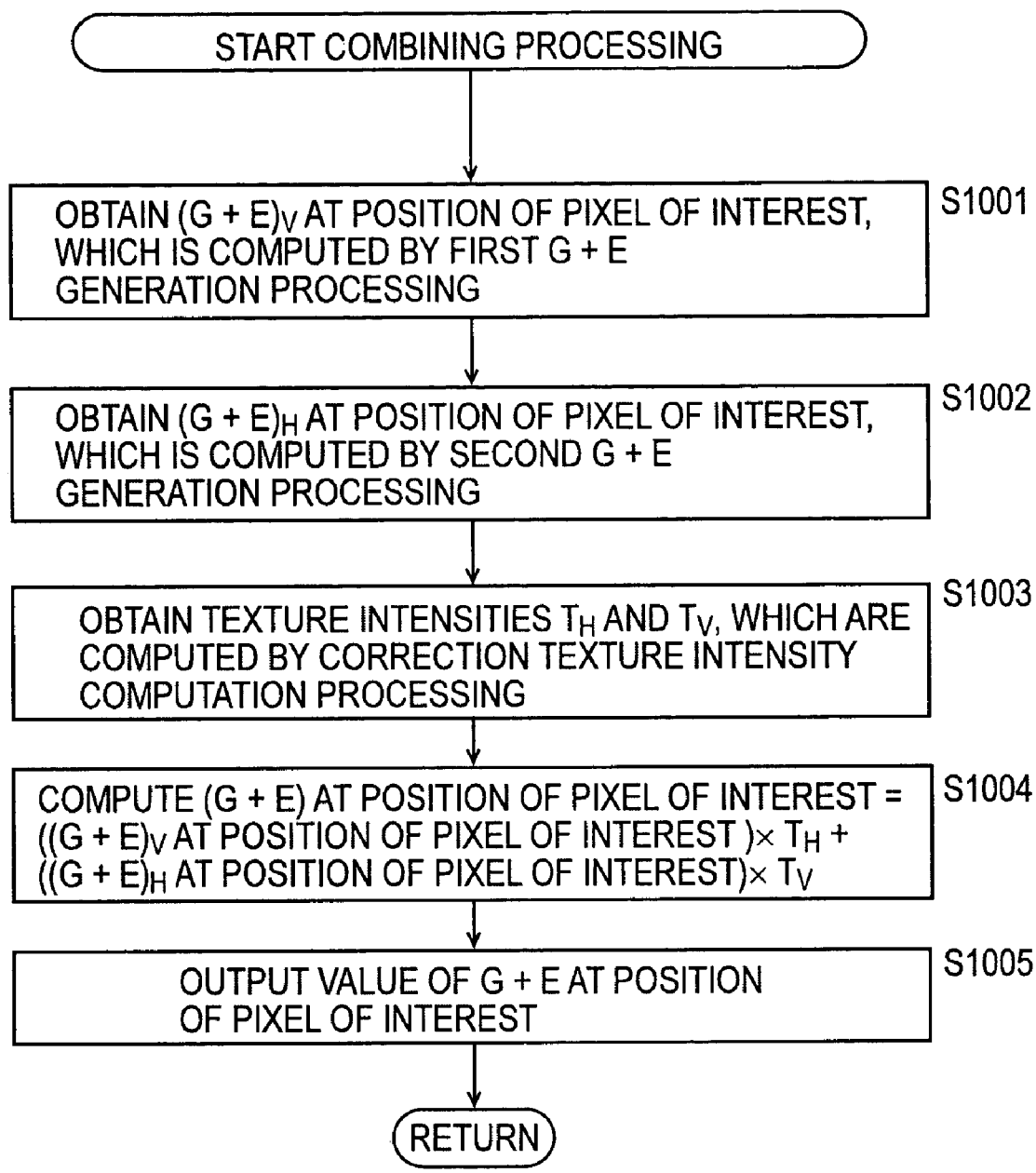
FIG. 36 is a flowchart illustrating a combining process.

Next, referring to the flowchart in FIG. 36, a description is given below of a combining process performed in step S60 of FIG. 9. This process is performed by the combining processing section 337 of FIG. 6.

In step S1001, the combining processing section 337 obtains $(G+E)_V$ at the position of the pixel of interest, which is computed by the first G+E generation process. More specifically, in the process of step S58 (FIG. 34) of FIG. 9, $(G+E)_V$ computed by the G+E generation processing section 335 is obtained.

In step S1002, the combining processing section 337 obtains $(G+E)_H$ at the position of the pixel of interest, which is computed by the second G+E generation process. More specifically, in the process of step S59 of FIG. 9 (FIG. 35), $(G+E)_H$ computed by the G+E generation processing section 336 is obtained.

In step S1003, the combining processing section 337 obtains the corrected texture intensities $T_H$ and $T_V$, which are computed by the correction texture intensity computation process. More specifically, in the process of step S53 of FIG. 9 (FIG. 12), the corrected texture intensities $T_H$ and $T_V$ computed by the texture-intensity computation processing section 334 are obtained.

In step S1004, in the interpolation of colors using a linear regression used in this embodiment, $(G+E)_V$ generated using a sample in the vertical direction has a high reliability for texture in the horizontal direction, and $(G+E)_H$ generated using a sample in the horizontal direction has a high reliability for texture in the vertical direction. Therefore, the combining processing section 337 computes (G+E) at the position of the pixel of interest=$(G+E)_V$ at the position of the pixel of interest×$T_H$+$(G+E)_H$ at the position of the pixel of interest×$T_V$.

In step S1005, the combining processing section 337 outputs (G+E) at the position of the pixel of interest, and the processing of FIG. 9 is completed. The process then proceeds to step S24 of FIG. 8.

Figure 37:
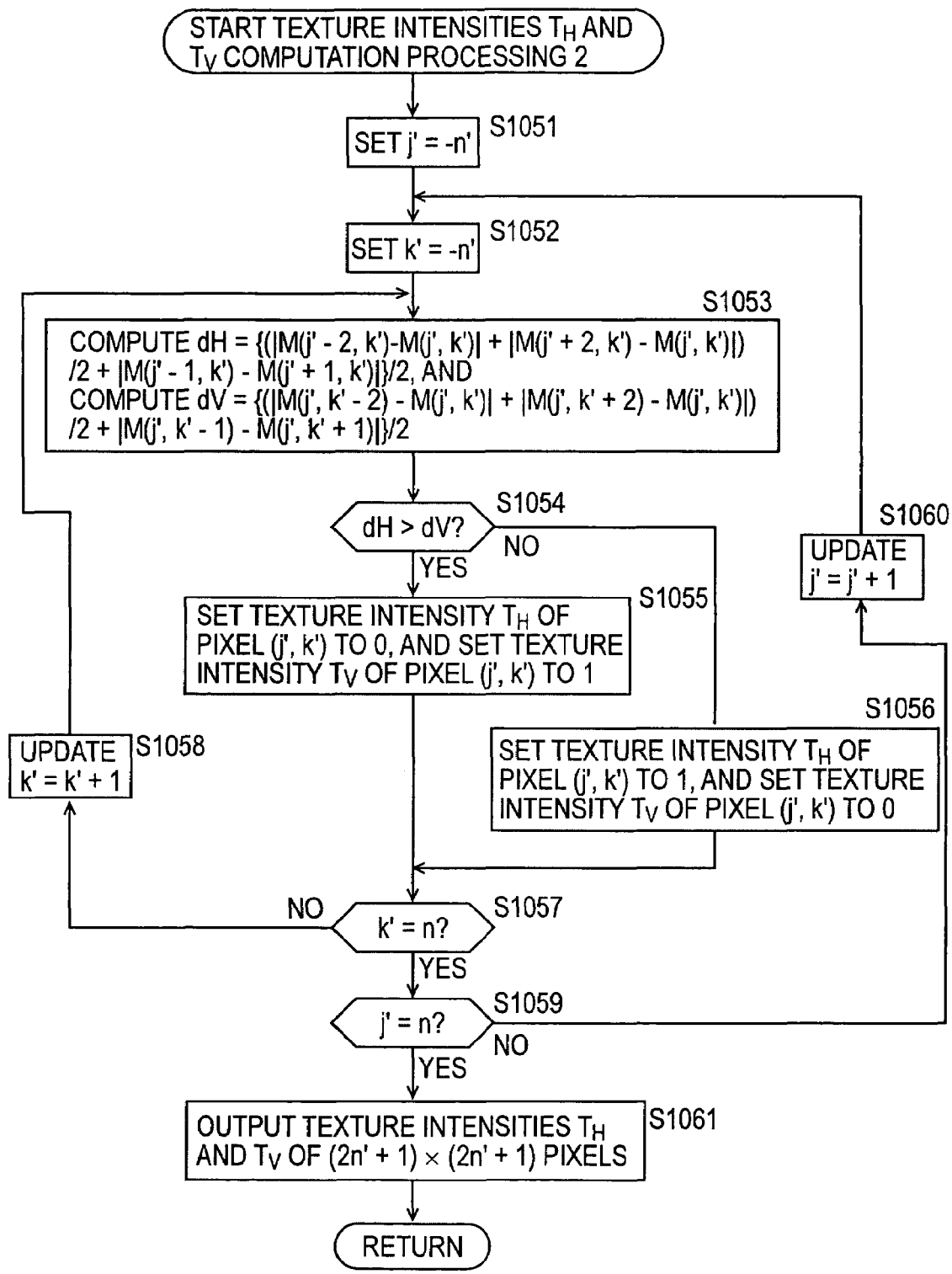
FIG. 37 is a flowchart illustrating a texture intensities $T_H$ and $T_V$ computation process 2.

In the foregoing examples, the computation of the texture intensities $T_H$ and $T_V$ is performed using GA and EA interpolated by the G interpolation processing section 331-1 (the first G interpolation process) and the E interpolation processing section 331-2 (the first E interpolation process) Alternatively, the computation can also be performed directly from the mosaic image, which is an original signal, in a simplified manner. FIG. 37, in place of FIG. 13, is a flowchart illustrating processing for directly computing texture intensities $T_H$ and $T_V$ from the mosaic image. In the example of FIG. 37, portions indicated as M indicate mosaic image signals.

In step S1051, the texture-intensity computation processing section 334 initializes the value j' of the first register, which indicates the position of the pixel among the pixels of the supplied local area, at which processing is performed, in order to set j'=−n'. In step S1052, the texture-intensity computation processing section 334 initializes the value k' of the second register, which indicates the position of the pixel among the pixels of the supplied local area, at which processing is performed, in order to set k'=−n'.

In step S1053, the texture-intensity computation processing section 334 computes a horizontal gradient evaluation value dH by using equation (4) and computes a vertical gradient evaluation value dV by using equation (5).

$$dH=\{(|M(j'-2, k')-M(j', k')|+|M(j'+2, k')-M(j', k')|)/2+ |M(j'-1, k')-M(j'+1, k')|\}/2 \quad (4)$$

$$dV=\{(|M(j', k'-2)-M(j', k')|+|M(j', k'+2)-M(j', k')|)/2+ |M(j', k'-1)-M(j', k'+1)|\}/2 \quad (5)$$

Figure 13:
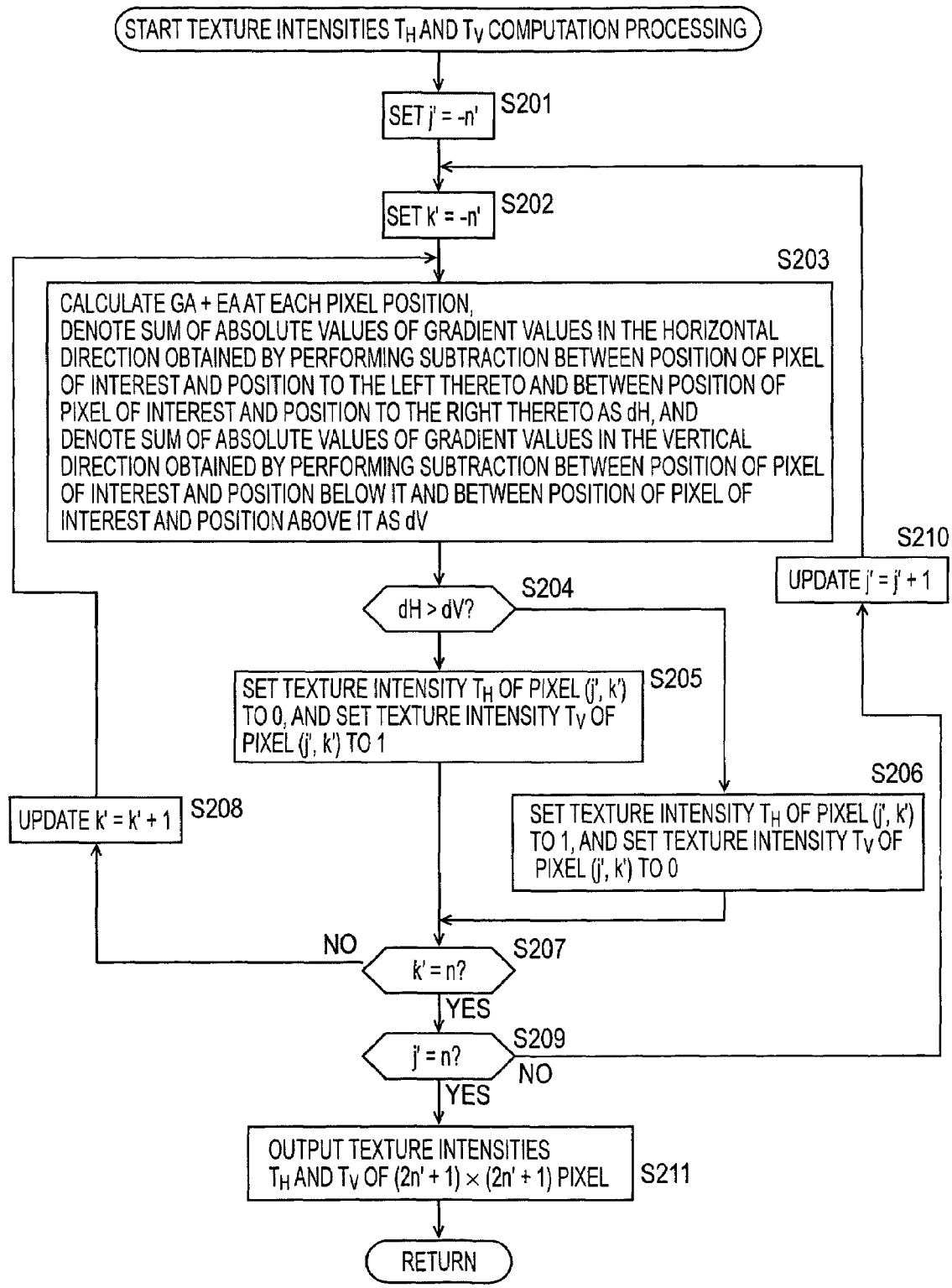
FIG. 13 is a flowchart illustrating a texture intensities $T_H$ and $T_V$ computation process.

The processing of steps S1054 to S1061 is identical to the above-described processing of steps S204 to S211 of FIG. 13, and accordingly, the description thereof is omitted.

As a result of the processing of FIG. 37, the texture intensities $T_H$ and $T_V$ can be computed simply. Although the texture intensities $T_H$ and $T_V$ obtained in the processing of FIG. 37 are influenced by the difference in the filter arrangement depending on whether the color of the pixel of interest is R or B, results close to the texture intensities $T_H$ and $T_V$ obtained in the processing of FIG. 13 are obtained. Therefore, this processing may be applied.

The foregoing processing is summarized as follows.

The texture intensity is a value (change intensity) indicating the direction of texture, which is computed from the gradient value at the position of the pixel of interest. The color-component estimation accuracy greatly depends on the selection of adjacent pixels used for estimation. Therefore, an appropriate estimation is performed by performing an estimation using adjacent pixels in the vertical direction and an estimation using adjacent pixels in the horizontal direction and by blending the estimation results on the basis of the texture intensity.

For computing the texture intensity, processing at two stages is performed. First, based on the vertical and horizontal gradient values at the position of the pixel of interest, the vertical gradient evaluation value and the horizontal gradient evaluation value are computed, and the direction in which the change in the texture is larger is determined. Here, the texture intensity in the direction in which the change in the texture is larger is set to 0, and the texture intensity in the direction in which the change in the texture is smaller is set to 1. Here, the texture intensity in the vertical direction is denoted as $T_V$, and the texture intensity in the horizontal direction is denoted as $T_H$. Next, a correction is made on the texture intensity which has been determined once by also taking into consideration the state of the texture intensity obtained at the position of the adjacent pixel. When the texture direction is in the horizontal direction, in all the pixels in the local area, $T_H=1$ and $T_V=0$, and as the texture direction becomes vertical, the number of pixels in which $T_H=0$ and $T_V=1$ increases. That is, when the texture direction is in the vertical direction or in the horizontal direction, the variation of the determination is smallest, and when the texture direction is in the vicinity of 45 degrees, the variation of the determination is largest. When the texture intensity at the position of the pixel of interest is corrected using this property, it is able to deal with texture at every angle, and it is possible to prevent unnatural blending caused by variations of the determination result in an area in which the texture direction in the vicinity of the limit resolution cannot be determined. An example of the correction method is described below. The average deviation $S_{TH}$ of the texture intensity in the horizontal direction and the average deviation $S_{TV}$ of the texture intensity in the vertical direction are computed using $T_H$ and $T_V$ in the local area, and the texture intensity is corrected by the correction equations shown in equations (6) to (8) below.

$$R=S_{TH}\times\text{the first constant} \quad (6)$$

$$T'_H(x, y)=T_H(x, y)\times(1-R)+R/2 \quad (7)$$

$$T'_V(x, y)=T_V(x, y)\times(1-R)+R/2 \quad (8)$$

The blended result $(G+E)$ of $(G+E)_H$ and $(G+E)_V$ is computed by equation (9) on the basis of the corrected texture intensities $T'_H$ and $T'_V$.

$$(G+E)=(G+E)_V\times T'_H+(G+E)_H\times T'_V \quad (9)$$

Here, when R becomes greater than 1, it is clipped to 1. Based on equations (6) to (9), when the variation of the determination result is small, R becomes closer to 0, and $T_H$ and $T_V$ are output as they are. When the variation of the determination result is large, R becomes greater, and $T'_H$ approaches 0.5 and $T'_V$ approaches 0.5. Furthermore, according to equations (6) to (9), the sum of $T'_H$ and $T'_V$ always becomes 1, and the behavior of the values of $T'_H$ and $T'_V$ can be controlled by the first constant.

In the case of a regression estimation, not blending $(G+E)_H$ and $(G+E)_V$ as much as possible enables a better MTF (Modulation Transfer function) to be obtained. Therefore, by setting the first constant to such a degree that an artifact in the neighborhood of the limit resolution is removed, high MTF performance can be exploited. Here, an average deviation is used to evaluate the variation of the texture intensity in the local area containing the position of the pixel of interest; however, another statistical amount, such as a standard deviation, may also be used. Furthermore, the computation of R in equation (6) may also be performed by the following equation (10) using not only $S_{TH}$, but also $S_{TV}$.

$$R=(S_{TH}+S_{TV})\times\text{the second constant} \quad (10)$$

Figure 1:
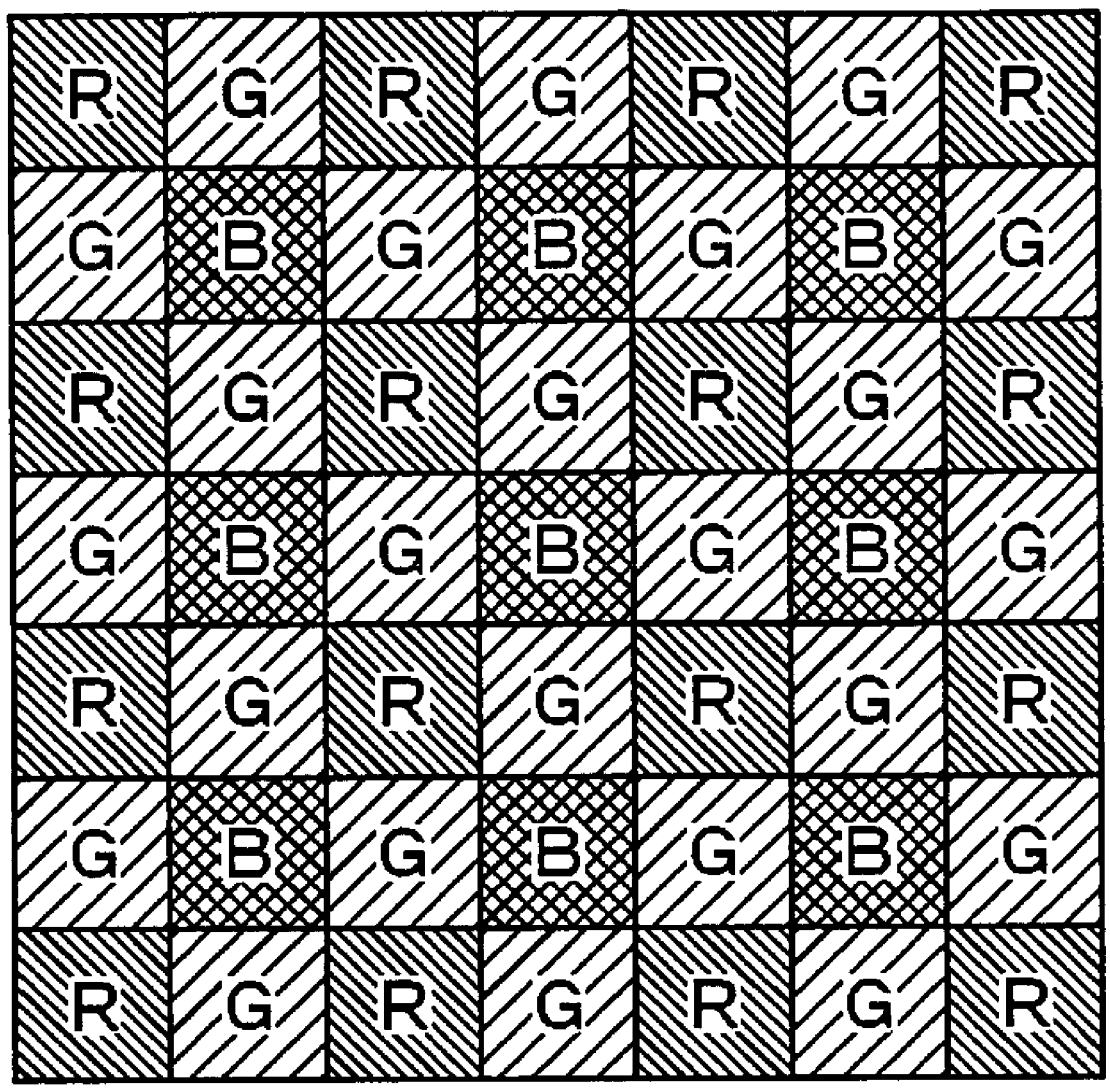
FIG. 1 illustrates a Bayer arrangement.

In the present invention, as luminance components in place of G in the Bayer arrangement (FIG. 1), new color components of G+E are generated. G+E is obtained by additionally averaging G and E in the same pixel. Since at least half of G+E is made up of G components, it can be expected that G+E has a high correlation with G. Moreover, if G and E have spectral sensitivities having a high correlation with each other, corresponding results can be expected even if image processing is performed using G+E in place of G. That is, when each of G and E has a spectral sensitivity close to G in the Bayer arrangement, G+E can be used as color components representing the luminance in a manner similar to G. Thus, in the present invention, it may be said that the processing for making the luminance available in all the pixels is a process for computing the values of two of G+E, that is, the estimated value $(G+E)_V$ having a high reliability for the texture in the horizontal direction at the position of the pixel of interest and the estimated value $(G+E)_H$ having a high reliability for the texture in the vertical direction at the position of the pixel of interest and for blending them on the basis of the texture intensity in order to make G+E adaptable in the texture direction in all the pixels.

When the color at the position of the pixel of interest is one of G and E, G+E is generated, for example, by interpolating G at the pixel position at which E exists, and interpolating E at the pixel position at which G exists. Depending on which one of the vertically adjacent pixels and the horizontally adjacent pixels are used for this interpolation, the reliability of the obtained G+E with respect to the texture direction can be switched. When the color at the position of the pixel of interest is R or B, which is neither G nor E, since the interpolated results of both G and E must be used for interpolation, a scheme is necessary to interpolate G+E at this pixel position with high accuracy.

In the present invention, when the color at the position of the pixel of interest is R or B, the use of high-frequency components contained in R or B is proposed for interpolation of G and E. That is, similarly to adding high-frequency components of luminance to the DC components of the color in the conventional interpolation method, DC components of G or E obtained from the adjacent pixels are added to the high-frequency components of R or B at the position of the pixel of interest in order to interpolate G or E. At this time, the adjacent pixels used for interpolation are switched, and the interpolation value EF of E, in which vertically adjacent pixels are used for interpolation, and the interpolation value GF of G, in which horizontally adjacent pixels are used for interpolation, are computed. Furthermore, by using the high-frequency components of EF and the DC components of G obtained from the adjacent pixels, G at the position of the pixel of interest is interpolated, and it is additionally averaged with EF in order to obtain $(G+E)_V$. Similarly, by using the high-frequency components of GF and the DC components of E obtained from the adjacent pixels, E at the position of the pixel of interest is interpolated, and it is additionally averaged with GF in order to obtain $(G+E)_H$.

Figure 38:
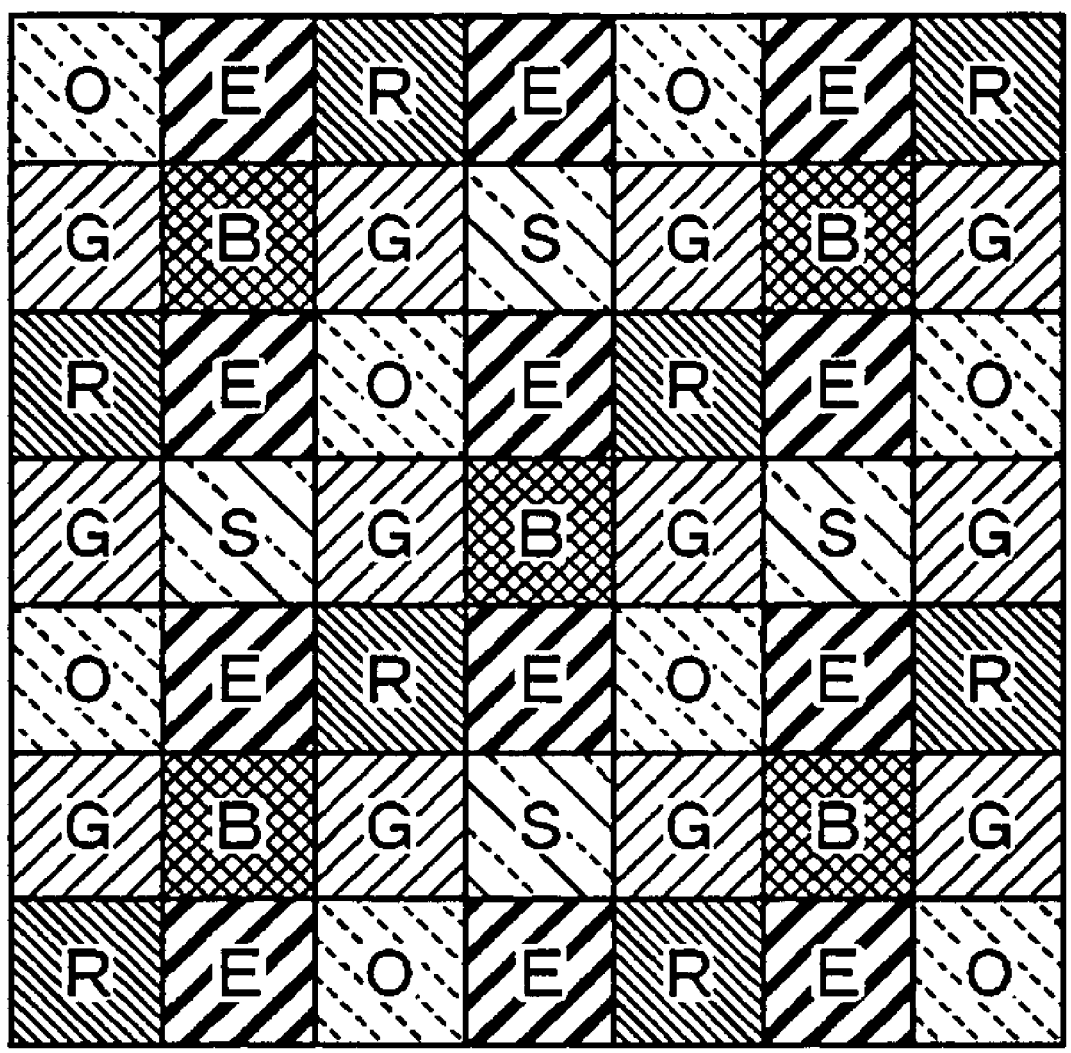
FIG. 38 illustrates a case in which two colors are further added to a filter arrangement of four colors.

In the foregoing examples, the four-color filter arrangement has been described. As shown in FIG. 38, also, in the case where two colors (these two additional colors are hereinafter referred to as "O and S") are further added to the four-color filter arrangement, G+E can be generated by using a method similar to the above-described method. Simply, only the way of selecting adjacent pixels dependent on the arrangement, that is, the loop condition in FIGS. 21 to 23, and 27 and 28, needs only to be changed. When the fact that the human vision is not so sensitive to color components as the human vision to the luminance is taken into consideration, if only the G+E signal having a high correlation with luminance holds a high sampling frequency, the reduction in the number of individual samples of the other color components does not pose much of a problem. Therefore, if the arrangement such that G is arranged every other line horizontally and vertically and E is arranged every other line horizontally and vertically and is arranged in the lines differing from the lines of G, is maintained, an arrangement in which a still larger number of colors are used can be used in a similar manner.

Figure 23:
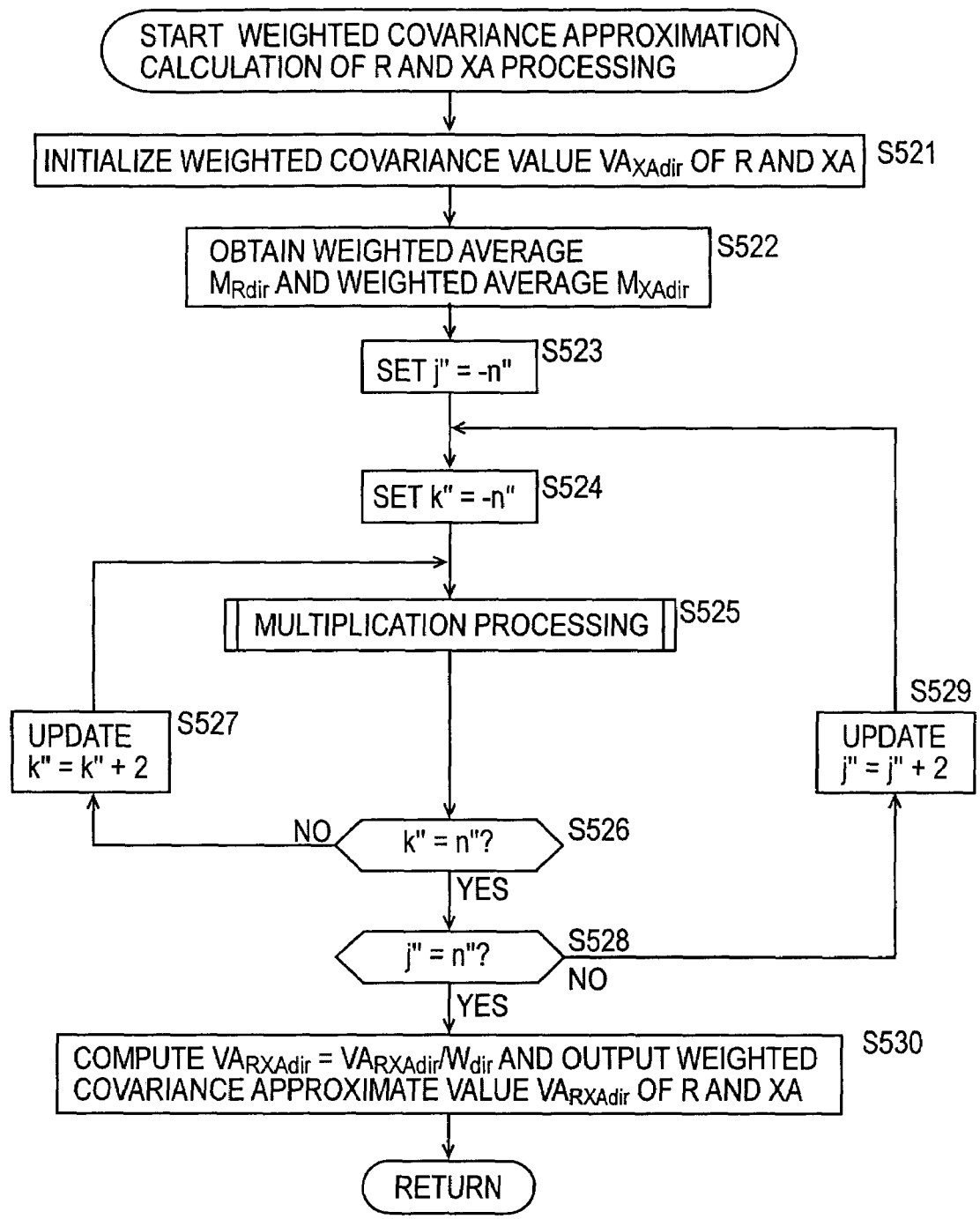
FIG. 23 is a flowchart illustrating a weighted covariance approximation calculation of R and XA process.

In step S260 of FIG. 14, in step S311 of FIG. 16, in step S459 of FIG. 21, in step S510 of FIG. 22, in step S530 of FIG. 23, and in step S809 of FIG. 32, a predetermined value is divided by the sum (for example, W) of weight coefficients (for example, w). Alternatively, by changing the weight coefficient w in accordance with the distance from the center position and by determining the sum thereof as a power of 2, a shift computation may be used in place of the process for dividing a predetermined value by the sum W of weight coefficients w (a division using the number of pixels). As a result, the division can be simplified.

The present invention can be applied to a solid-state imaging device, including a digital camera, and to an imaging apparatus (for example, a digital still camera) incorporating a solid-state imaging device. More specifically, by applying the present invention to an imaging apparatus of a method of obtaining a color image using one solid-state imaging device (single-plate color method), color components which are not known can be estimated.

As a result of the above, texture intensities can be computed as values indicating the texture direction from the mosaic image of colors captured by a single-plate color imaging device having a four-color arrangement. Furthermore, by blending the estimation value estimated using vertically adjacent pixels and the estimation value estimated using horizontally adjacent pixels on the basis of the texture intensities, color components which are not known can be estimated with high accuracy.

As a result, even in the neighborhood of the limit resolution in which an error is likely to occur in direction detection, stable interpolation results can be obtained because an appropriate correction process is performed on the texture intensities.

Although the series of processes described in the foregoing can be performed by hardware, it can also be executed by software.

In this case, as a result of the DSP block 216 executing the software, the above-described functions are realized. For example, the demosaic processing section 253 or the G+E computation processing section 282 can be formed by a personal computer 501 shown in FIG. 39.

In FIG. 39, a CPU (Central Processing Unit) 511 performs various processing in accordance with a program stored in a ROM (Read Only Memory) 512 or a program loaded from a storage section 518 to a RAM (Random Access Memory) 513. In the RAM 513, for example, data required for the CPU 511 to perform various processing is also stored as appropriate.

The CPU 511, the ROM 512, and the RAM 513 are interconnected with one another via a bus 514. Furthermore, an input/output interface 515 is also connected to the bus 514.

Connected to the input/output interface 515 are an input section 516 including a keyboard, a mouse, etc.; an output section 517 including a display unit, a speaker, etc.; the storage section 518 including a hard disk, etc.; and a communication section 519 including a modem, a terminal adaptor, etc. The communication section 519 performs a communication process via a network, including the Internet.

Furthermore, a drive 520 is connected to the input/output interface 515 as required. A magnetic disk 531, an optical disk 532, a magneto-optical disk 533, or a semiconductor memory 534 is loaded into the drive 520 as appropriate, and a computer program read therefrom is installed into the storage section 518 as required.

In a case where the series of processes is performed by software, a program making up the software is installed from a network or a recording medium into a computer incorporated into dedicated hardware (for example, the DSP block 216, or the demosaic processing section 253 or the G+E computation processing section 282 contained therein) or is installed into, for example, a general-purpose personal computer capable of executing various functions by installing various programs.

As shown in FIG. 39, the recording medium is formed of a packaged medium formed by the magnetic disk 531 (including a floppy disk), the optical disk 532 (including a CD-ROM (Compact Disk-Read Only Memory) or a DVD (Digital Versatile Disk)), the magneto-optical disk 533 (including an MO (Magneto-Optical Disk), or the semiconductor memory 534, in which a program is recorded, the recording medium being distributed to provide a program to a user separately to the main unit of the apparatus. Furthermore, the recording medium is formed by, for example, the ROM 512 and a hard disk contained in the storage section 518, in which a program is recorded, which are provided to the user by being preincorporated into the main unit of the apparatus.

In this specification, steps for writing the program stored on a recording medium may be executed chronologically according to the written orders. However, they do not have to be executed chronologically, and may be executed concurrently or individually.

What is claimed is:

1. An image processing apparatus for generating a color image on the basis of a mosaic image captured by a single-plate color imaging device, each pixel of which has a plurality of color components, the single-plate color imaging device incorporating a color filter in which first color components are arranged every other line horizontally and vertically and second color components are arranged every other line horizontally and vertically and are arranged in horizontal and vertical lines differing from those of said first color components, said image processing apparatus comprising:

change intensity computation means for computing a change intensity in the horizontal direction and a change intensity in the vertical direction in a pixel of interest on the basis of the pixel of interest of said mosaic image and pixels that are vertically and horizontally adjacent to said pixel of interest;

first estimation value computation means for computing a first estimation value pixel of interest of said first color components on the basis of said pixel of interest and pixels that are vertically adjacent to said pixel of interest and for computing a second estimation value in said pixel of interest of said second color components on the basis of said pixel of interest and pixels that are horizontally adjacent to said pixel interest; and second estimation value computation means for computing a third estimation value in said pixel of interest of third color components composed of said first color components and said second color components on the basis of said change intensity in the vertical direction, said change intensity in the horizontal direction, said first estimation value, and said second estimation value.

2. The image processing apparatus according to claim 1, wherein said change intensity computation means interpolates a first interpolation value of said first color components and said second color components in said pixel of interest on the basis of the pixel values of pixels in the neighborhood of said pixel of interest, interpolates a second interpolation value of said first color components and said second color components in pixels positioned in the vertical direction of said pixel of interest on the basis of the pixel values of pixels in the neighborhood of said pixel of interest, interpolates a third interpolation value of said first color components and said second color components in pixels positioned in the horizontal direction of said pixel of interest on the basis of the pixel values of pixels in the neighborhood of said pixel of interest, computes a vertical gradient evaluation value on the basis of a set of differences between said first interpolation value and said second interpolation value, computes a horizontal gradient evaluation value on the basis of a set of differences between said first interpolation value and said third interpolation value, determines said change intensity on the basis of said vertical gradient evaluation value and said horizontal gradient evaluation value, computes a deviation of the change intensity in said pixel of interest and in the neighborhood of said pixel of interest, and corrects said change intensity of said pixel of interest on the basis of said deviation.

3. The image processing apparatus according to claim 1, wherein said second estimation value computation means comprises:

third estimation value computation means for computing a fourth estimation value of said third color components in said pixel of interest on the basis of said second color components of pixels in the neighborhood of said pixel of interest and said first estimation value; and fourth estimation value computation means for computing a fifth estimation value of said third color components in said pixel of interest on the basis of said first color components of pixels in the neighborhood of said pixel of interest and said second estimation value; and wherein said second estimation value computation means computes said third estimation value on the basis of said fourth estimation value, said fifth estimation value, said change intensity in the vertical direction in said pixel of interest, and said change intensity in the horizontal direction in said pixel of interest.

4. The image processing apparatus according to claim 3, wherein said first and said second color components have spectral sensitivities having a high correlation with each other.

5. An image processing method for use with an image processing apparatus for generating a color image on the basis of a mosaic image captured by a single-plate color imaging device, each pixel of which has a plurality of color components, the single-plate color imaging device incorporating a color filter in which first color components are arranged every other line horizontally and vertically and second color components are arranged every other line horizontally and vertically and are arranged in horizontal and vertical lines differing from those of said first color components, said image processing method comprising:

computing a change intensity in the horizontal direction and a change intensity in the vertical direction in a pixel of interest on the basis of said pixel of interest of said mosaic image and pixels that are vertically and horizontally adjacent to said pixel of interest;

computing a first estimation value in said pixel of interest of said first color components on the basis of said pixel of interest and pixels that are vertically adjacent to said pixel of interest;

computing a second estimation value in said pixel of interest of said second color components on the basis of said pixel of interest and pixels that are horizontally adjacent to said pixel of interest; and computing a third estimation value in said pixel of interest of third color components composed of said first color components and said second color components on the basis of said change intensity in the vertical direction, said change intensity in the horizontal direction, said first estimation value, and said second estimation value.

6. A computer-readable storage media storing a program which, when executed by a processor, performs a method of generating a color image on the basis of a mosaic image captured by a single-plate color imaging device, each pixel of which has a plurality of color components, the single-plate color imaging device incorporating a color filter in which first color components are arranged every other line horizontally and vertically and second color components are arranged every other line horizontally and vertically and are arranged in horizontal and vertical lines differing from those of said the first color components, said method comprising:

computing a change intensity in the horizontal direction and a change intensity in the vertical direction in a pixel interest on the basis of said pixel of interest of said mosaic image and pixels that are vertically and horizontally adjacent to said pixel of interest;

computing a first estimation value in said pixel of interest of said first color components on the basis of said pixel of interest and pixels that are vertically adjacent to said pixel of interest;

computing a second estimation value in said pixel of interest of said second color components on the basis of said pixel of interest and pixels that are horizontally adjacent to said pixel of interest; and computing a third estimation value in said pixel of interest of third color components composed of said first color components and said second color components on the basis of said change intensity in the vertical direction, said change intensity in the horizontal direction, said first estimation value, and said second estimation value.

7. An image processing apparatus for generating a color image on the basis of a mosaic image captured by a single-plate color imaging device, each pixel of which has a plurality of color components, the single-plate color imaging device incorporating a color filter in which first color components are arranged every other line horizontally and vertically and second color components are arranged every other line horizontally and vertically and are arranged in horizontal and vertical lines differing from those of said first color components, said image processing apparatus comprising:

a change intensity computation unit for computing a change intensity in the horizontal direction and a change intensity in the vertical direction in a pixel of interest on the basis of the pixel of interest of said mosaic image and pixels that are vertically and horizontally adjacent to said pixel of interest;

a first estimation value computation unit for computing a first estimation value in said pixel of interest of said first color components on the basis of said pixel of and pixels that are vertically adjacent to said pixel of interest, and computing a second estimation value in said pixel of interest of said second color components on the basis of said pixel of interest and pixels that are horizontally adjacent to said pixel of interest; and a second estimation value computation unit for computing a third estimation value in said pixel of interest of third color components composed of said first color components and said second color components on the basis of said change intensity in the vertical direction, said change intensity in the horizontal direction, said first estimation value, and said second estimation value.

* * * * *